US010204709B2

(12) United States Patent
Rogers

(10) Patent No.: US 10,204,709 B2
(45) Date of Patent: Feb. 12, 2019

(54) APPARATUS AND METHOD FOR CONTROLLING A PLASMA FUSION REACTOR

(71) Applicant: Joel Guild Rogers, Vancouver (CA)

(72) Inventor: Joel Guild Rogers, Vancouver (CA)

( * ) Notice: Subject to any disclaimer, the term of this patent is extended or adjusted under 35 U.S.C. 154(b) by 0 days.

(21) Appl. No.: 15/335,229

(22) Filed: Oct. 26, 2016

(65) Prior Publication Data

US 2018/0114603 A1 Apr. 26, 2018

(51) Int. Cl.
| | | |
|---|---|---|
| G21B 1/15 | (2006.01) | |
| G21B 1/05 | (2006.01) | |
| G21B 1/17 | (2006.01) | |
| G21B 1/21 | (2006.01) | |

(52) U.S. Cl.
CPC ............. *G21B 1/15* (2013.01); *G21B 1/05* (2013.01); *G21B 1/17* (2013.01); *G21B 1/21* (2013.01)

(58) Field of Classification Search
CPC ... G21B 1/05; G21B 1/15; G21B 1/17; G21B 1/21
USPC .................................... 376/100, 129
See application file for complete search history.

(56) References Cited

U.S. PATENT DOCUMENTS

| | | | |
|---|---|---|---|
| 3,386,883 A | 6/1968 | Farnsworth | |
| 3,664,920 A | 5/1972 | Hirsch | |
| 4,826,646 A | 5/1989 | Bussard | |
| 8,059,779 B2 | 11/2011 | Greatbatch | |
| 9,082,517 B2 | 7/2015 | Rogers | |
| 9,406,405 B2 | 8/2016 | Rogers | |
| 2008/0187086 A1 | 8/2008 | Bussard | |
| 2010/0284501 A1 | 11/2010 | Rogers | |
| 2013/0329844 A1* | 12/2013 | Leal-Quiros | G21B 3/002 376/100 |
| 2015/0380114 A1 | 12/2015 | Park | |
| 2016/0037617 A1* | 2/2016 | Prater | H05H 1/11 315/111.71 |

(Continued)

OTHER PUBLICATIONS

Park, Jaeyoung; "A Path to Electrostatic Fusion", Oct. 1, 2014, 41pgs. downloaded from website iec.neep.wisc.edu/usjapan/16th_US-Japan/Wed_AM/2014%20US%20Japan%20Workshop%20EMC2%20IEC%20Polywell.pdf, 16th US-Japan Wokshop on Fusion Neutreon Sources, Madison, Wisconsin, U.S.A.

(Continued)

*Primary Examiner* — Jack W Keith
*Assistant Examiner* — Daniel Wasil

(57) ABSTRACT

Embodiments of a plasma fusion energy reactor based on Bussard's Polywell concept. The apparatus of the embodiments include interior, electron-extraction electrodes to remove cold, trapped electrons and replace them with hot electrons. Hot electrons efficiently confine a dense, hot plasma fuel. The method of the embodiments discloses a procedure for controlling the reactor during its start-up phase of operation. During start-up the reactor is changed from being in a cold, empty state to being in a stable steady-state of energy production. Reliable computer simulation predicts that in steady-state the disclosed apparatus and method will produce usable net-power continuously and for an indefinite period of operation. The full-scale reactor design is suitable for replacing most of the world's existing coal-fired power production with a clean, safe energy production alternative.

7 Claims, 47 Drawing Sheets

(56) References Cited

U.S. PATENT DOCUMENTS

2016/0093406 A1* 3/2016 Rogers .................. G21B 1/05
376/129

OTHER PUBLICATIONS

Rogers, Joel G., "Recent Polywell Patents", Oct. 28, 2015, 12pgs. downloaded from http://iec2015.es.titech.ac.jp/presentation/O-9.pdf, 17th US-Japan Workshop on Fusion Neutron Sources,Tokyo, Japan.

Levy, "Diocotron Instability in a Cylindrical Geometry", 1965, 9pgs., AIP Physics of Fluids Journal, vol. 8, p. 1288, American Institute of Physics Publishing, Melville, New York, U.S.A.

Iter, "International Thermonuclear Experimental Reactor", 2017, 1 pg. downloaded from http://www.fusion.qst.go.jp/english/iter-e/concept.html, National Institutes for Quantum and Radiological Science and Technology, Naka Fusion Institute, Japan.

Kazemyzade et al., "The Optimization of Ion and Electron Guns Voltage in a Polywell Fusion Reactor", 2016, 3pgs., IAEA2016 Abstract(1pg.) attached to Oct. 30, 2016 e-mail(2pgs.) from Vahid Damideh (v_damideh@yahoo.com) to rogersjg@telus.net.

Kazemyzade et al., "Dependence of Potential Well Depth on the Magnetic Field Intensity in a Polywell Reactor", 2011, 5pgs., Journal of Fusion Energy vol. 31, p. 341, Springer Science and Business Media, New York, NY, U.S.A.

Lavrentev et al., "Multislit Electromagnetic Trap 'Jupiter 2M3'", 2007, 3 pgs. Problems of Atomic Science and Technology, No. 1, Series: Plasma Physics(13), p. 27, National Science Center, Kharkov, Ukraine.

Dolan, "Magnetic electrostatic plasma confinement", 1994, 55 pgs., Plasma Physics and Controlled Fusion, vol. 36, p. 1539, Institute of Physics Publishing, Bristol, UK.

Yushmanov, "The influence of electron capture in gaps on the efficiency of the magneto-electrostatic trap", 1980, 1pg., Nuclear Fusion, vol. 21, p. 329, Institute of Physics Publishing, Bristol, UK.

Bussard, Robert W., "The Advent of Clean Nuclear Fusion: Superperformance Space Power and Propulsion", 2006, 15pgs. downloaded from www.askmar.com/conferenceNotes/2006-9 IAC Paper.pdf, 57th International Astronautical Congress (IAC 2006), Valencia, Spain.

Vdovin, "Lavrent'ev's Electromagnetic Traps", 2011, 1pg., Journal of Kharkiv[sic] University, No. 969, Series: "Nuclei, Particles, Fields", issue 3 /51/, p. 36, National Science Center "Kharkov Institute of Plasma and Technology", Kharkov, Ukraine.

Glasstone and Lovberg, "Controlled Thermonudear Reactions", 1960, 5pgs. selected from 523-pg. book, Publisher D. Van Nostrand Company, Inc., Princeton, NJ, U.S.A.

Tech-X, "OOPIC Pro User's Guide v.2.0.0", 2009, 74pgs plus "README2009.txt" file(1pg.) selected from 114pg. Guide downloaded from www.txcorp.com, Tech-X Corporation, Boulder, CO, U.S.A.

Birdsall, "Particle-in-Cell Charged-Particle Simulations, Plus Monte Carlo Collisions With Neutral Atoms, PIC-MCC", 1991, 21pgs., IEEE Transactions on Plasma Science, vol. 19, No. 2, p. 65; New York, NY, U.S.A.

Xoopic, "The Plasma Theory and Simulation Group", 2016, 4pgs. downloaded from http://ptsg.egr.msu.edu/ Electrical Computer Engineering Department, Michigan State University, East Lansing, Michigan, U.S.A.

Bussard, Robert, "Should Google Go Nuclear?", 2006, 2 pgs. from 25pg. transcript of Robert W. Bussard's Google Tech Talk reformatted by Mark Duncan and downloaded from http://www.askmar.com/ConferenceNotes/Should Google Go Nuclear.pdf, California, U.S.A.

Huba, "NRL Plasma Formulary", 2009, 5pgs. selected of 71pgs. downloaded from http://library.psfc.mit.edu/catalog/online_pubs/NRL_FORMULARY_13.pdf, The Office of Naval Research, Washington, D.C., U.S.A.

GMW, "GMW Electromagnet Coils" and "Electromagnet Power Supplies", 2015, 3pgs., downloaded from online catalog http://www.gmw.com/electromagnets/Coils/coils_overview.html, GMW Associates, San Carlos, CA, U.S.A.

Sabulsky et al., "Efficient Continuous-Duty Bitter-Type Electromagnets for Cold Atom Experiments", 2013, 5pgs. downloaded from https://arxiv.org/abs/1309.5330, Review of Scientific Instruments, vol. 84, 104708, American Institute of Physics Publishing, Melville, NY, U.S.A.

Data Portal, "Breakdown of Electricity Generation by Energy Source", 2014, 1pg. downloaded from http://www.tsp-data-portal.org/Breakdown-of-Electricity-Generation-by-Energy-Source#tspQvChart, The Shift Project Data Portal, Paris, France.

Sourcewatch, "Existing U.S. Coal Plants", 2006, 10pgs. selected of 35 pgs. downloaded from http://www.sourcewatch.org/index.php/Existing_U.S._Coal_Plants, Center for Media and Democracy, Madison, WI, U.S.A.

Dietrich, Carl C., "Improving Partide Confinement in Inertial Electrostatic Fusion for Spacecraft Power and Propulsion", Feb. 2007, 20pgs. of 244 pgs. downloaded from http://ssl.mit.edu/files/website/theses/PhD-2007-DietrichCarl.pdf,, Massachusetts Institute of Technology, Cambridge, MA, U.S.A.

McGuire, Thomas J., "Improved Lifetimes and Synchronization Behavior in Multi-grid Inertial Electrostatic Confinement Fusion Devices", Feb. 2007, 22pgs. of 254 pgs. downloaded from http://ssl.mit.edu/files/website/theses/PhD-2007-McGuireThomas.pdf, Massachusetts Institute of Technology, Cambridge, MA, U.S.A.

Chen, Frances F., "Introduction to Plasma Physics and Controlled Fusion, Second Edition", 1983, 7pgs. selected of 421pgs., Publisher Plenum Press, New York, NY, U.S.A.

Froese et al., "The decay of ion bunches in the self-bunching mode", 2012, 20pgs. downloaded from http://iopscience.iop.org/artide/10.1088/1367-2630/14/7/073010/pdf, New Journal of Physics, vol. 14, Jul. 30, 2010, Institute of Physics Publishing, Bristol, UK.

Heatwave, "Temperature Controller/Power Supply", 2017, 1pg. downloaded from catalog at http://www.cathode.com, HeatWave Labs, Inc., Watsonville, CA, U.S.A.

Cornish et al., "The dependence of potential well formation on the magnetic field strength and electron injection current in a polywell device", 2014, 12pgs., Physics of Plasma vol. 21, Sep. 25, 2002, American Institute of Physics Publishing, Melville, NY, U.S.A.

Rogers, Joel G., "Aneutronic Polywell Reactor", presented at 19th US-Japan Workshop on Fusion Neutron Sources for Nuclear Assay and Alternate Applications (IEC2017), Oct. 17, 2017, 13pgs., Kansai University Senriyama Campus, Osaka, Japan.

Rogers, Joel G., "A Polywell Fusion Reactor Designed for Net Power Generation", Journal of Fusion Energy, Dec. 1, 2017, 20pgs., first published online https://doi.org/10.1007/s10894-017-0147-9, vol. 33, #1, Springer Science and Business Media, New York, NY, U.S.A.

Baker, "Simultaneous Parametric Simulation of Electron Injection into Polywell Devices", presented at 16th US-Japan Workshop on Fusion Neutron Sources for Nuclear Assay and Alternate Applications (IEC2014), Oct. 1, 2014, 29pgs., University of Wisconsin, Madison, WI, U.S.A.

Santarius, "Polywell Physics Modeling Considerations", presented at 16th US-Japan Workshop on Fusion Neutron Sources for Nuclear Assay and Alternate Applications (IEC2014), Oct. 1, 2014, 14pgs., University of Wisconsin, Madison, WI, U.S.A.

Samida-Pugh, S, "Progressive Fusion Solutions Promotional Deck", email to rogersjg@telus.net, Apr. 28, 2018, 10 pgs., Vancouver, B.C., Canada.

* cited by examiner

Polywell – A Path to Electrostatic Fusion

Jaeyoung Park
Energy Matter Conversion Corporation (EMC2)
University of Wisconsin, October 1, 2014

PRIOR ART

FIG. 1C
Wiffle-Ball 8 Experiments → 40

Two major improvements over WB-7 ← 44

- WB-8 has externally held coils without joints
- WB-8 has an arc plasma source to initiate high density plasmas in the core

Powerful plasma heating to achieve high beta plasmas and wiffleball

- Grid bias: up to 2 kA @50 kV (500A @ 15kV for WB-7)
- Arc source: 500A arc source for plasma start-up (*None for WB-7*)
- 8 Electron injectors:10A per gun (~1-2A/gun for WB-7)
- Ion injection: 1 MW (40A at 25 kV) via NBI (*None for WB-7*)

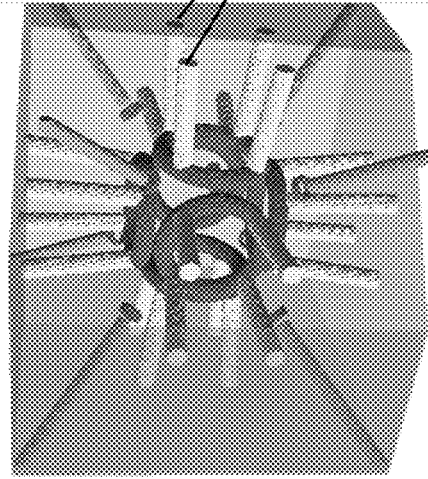
42
46

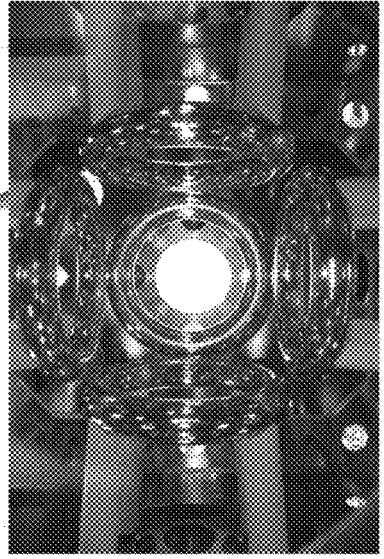

PRIOR ART

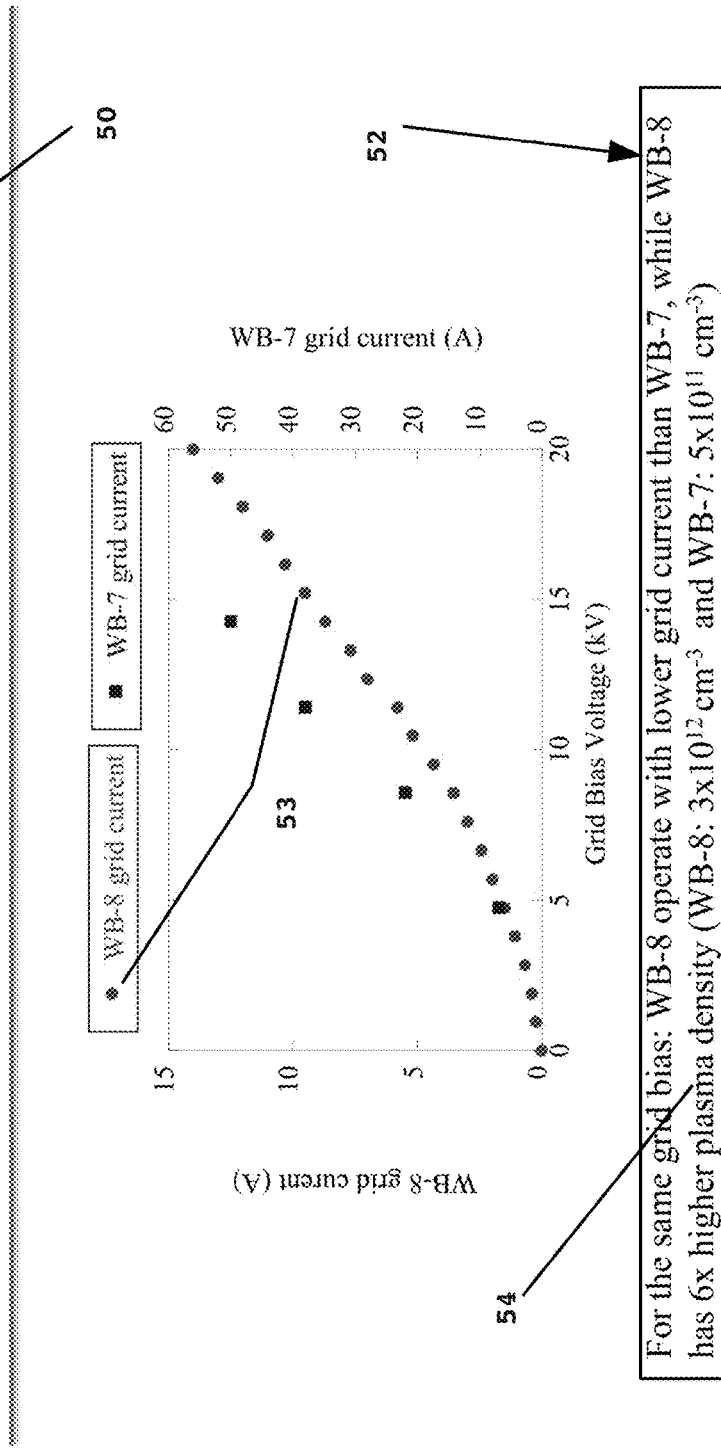

Plasma potential measurement

PRIOR ART

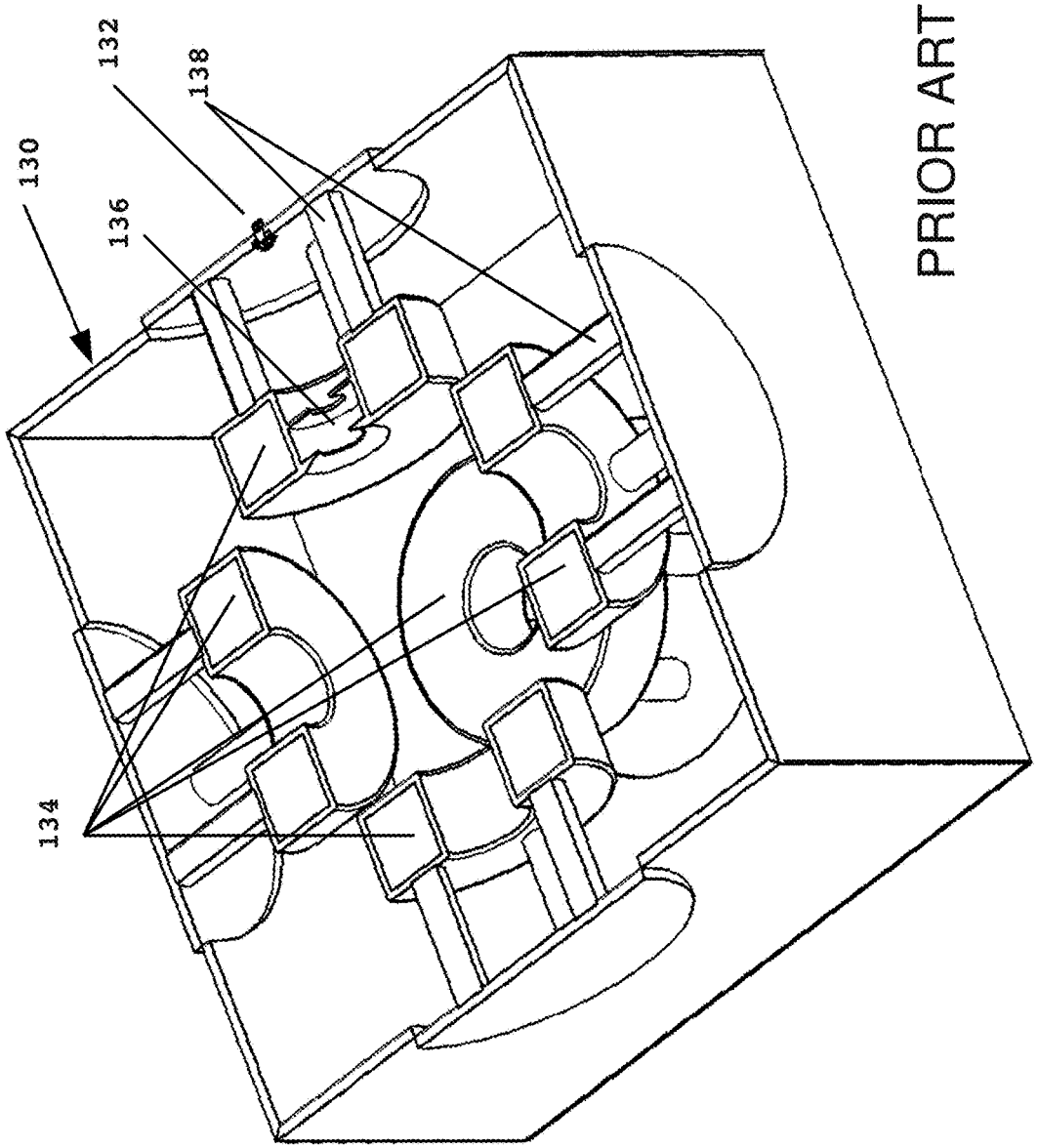

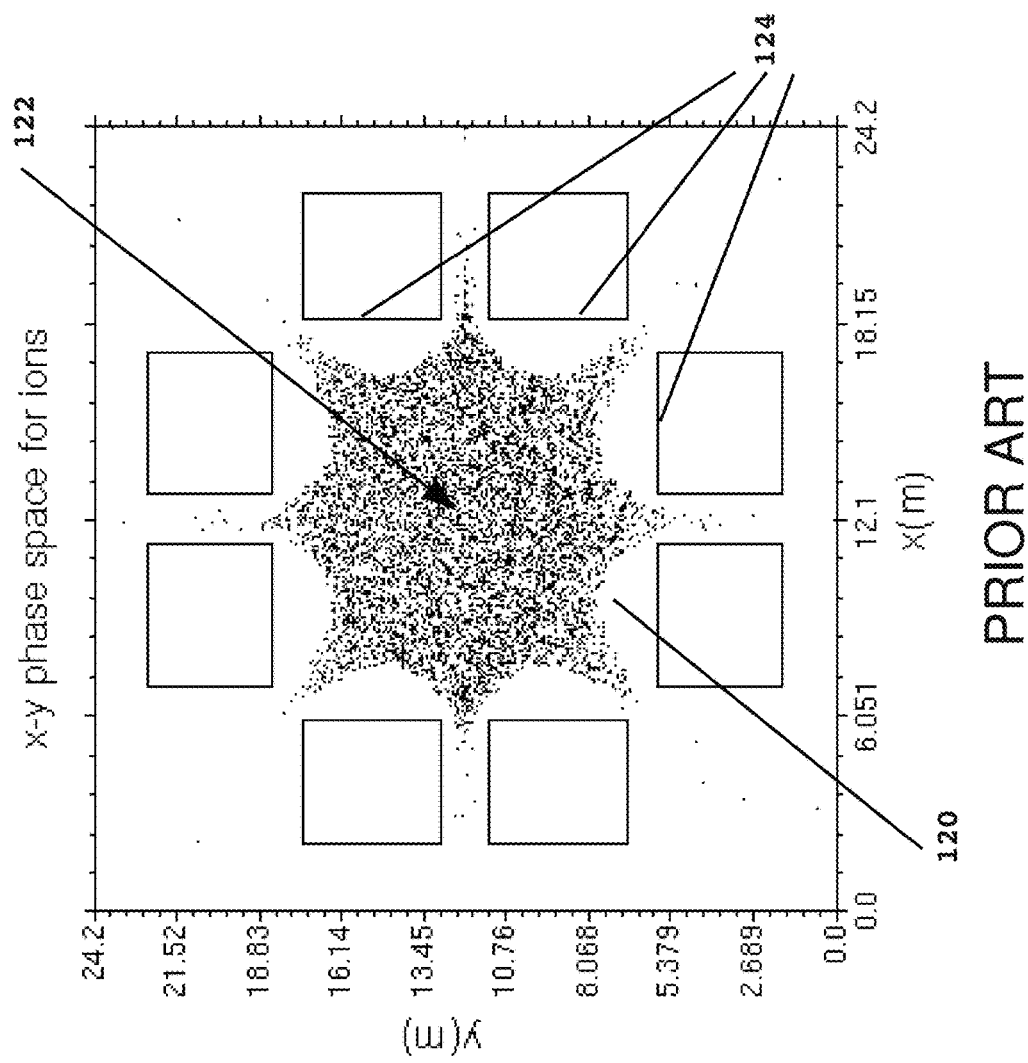

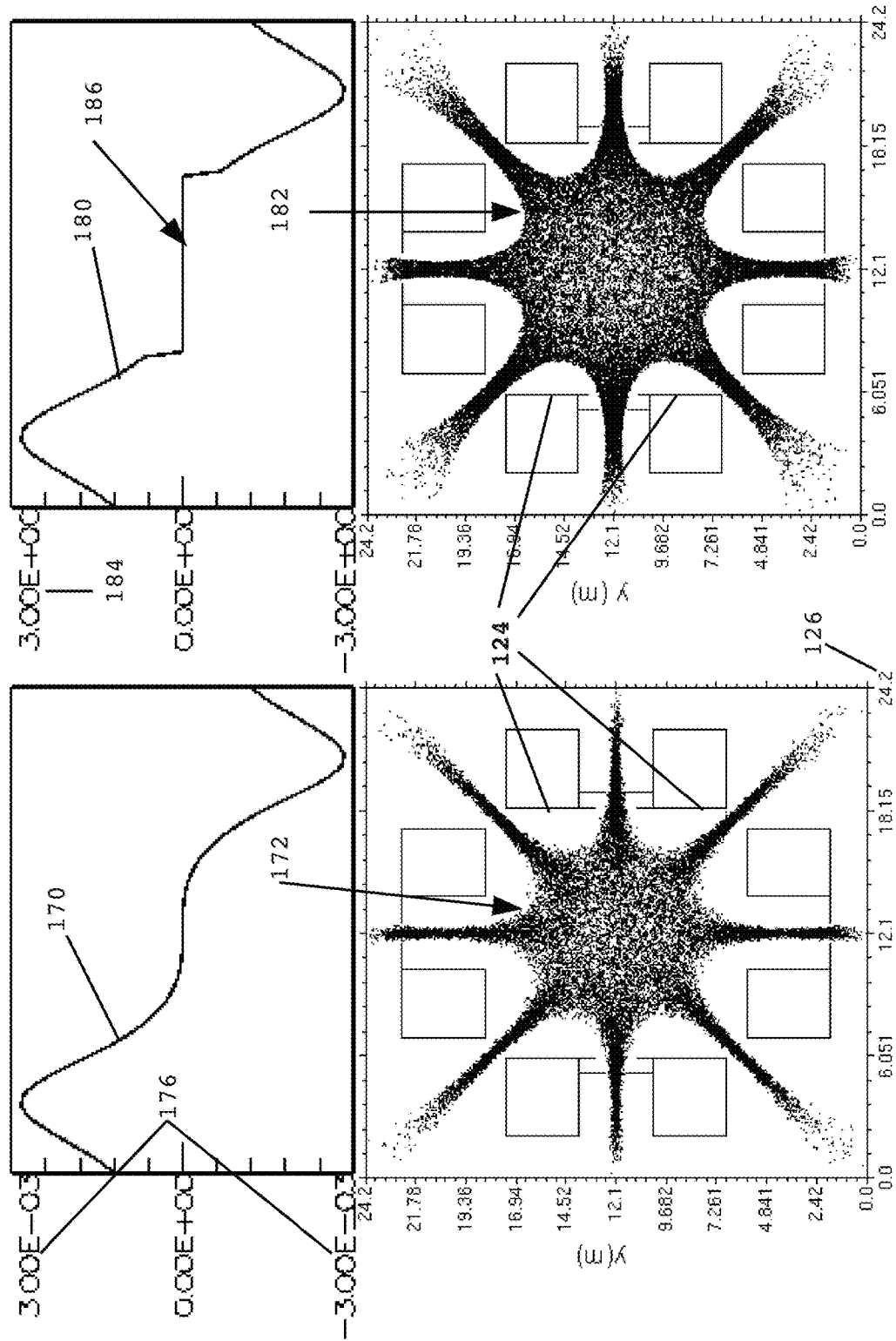

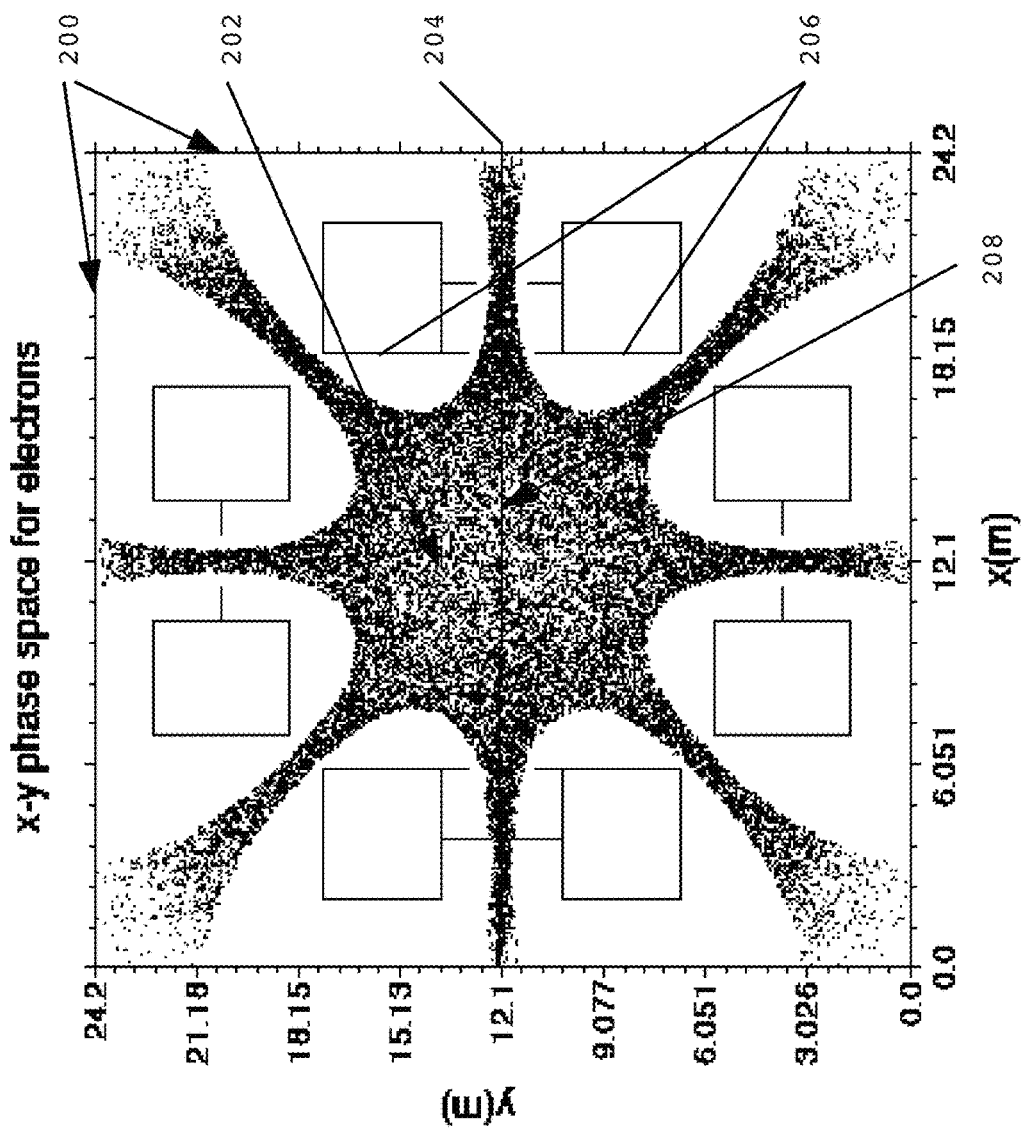

FIG. 3D

| | 0.08T | 0.08T | 0.11T | 0.16T | 0.14T | 0.13T |
|---|---|---|---|---|---|---|
| Maximum Field | 0.08T | 0.08T | 0.11T | 0.16T | 0.14T | 0.13T |
| Maximum DC Power | 110W (5A, 22V) | 110W (5A, 22V) | 625W (50A, 12.5V) | 1.75kW (70A, 25V) | 2.07kW (70A, 29.5V) | 5.18kW (140A, 37V) |
| Inductance | 90mH | 90mH | 20mH | 50mH | 60mH | 60mH |
| Resistance At 20°C Maximum | 3.52W / 4.4W | 3.52W / 4.4W | 0.22W / 0.28W | 0.29W / 0.35W | 0.36W / 0.40W | 0.22W / 0.26W |
| Water Cooling | 0.5 liters/min 0.2 bar | 0.5 liters/min 0.2 bar | 2 liters/min 0.25 bar | 6 liters/min 1.0 bar | 6 liters/min 1.0 bar | 15 liters/min 1.0 bar |
| Turns | 950 | 950 | 344 | 460 | 460 | 360 |
| Mechanical | | | | | | |
| Coil Mount Side | Right | Left | Universal | Universal | Universal | Universal |
| Inside Diameter | 47mm | 47mm | 93mm | 115mm | 166mm | 306mm |
| Outside Diameter | 165mm | 165mm | 260mm | 345mm | 395mm | 636mm |
| Thickness | 56mm | 56mm | 100mm | 133mm | 133mm | 140mm |
| Mass | 5kg | 5kg | 30kg | 64kg | 76kg | 206kg |

Specifications are subject to change without notice.

For more information regarding GMW Electromagnet Coils, please contact Ian Walker.

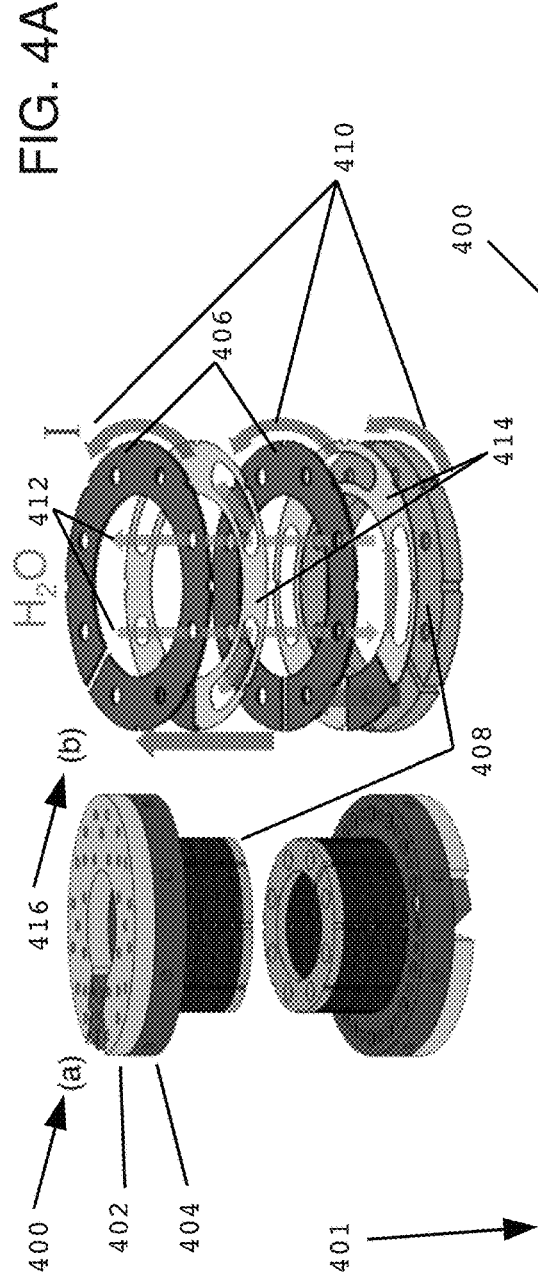

FIG. 1. Modified Bitter electromagnet design. (a) The steel mount (402) and polycarbonate water distribution block (404) are shown with mounting holes for fitting to a vacuum flange with a recessed viewport. Arc stacks consist of 31 copper arcs (406) plus one brass arc (408) as an end cap. (b) The current (410 arrows) flows through the copper arcs (406) in a helical pattern through the device. The cooling water (412 arrows) flows parallel to the current through the device in channels cut into the polyester insulators (414). For simplicity, we only show two copper arcs. The actual electromagnet contains 31 copper arcs.

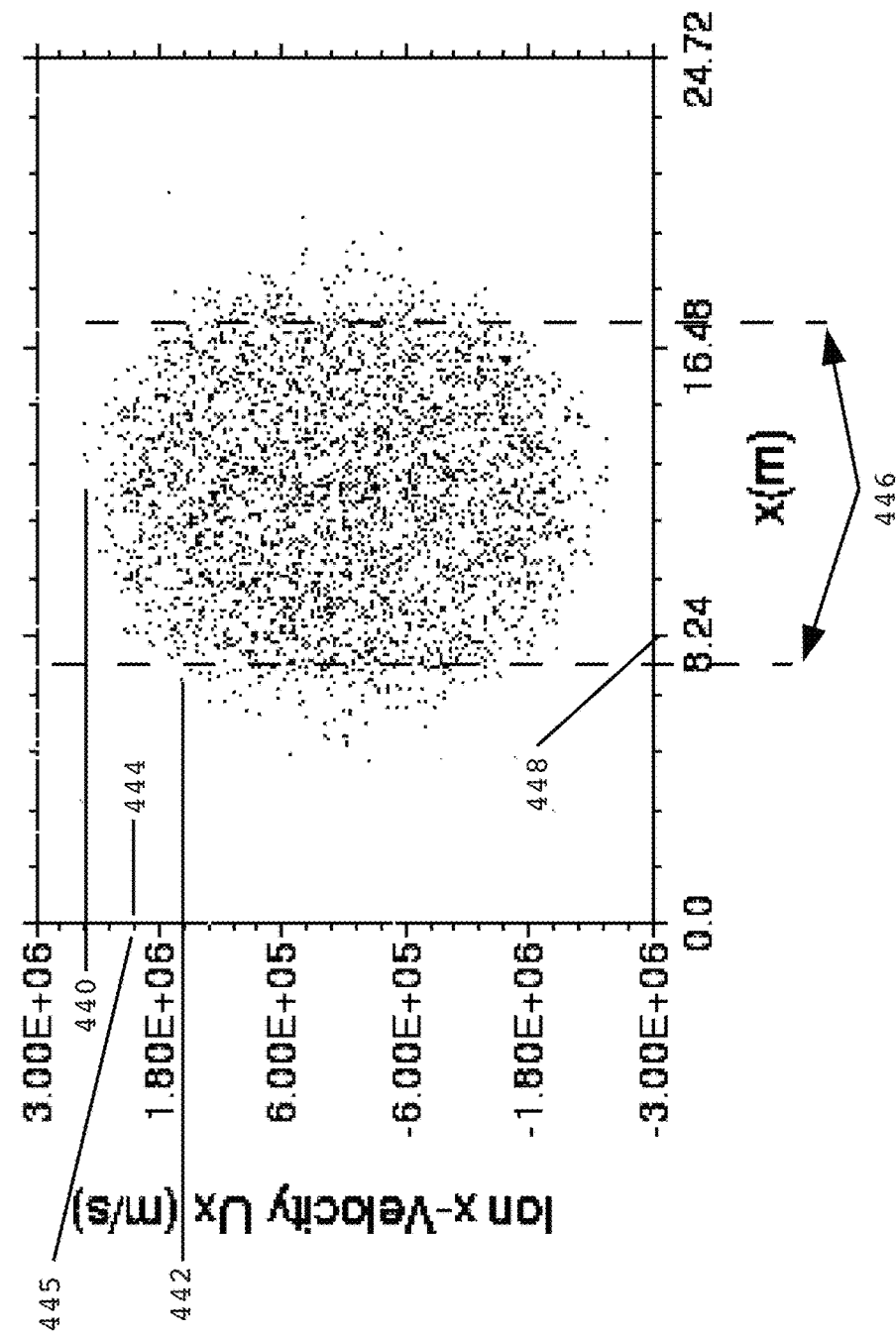

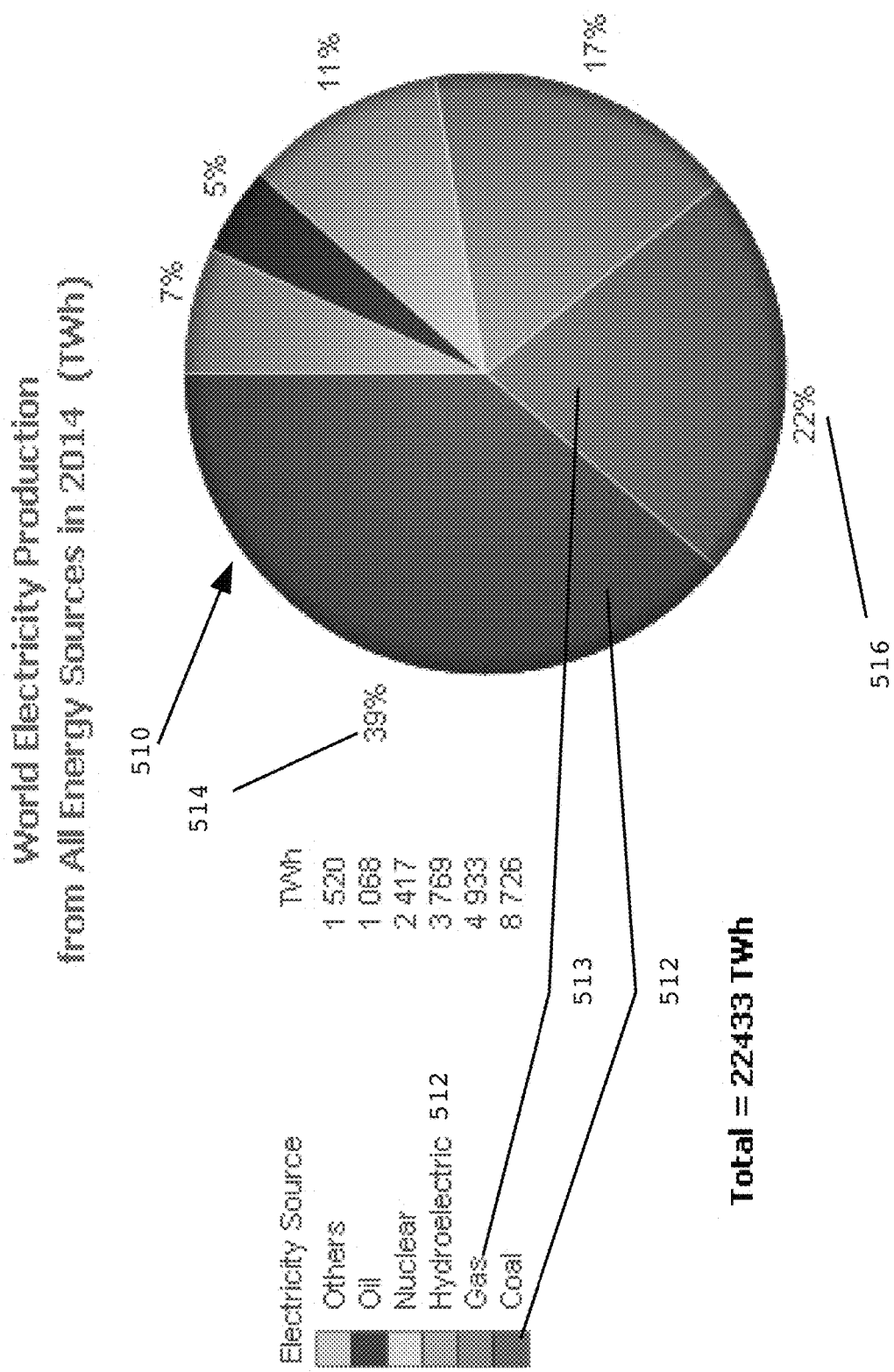

FIG. 5B

Here's a breakdown of existing U.S. coal-fired generating units by size:[12]

| Unit Size | # of Units | Total Capacity |
|---|---|---|
| 0-10 MW | 37 | 192 MW |
| 10-20 MW | 25 | 345 MW |
| 20-50 MW | 75 | 2,427 MW |
| 50-100 MW | 73 | 5,269 MW |
| 100-250 MW | 85 | 14,000 MW |
| 250-500 MW | 97 | 34,396 MW |
| 500-750 MW | 69 | 42,655 MW |
| 750-1,000 MW | 28 | 23,612 MW |
| 1,000-1,500 MW | 59 | 72,366 MW |
| 1,500-2,000 MW | 38 | 66,657 MW |
| Over 2,000 MW | 29 | 73,920 MW |

122,896MW 212,943MW 12. http://www.eia.doe.gov/cneaf/electricity/epa/epat2p2.html

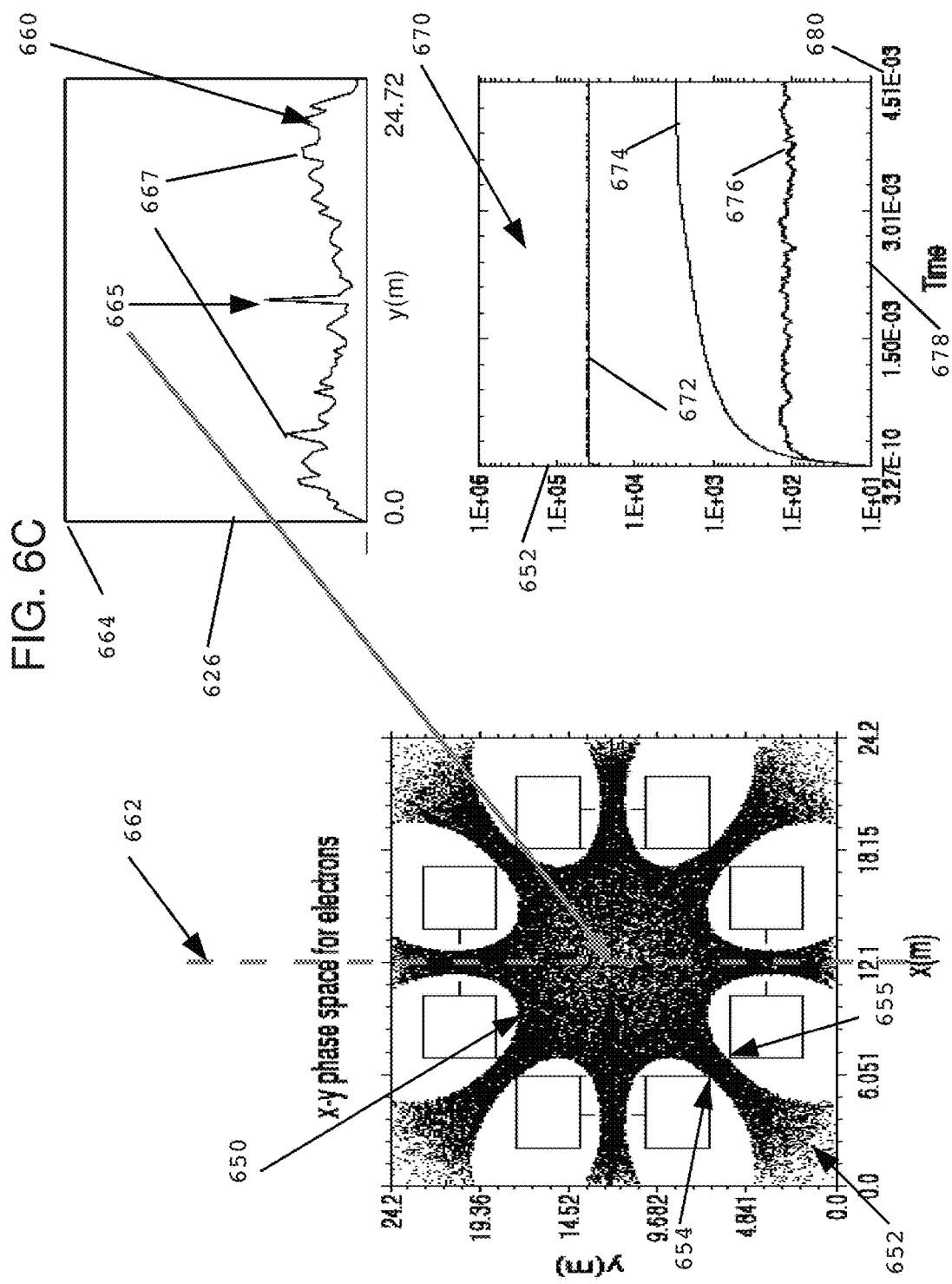

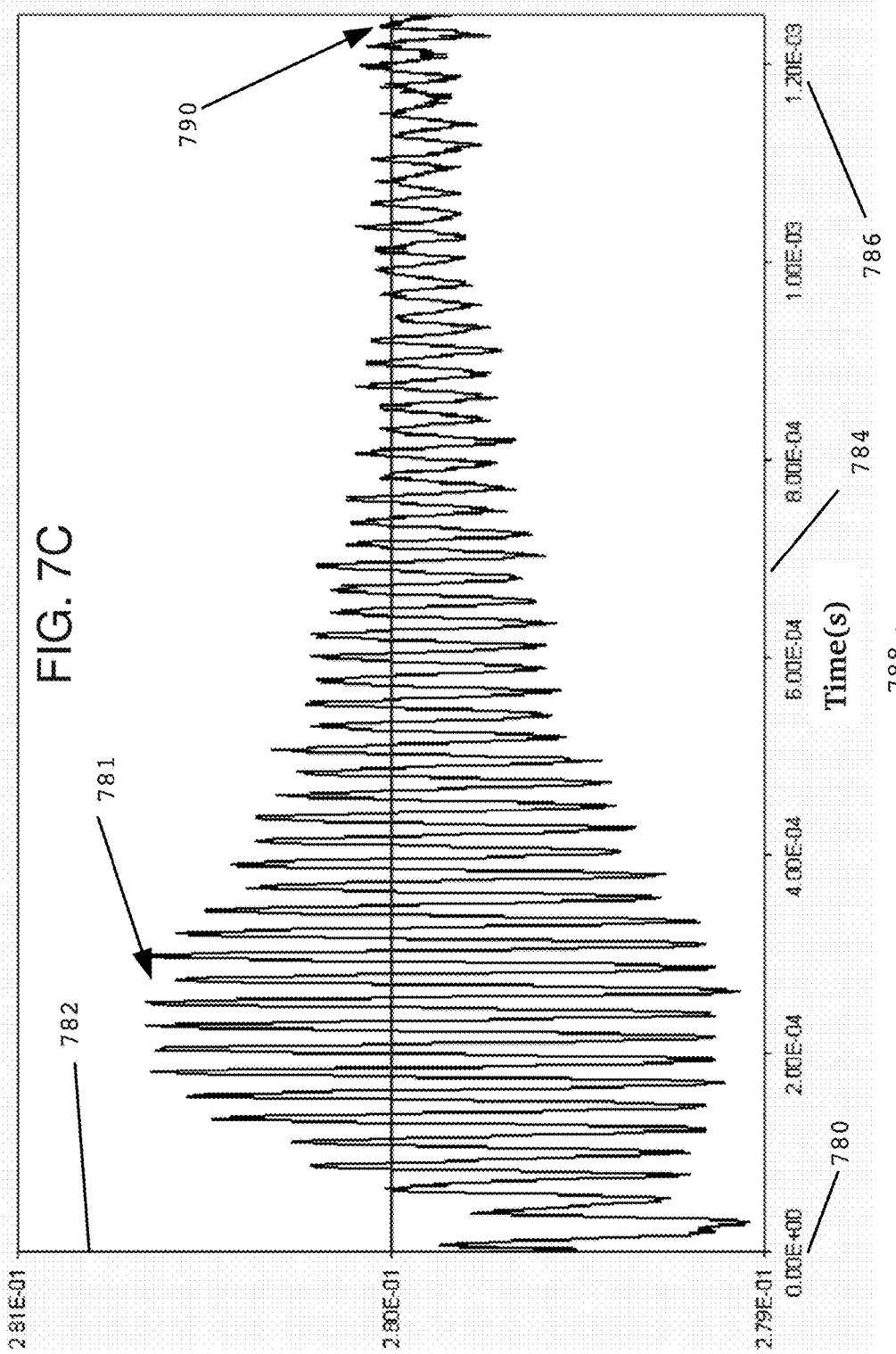
Figure 85: Evidence of two-stream instability at the bounce frequency, Argon 1.9e-6 mbar

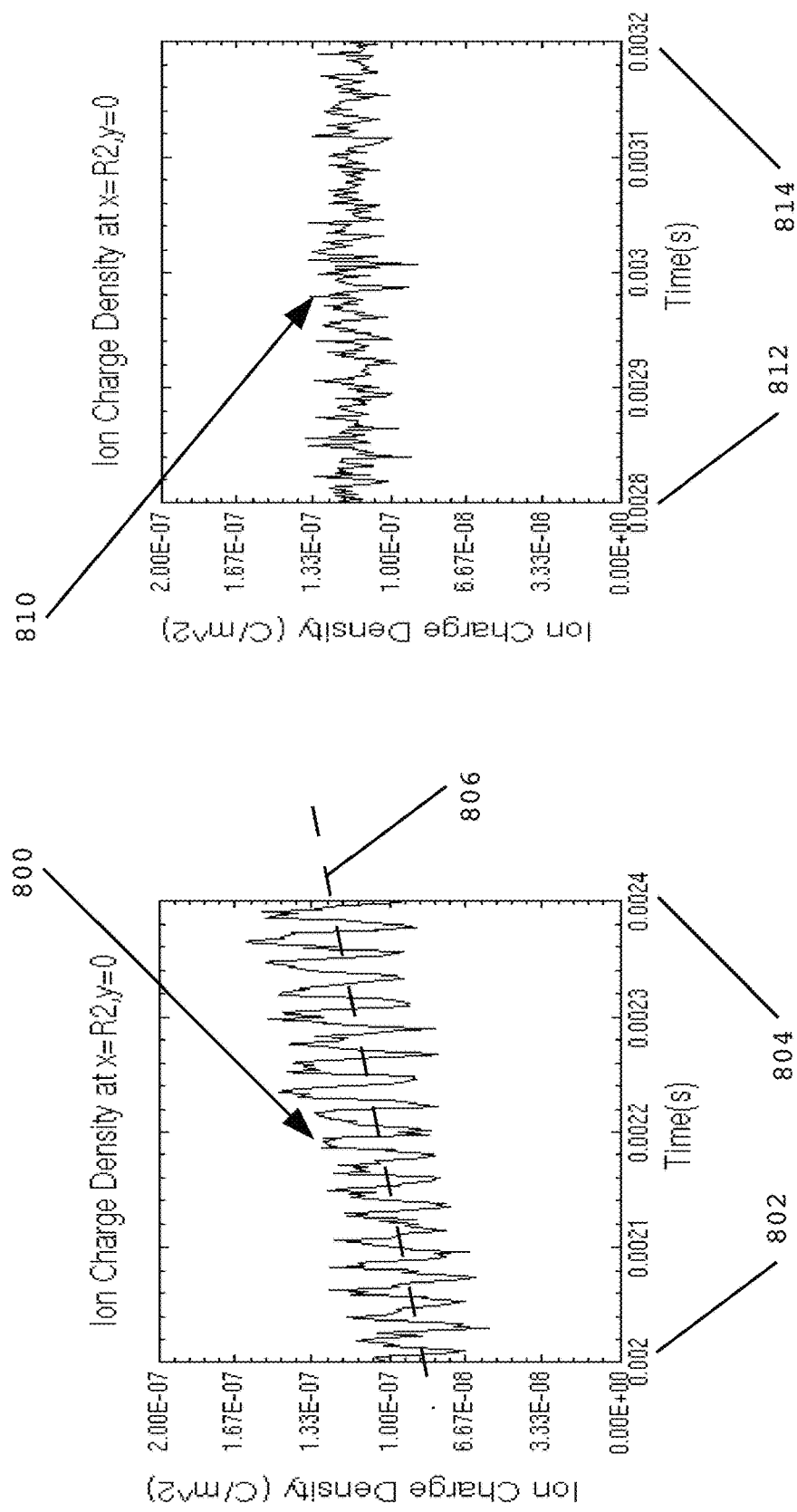

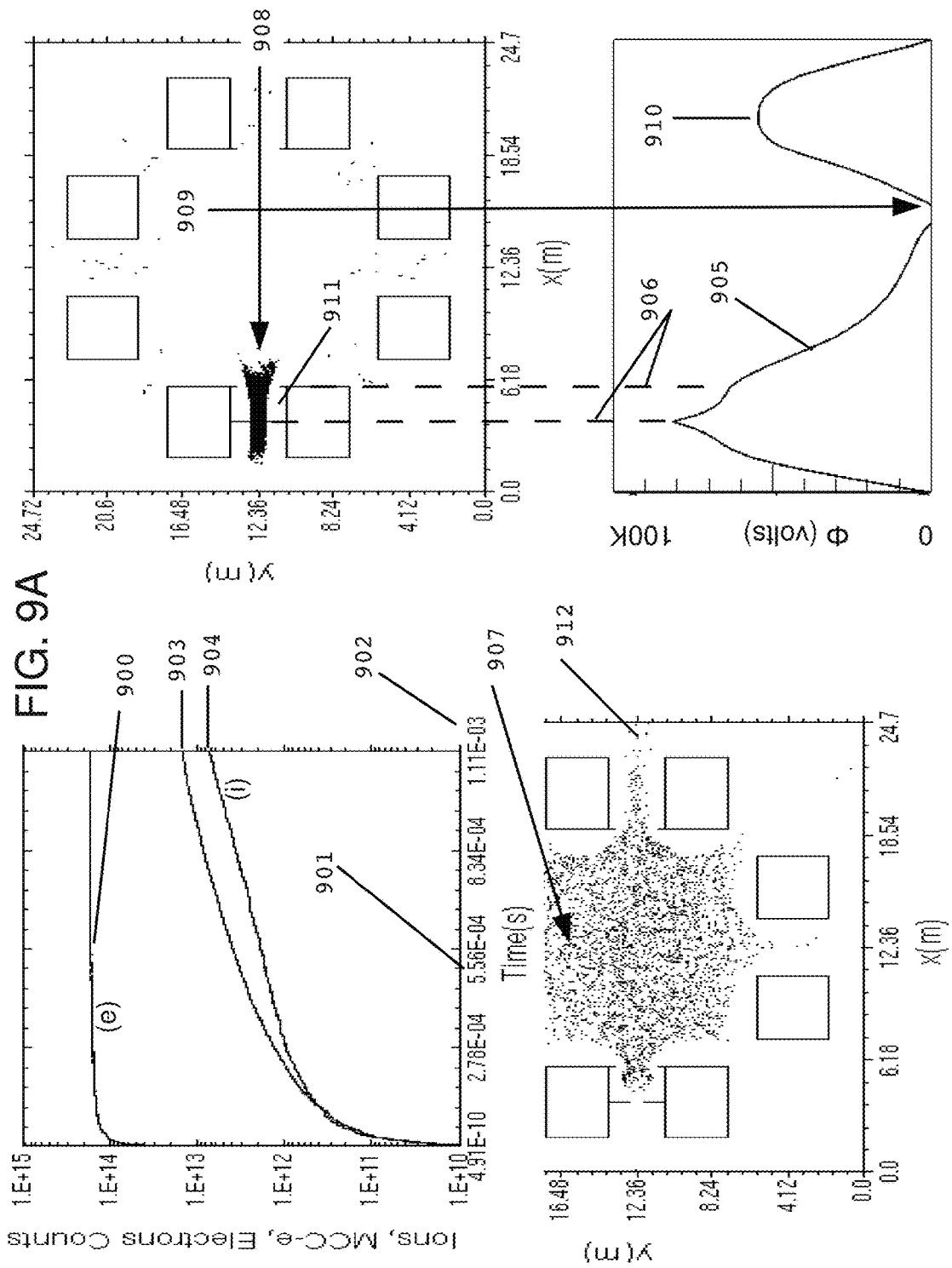

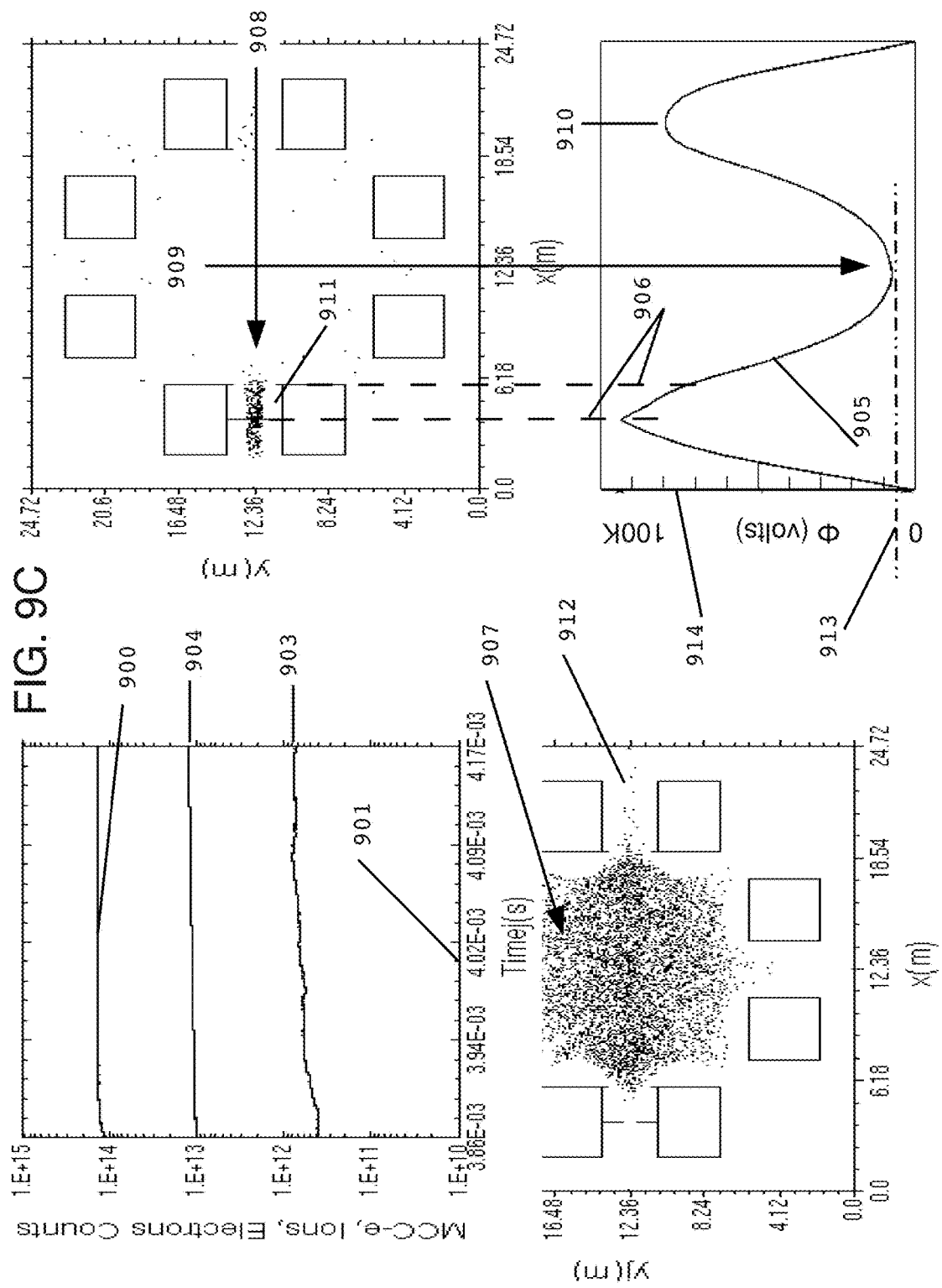

FIG. 9D

929 ___ patP6s30c4d81mr2.inp        // Description block
{
Simulation Source File Created by Joel G. Rogers
21 August, 2016, Second Embodiment
}        // end of Description block
915 ___ Variables
{
916 ___ radiusScale = 30.0        // Magnets' size scaling for predicting breakeven
917 ___ currentScale = 4.0        // Scale magnet current from max in spec
919 ___ diamagneticScale = 0.81 // Fraction of core diameter of B=0 central region
// Coil magnets' description block. Terminology is copied from GMW catalog.
magOD = radiusScale*0.345        // Outside diameter of GMW serial #11801864
magID = radiusScale*0.115 // Inside
magHeight = radiusScale*0.133 // Height
921 ___ magCornerGap = .04*radiusScale        // Gap at 4 almost touching points
938 ___ magScaleF = radiusScale^2        // ^B field scales with coil xc area
918 ___ magCurrent = currentScale*magScaleF*70*466 // Amp-turns according to GMW spec
920 ___ dia2 = diamagneticScale*(magOD/2+magCornerGap)        // B-exclusion square half-dia.
//
// Simulation's parameters block, including macroparticle counts, geometry, etc.
// Geometry drawing pg. 185, Logbook #8, evolved from Spindle Cusp SCFRdw.inp
ElectrostaticFlag = 1 // =0 for electromagnetic, =1 for electrostatic mode
np2cFactor = 1        // increases the weight of particles from dump file
np2c = 8e7*radiusScale // weight per macroparticle from BeamEmitter
922 ___ magTankSpaceX = magHeight/2 // Horizontal clearance magnet to tank

FIG. 9E

```
      magTankSpaceY = magTankSpaceX+magHeight+magCornerGap  // Vertical clearance
      tankIDX = magOD+2*(magCornerGap+magHeight+magTankSpaceX) // Room for T/B coils
      tankIDY = magOD+2*magTankSpaceY // Tank vertical I.D.
981   diameterInCellsY = 64              // y-diameter in cells, must be even
933   cellSize = tankIDY/diameterInCellsY    // Compute PIC cell size from magOD
      x1origin = tankIDX/2-(tankIDX/2)%cellSize // Integerize central x-cell
      x2origin = tankIDY/2-(tankIDY/2)%cellSize // ditto central y-cell
      tankIDX = 2*x1origin  // Horizontal diameter as an even integer of cells
      tankIDY = 2*x2origin  // ditto vertical diameter
993   diameterInCellsX = tankIDX/cellSize   // Nearest even integer to tankIDX
      yRound = 0.5*cellSize        // Shifts magnets Yi up to align w/ cell apertures
      xRound = 0.5*cellSize        // ditto for magOuterAperture below
      //
      // Electron beam electrical parameters definition block
931   elecEnergy = 100000 // Electron energy, either bias or gun volts
      magBias = elecEnergy         //Bias volts on magnets
      Uemax = 3e8*(1+ElectrostaticFlag*(sqrt(((elecEnergy/511e3)+1)^2-1)-1))
      timeStep = cellSize/(Uemax*4)    // Courant condition from Birdsall&L
930   elecIgnitionCurrent = 4.5                                      938
      //
      // Electron emitter/extractor geometrical parameters definition block
932   emitCathodeDia2 = 0 //cellSize   // e-emitter half-diameter
      emitGunInset = 0        // emitter distance from R tank wall
      emitGunUpShift = 0      // shift emitter off axis upward
      emitTemp = 0 //1200*(0.025/300) // @1200degK E=.025eV per roomtemp(300degK)
```

FIG. 9F elecInjectionEnergy = 10.0  // emitted-energy c.f. W work function ...
// = 4.5, must be greater than emitTemp or e's will go out the back of emitter
//
// Gas cell geometrical descriptor block
cellHeight = magHeight/2     // thickness of gas along bore of magnet
cellBoreWidth2 = 2*cellSize // half-thickness gas exclusion outside bore
cellOutset = 0          // distance mag inner face to cell inner face
980 ─── cellOuterApertureL = 2*cellSize   // Left outer aperture
cellOuterApertureR = 8*cellSize   // Right outer aperture
magOuterAperture = cellOuterApertureR // opening in T/B mags
magOuterApertureOutset = magHeight/2 // outer aperture outset from mag face
cellInnerAperture = 6*cellSize      // inner apertures
cellX = tankIDX/2-magTankSpaceX-magHeight+cellOutset-cellSize // shorthand
cellTRtrim = 1*cellSize       // top-right trim on analyticF in MCC
//
// MCC gas properties description block. 1 or 2 gas cells in opposing bores
collisionFlag = 1 // Choose collisionFlag = 0,1 to dis-, en-able MCC code
934 ─── gasCellCountR = 0    // 1 for RHS gas cell, 0 for none R
935 ─── gasCellCountL = 1    // 1 for LHS gas cell, 0 for none L
939 ─── gasPressure = 1e-5   // Torr. Double it for diatomic gas(H2, D2, etc.)
gasDensity = (gasPressure/760)*(6.02e23/.0224) // atoms/m^3 ideal gas
937 ─── gasBkgdDensity = gasDensity*0.001 // Choked aperture reduction factor
gasBkgdDiameterX = tankIDX-2*cellSize // bkgd width < tank dia.
gasBkgdDiameterY = tankIDY-2*cellSize    // ... and must leave room for gas cells
936 ─── ecxFactor = 4.5

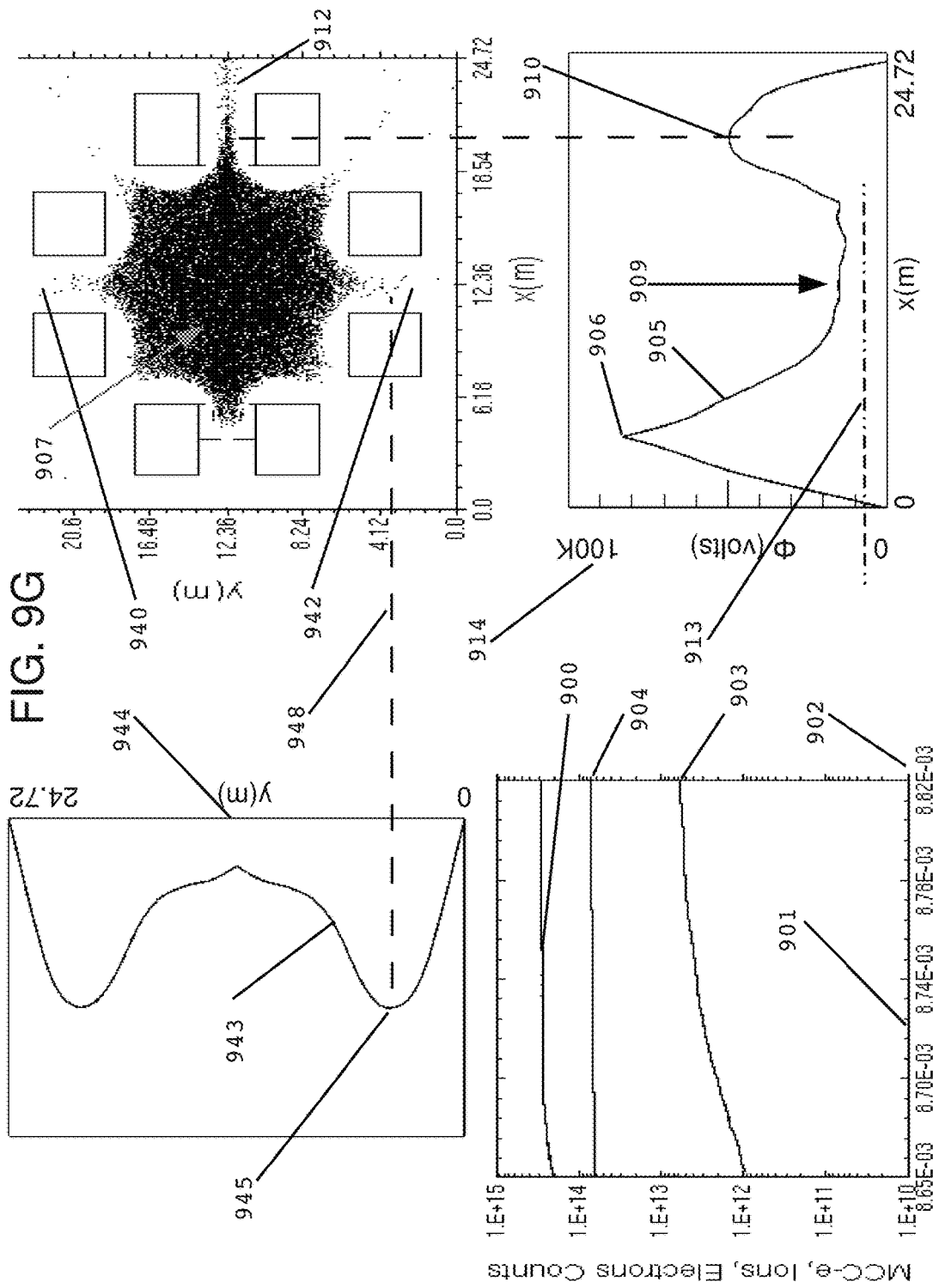

FIG. 9J

```
Control
  dt = timeStep        // Only "timeStep" or literal works here
  ElectrostaticFlag = ElectrostaticFlag  // Copy from Variables block above
  np2cFactor = np2cFactor    // allows increasing weight at load dump time.
925 ─ B01analytic = wS*(-(x2-Y1)/((x1-X1)^2+(x2-Y1)^2)+ (x2-Y2)/((x1-X2)^2+(x2-Y2)^2)- (x2-Y3)/((x1-
  X3)^2+(x2-Y3)^2)+ (x2-Y4)/((x1-X4)^2+(x2-Y4)^2)- (x2-Y5)/((x1-X5)^2+(x2-Y5)^2)+ (x2-Y6)/((x1-
  X6)^2+(x2-Y6)^2)- (x2-Y7)/((x1-X7)^2+(x2-Y7)^2)+ (x2-Y8)/((x1-X8)^2+(x2-Y8)^2) * (1-(step(x1-
  x1origin+dia2)-step(x1-x1origin-dia2)) * (step(x2-x2origin+dia2)-step(x2-x2origin-dia2)))
926 ─ B02analytic = wS*((x1-X1)/((x1-X1)^2+(x2-Y1)^2)- (x1-X2)/((x1-X2)^2+(x2-Y2)^2)+ (x1-X3)/((x1-
  X3)^2+(x2-Y3)^2)- (x1-X4)/((x1-X4)^2+(x2-Y4)^2)+ (x1-X5)/((x1-X5)^2+(x2-Y5)^2)- (x1-X6)/((x1-
  X6)^2+(x2-Y6)^2)+ (x1-X7)/((x1-X7)^2+(x2-Y7)^2)- (x1-X8)/((x1-X8)^2+(x2-Y8)^2) * (1-(step(x1-
  x1origin+dia2)-step(x1-x1origin-dia2)) * (step(x2-x2origin+dia2)-step(x2-x2origin-dia2)))
}           // end Control block
953 ─ Species
  name = electrons
954 ─ m = 9.11E-31    // electron mass
  q = -1.60e-19
  collisionModel = 1
}
952 ─ Species
  name = MCCelectrons
  m = 9.11E-31    // electron mass
  q = -1.60e-19
  collisionModel = 1
}
Species
  name = ions
```

```
955 ─── m = 1.66e-27*2.01    //deuteron mass
      q = 1.60e-19
      collisionModel = 2
      subcycle = (cellSize/(3e8*sqrt(2*elecEnergy/1875e6)))/timeStep/1.5
      // = approx # time steps for D-ion(m=1875MeV) to cross cell/sqrt(2)
      }
950 ─── MCC // gas in one or two gas cells + bkgd gas everywhere else
      {
      collisionFlag = collisionFlag // 1 to enable, 0 to disable MCC
      x1MinMKS = x1origin-gasBkgdDiameterX/2 // create a visible border
      x1MaxMKS = x1origin+gasBkgdDiameterX/2
      x2MinMKS = x2origin-gasBkgdDiameterY/2
      x2MaxMKS = x2origin+gasBkgdDiameterY/2
      gas = H
959 ─── analyticF = gasBkgdDensity+gasDensity*( (gasCellCountR)*(step(x1-(x1origin+cellX-cellHeight)) - step(x1-(x1origin+cellX-cellX))) + (gasCellCountL)*(step(x1-(x1origin-cellX-cellHeight)) - step(x1-(x1origin-cellX-cellBoreWidth2))) )* ( step(x2-(x2origin-magID/2+cellBoreWidth2)) - step(x2-(x2origin+magID/2-cellBoreWidth2-cellTRtrim)) )
951 ─── eSpecies = MCCelectrons  // color low energy electrons
      ecxFactor = ecxFactor
      iSpecies = ions
      x1MinMKS = cellSize
      x1MaxMKS = tankIDX-4*cellSize //round down +ve
      x2MinMKS = cellSize
      x2MaxMKS = tankIDY-4*cellSize //ditto
      }        //end MCC
```

FIG. 9L

```
960__BeamEmitter    // electron emitter w/variable grid-V & divergence
    {
      name = electronEmitter
      normal = -1              // normal = velocity direction: go down
961__ C = elecIgnitionCurrent // emission current in amps
      IdiagFlag = 1    // Accumulates spill on the first segment
      Ihist_avg = DiagTimeInterval/timeStep // time binning unit length
      Ihist_len = 10000             // max number of time bins
      nxbins = 2*emitCathodeDia2/cellSize   // # x-bins spanning seg
      // nenergybins = 100
      // energy_max = elecEnergy         // eV range of 2d diagnostic
962__ A1 = x1origin+tankIDX/2-emitGunInset // Emitter to right of core
      A2 = x2origin-emitCathodeDia2+emitGunUpShift // central - size + shift
      B1 = x1origin+tankIDX/2-emitGunInset // vertical emitter
      B2 = x2origin+emitCathodeDia2+emitGunUpShift // central + size + shift
      units = EV   // Units of velocity below
      v1drift = -elecInjectionEnergy     // big volts for gun, ~0 for filament
      // v2drift = -elecInjectionEnergy // swap x,y for top emitter
      v1thermal = emitTemp
      v2thermal = emitTemp
      speciesName = electrons
      np2c = np2c
      QuseFlag = 0    // Drains off current hitting emitter
    } // end electronEmitter
    //
```

FIG. 9M

```
965 ___ Conductor  // Define rectangular tank enclosing entire region
968 ___ {
966 ___   name = tankWall
          C = 0                              // Ground voltage
          IdiagFlag = 1                      // Accumulates spill on the first segment
          Ihist_avg = DiagTimeInterval/timeStep  // time binning unit length
          Ihist_len = 10000                  // max number of time bins
          nxbins = diameterInCellsY          // # bins spanning 1st seg
          // Horizontal top wall enclosing space below
967 ___   Segment
          {
            j1 = diameterInCellsX
            j2 = 0
            k1 = diameterInCellsY
            k2 = diameterInCellsY
            normal = -1
          }
          // Left and bottom walls' definitions omitted here for patent brevity
          // Vertical right wall
          Segment
          {
            j1 = diameterInCellsX
            j2 = diameterInCellsX
            k1 = 0
            k2 = diameterInCellsY
            normal = -1
          }
        }    // end of Conductor for tank wall
```

FIG. 9N

```
      // Define 8 magnet boxes
970__ Equipotential
      name = magBox
971__ C = magBias              // accelerates electrons into magnets
      QuseFlag = 0             // drain off charge of impacting particles
      IdiagFlag = 1            // Accumulate f(x) spill on first surface
      Ihist_avg = DiagTimeInterval/timeStep  // time bins, scaled from dt
      Ihist_len = 10000        // Time bins in above units
      nxbins = (magID/2-cellOuterApertureL/2)/cellSize //f(x) spatial bins
      nenergybins = 100
      energy_max = 1.2*magBias// eV range of 2d diagnostic
972__ Segment  // outside aperture, #8 coil
      {
         A1 = x1origin-tankIDX/2+magTankSpaceX+magHeight-cellOutset-cellHeight //2
         A2 = x2origin-magID/2                      // initial y
         B1 = x1origin-tankIDX/2+magTankSpaceX+magHeight-cellOutset-cellHeight //2
         B2 = x2origin-cellOuterApertureL/2         // final y
      }
      // Next bottom-left coil =#1, then bottom-right =#2, etc. CCW
      // Coils 3, 4, 7, and 8 have internal gas cell apertures. Define
      //... apertures first, then inside (bore) wall connected to it(them),
      //...then remaining 3 walls of rectangular magnet box.
      Segment  // inside vertical segment, #1 coil
      {
973__ // Similar segments omitted for patent Figure's brevity
      }  // end Equipotential magnet box
```

FIG. 9P

```
// Separate magBox aperture(s) serving as spill measuring electrodes
Equipotential
  name = magBoxAperture
  C = magBias
  QuseFlag = 0              // drain off charge of impacting particles
  IdiagFlag = 1             // Accumulate f(x) spill on first surface
  Ihist_avg = DiagTimeInterval/timeStep   // time bins, scaled from dt
  Ihist_len = 10000         // Time bins in above units
  nxbins = 0.5*magID/cellSize    // # spatial bins for f(x), 1st Segment
  Segment  // mid-bore aperture, #1 coil
  // Segments' details omitted for patent Figures' brevity
  }     // end Equipotential magnet box aperture
  Diagnostic // sample ion density at x=WBradius/2, y=0
  {
    A1 = x1origin + dia2/2 // x-sample at mid radius
    A2 = x2origin          // y-sample vertical center line
    B1 = x1origin + dia2/2 // endpoint same as start
    B2 = x2origin          // ditto
    VarName = ions         // store ion density as a diagnostic
    title = Ion Charge Density at x=R2,y=0
    x1_Label = Time
    HistMax = 10000        // time bins
    save = 1
    Ave = (diameterInCellsX/5)*(cellSize/(3e8*sqrt(2*elecEnergy/1875e6)))/timeStep
  } // end of Diagnostic
}   // end of Region block
```

990 — 991 — 992 — 993 — 994 — 995

APPARATUS AND METHOD FOR CONTROLLING A PLASMA FUSION REACTOR

BACKGROUND

Field of Invention

The invention relates to the design of plasma based fusion energy devices, specifically to apparatus and methods for controlling such devices for the purpose of improving the power-balance of such devices.

Prior Art

Power plants based on nuclear energy hold many advantages over coal-powered power plants. Unlike coal-power, nuclear power plants do not pollute the atmosphere except in extreme cases of nuclear meltdown, such as Chernobyl and Fukushima. The conventional nuclear energy produced by these plants is based on the nuclear fission process which utilizes uranium or plutonium.

In contrast to nuclear fission, the nuclear fusion process does not utilize uranium but is still not well understood by the general public as the alternative to nuclear fission. Unlike conventional nuclear power plants, fusion power plants burn light elements, such as hydrogen, deuterium, and boron, which are safe and plentiful. But even after more than 50 years of research and development, fusion reactors have not yet been shown to be economically feasible. Experimental fusion reactors have not even reached the break-even point. This means that they consume more energy to heat and confine the plasma than the energy they produce as output. At present the most popular method of producing fusion energy is based on the tokamak design. The largest and most ambitious tokamak experiment is the multinational ITER project under construction in the south of France; ITER is planned to cost tens of billions of dollars and will take several decades to complete to the testing phase. Due to recent technical and political difficulties, it now seems likely that the U.S. will stop funding the project.

The Polywell Concept for Fusion Reactor Design

Several smaller research projects, funded in the range of 10-100 million dollars, have been initiated to develop less expensive fusion reactor designs as alternatives to ITER. The most promising of these is the Polywell, invented by the late Robert Bussard. Based on his 1989 U.S. Pat. No. 4,826,046, Bussard founded Energy Matter Conversion Corporation (EMC2) to develop his Polywell invention. EMC2 made good progress until Bussard's death in 2007. EMC2's progress up to that point in time was summarized in Bussard's final patent application, US20080187086A1, "Method and Apparatus for Controlling Charged Particles," hereinafter called Bussard-2008. A number of small-scale Polywell reactors were built and tested under Bussard's direction, culminating with the reactor named WB-6. WB-6 demonstrated an impressive level of fusion energy output, as described by the following [numbered] paragraphs from Bussard-2008:

" . . . For this operating period, the data show that the fusion rates produced in these tests were very large, typically at about 1E9 DD fusions/sec. This is over 100,000 times larger than results obtained in the much earlier work by Farnsworth/Hirsch [1966/67] at similar drive conditions."

Bussard measured the fusion rate of WB-6 using a standard method of detecting and counting neutrons. The energy output of a fusion reactor can be calculated from the measured neutron rate using the known fusing characteristics of the nuclear fuel burned. WB-6 was fueled by fusing deuterium with deuterium (DD). The high rate of neutrons claimed in Bussard-2008, as quoted in the previous paragraph, created optimism that the WB-6 scale model could be scaled up in size to make a break-even reactor.

At the time of Bussard's death, a crucial issue still remained with WB-6, namely the power wasted by electrons lost to its "metal joints" supporting its coil-magnets. This electron loss problem was solved by the 2015 patent U.S. Pat. No. 9,082,517B1 issued to Rogers, "Modular Apparatus for Confining a Plasma," hereinafter called Rogers-908. Rogers-908 claimed an improvement to the WB-6 design, made by omitting the "metal joints" holding the coils together. Although Bussard-2008 stated "finite electron loss can be tolerated" from "metal joints," Rogers-908 disclosed that such losses were very harmful to the power-balance, and that the losses could be eliminated by improved apparatus. (Power-balance is a useful measure of reactor performance, defined as the ratio of fusion-power-output to drive-power-input.)

By omitting the "metal joints," the Rogers-908 design was shown theoretically to have reduced electron losses compared to the Bussard-2008 design. Reduced electron losses increases the power-balance of the design. Increased power-balance will lead to a smaller size for a net power reactor. To be superior to the ITER design, the Polywell design must lead to a net-power reactor smaller than ITER, or cleaner than ITER, or both. According to its construction plans, ITER will be quite large, about 25 meters in diameter. Not only will ITER be quite large, it will not be clean. It will burn radioactive tritium fuel and produce radioactive byproducts activated by fusion-emitted neutrons.

After Bussard's death in 2007, development work on Polywell continued in the EMC2 company. For the first 7 years after Bussard's death, the Company was funded by the U.S. Navy. As long as the Navy funding continued, no public disclosures of progress on Polywell development were made. This was a dark period of secret development inside the Company. Navy funding was withdrawn in mid-2014. Shortly thereafter, Company president, Dr. Jaeyoung Park, delivered a 40-minute lecture-presentation on EMC2's final progress at a scientific conference held at the University of Wisconsin.

Status of Recent Polywell Testing in EMC2

Dr. Park's October 2014 presentation was attended by approximately 50 scientists, including the Applicant. The official transcript of Dr. Park's presentation, hereinafter called Park-2014, was published on the World Wide Web. Dr. Park's title slide is reproduced as FIG. 1A. Each slide has a title at the top, as indicated by the arrow (20), and a sequence number at the bottom, in the position indicated by the other arrow (22). The sequence number of this title slide is "1", faintly visible at the head of the arrow (22).

FIG. 1B reproduces Park's seventh slide, entitled "Wiffle-Ball 7 Results" at the top (30). A word of explanation is needed here on the common usage of the term "Wiffle-Ball." The "WB" of WB-6 and WB-7 is an acronym for "Wiffle-Ball." The "Wiffle-Ball effect" is a term coined by Bussard to describe the theoretically predicted expansion of the plasma volume by diamagnetic-plasma effects. Bussard claimed the Wiffle-Ball effect would reduce electron losses and thereby increase power-balance. (The familiar toy Wiffle Ball has a property of trapping a marble inside for many bounces.) In subsequent usage, including in this Application, "Wiffleball" is used both as an adjective and as a noun. As a noun, Wiffleball refers to the physical shape of a plasma ball inside the reactor.

The box in FIG. 1B (32) states Park's important conclusion that his testing of WB-7 "confirms WB-6 results." By this statement Park was saying that his tests of WB-7 had confirmed Bussard's previous testing of Bussard's WB-6. This was an important result because Bussard's WB-6 testing had terminated prematurely with the accidental destruction of his test device due to overheating. Though Bussard claimed success, his WB-6 data were subsequently criticized as being unconvincing due to lack of statistical precision. At the time it self-destructed, WB-6 had only detected a few neutrons, some of which might have been noise. Park's measurements on WB-7, which he made to be identical to WB-6, detected "164 neutron counts" (36), as opposed to only a handful detected by Bussard. This overcame the criticisms of Bussard's claimed success, making both WB-6 and WB-7 successful.

The final Polywell model constructed at EMC2 was WB-8. Model WB-8 was designed to be an improved version of WB-7. The results of WB-8 testing are shown in FIG. 1C, reproduced from Park's Slide-8. This slide was entitled "Wiffle-Ball 8 Experiments" (40). The key "improvement" of WB-8 over WB-7 was the mounting of new apparatus for supporting the magnet coils, shown in schematic drawing (42). As stated in the box (44), the coils were supported "without joints." Prior to WB-8, coils were supported by metal joints, a typical one of which is indicated for WB-7 in FIG. 1B, reference line (34).

The important improvement of omitting "metal joints" followed the teaching of the Rogers-908 patent. While still pending, Rogers-908 was published as an application 2010/0284501A1. This publication appeared four years prior to Park's report on WB-8 results, as shown in FIG. 1C. The Rogers publication 2010/0284501A1 made clear that the metal joints in WB-6 interfered with the required recirculation of electrons. Rogers-908 substituted "hollow legs" to replace the traditional metal joints.

Park's apparatus for supporting the WB-8 magnets is shown in FIG. 1C (42). Twenty-four hollow legs connect six magnet coils to the vacuum-tank walls. The hollow ends of two typical legs are labeled in FIG. 1C by reference line (46). According to the teachings of Rogers-908, hollow legs are the preferred means to support the magnets. The legs are positioned in the shadows of the coil containers, thereby avoiding impacts from circulating electrons.

Slide-9 of Park-2014, reproduced as FIG. 1D, was entitled (50) "Comparison of WB-7 and WB-8." As stated in the box (52), WB-8 demonstrated significantly reduced electron losses, as measured by "grid current" graph (53), as well as much improved plasma density. It is well known that the fusion power output from a plasma is proportional to the square of plasma density (54). Thus, improved density was deemed very important to increase the power-balance. This improvement in density was expected to produce a comparable improvement in power-balance. Surprisingly, WB-8 proved unsuccessful at confining ions. It produced no detectable neutrons and therefore demonstrated zero power-balance.

FIG. 1E reproduces Slide-12 of Park-2014. Park's final conclusion about WB-8 is displayed in a box (60) at the bottom of the slide. In the box (60), Park wrote, "Grid biasing does not look promising for Potential Well formation." This was Dr. Park's final statement about WB-8. It is a very pessimistic conclusion. Grid bias is essential for electron recirculation. It is one of the most basic and essential features of Polywell designs. If Park were correct, it would mark the death of Polywell as a potential energy source.

To refute Dr. Park's conclusion, the present Specification will show that Dr. Park gave up on Polywell prematurely. The method of operation used by Dr. Park contained a fatal flaw not recognized by Park. The following sections of this Specification will describe this previously unrecognized problem and present apparatus and methods that cure the problem.

About the time of his 2014 oral presentation, Dr. Park filed a patent application, published as US20150380114A1, hereinafter called Park-2015. Park-2015 explicitly forbids grid biasing as a component of his claimed invention. In reference to his "FIG. 4," Park-2015 states the following:

"The apparatus in FIG. 4 comprises a vacuum enclosure (reactor chamber) 101, coils 102 . . . . Each coil system 102 is supported by mechanical support structure 109, which includes a power delivery and cooling system 110 . . . . It is noted that the embodiment as shown in FIG. 4 does not utilize electrodes within the vacuum enclosure 101." Here ends the quote from Park-2015.

The final sentence of the above quote plainly forbids "electrodes within the vacuum enclosure." This exclusion would make grid biasing impossible with the apparatus of Park-2015. Without grid biasing, the device claimed by Park-2015 is NOT a Polywell, but rather it is some untested device only loosely related to Polywell.

The apparatus and method to be disclosed in this Specification will solve the unrecognized problems with WB-8, thus rescuing Polywell from Park's dire prediction.

"Scaling" as Determined by Full-Scale Simulation

"Scaling" is a term describing the increase of power-balance with reactor size. Power-balance is the ratio of fusion power output to drive power input. Costs of fabrication and operation increase with size, approximately in proportion to the volume of the reactor. "Scaling" measures the cost of raising the power-balance by increasing the reactor size to obtain net-power. A practical Polywell design must demonstrate power-balance in excess of unity. It is also desirable that it demonstrate a price-to-performance ratio superior to competitive fusion power plants, such as ITER. If the fusion power output of small-scale models increases too slowly with size, or if the drive power increases too steeply with size, a full-scale reactor will be too big and expensive to be practical.

EMC2's testing of the small-scale models, WB-6 and WB-7, showed that the small-scale Polywell designs are capable of producing small amounts of fusion power as measured by neutron rate. Because of the expense of building larger scale-models, directly measuring scaling proved to be beyond the reach of EMC2. For the moment, scaling can only be investigated in computer simulation, not in measurements. The improved design disclosed in this Application is based on computer simulation.

FIG. 1F shows a cutaway drawing of a small-scale Polywell reactor, approximately the same size as those tested in EMC2. The performance of this reactor was analyzed by computer simulation in the specification of a 2016 patent U.S. Pat. No. 9,406,405B2, hereinafter called Rogers-940. The main components shown in FIG. 1F are vacuum tank (130), electron emitter (132), coil electromagnets (134), and fuel-gas-cell (136). Five electromagnets are shown (134). A sixth magnet, not shown, is cut away from the drawing to reveal what is shown inside the tank.

FIG. 1F also shows hollow legs (138) supporting the magnets. These legs hold the magnets at fixed positions inside the tank. The legs are hollow so they can carry services to the electromagnets. They are shielded by the magnets' magnetic fields so that they do not intercept any of the orbits of the plasma particles. Because they were so shielded, they were ignored in simulating the power-balance of the model reactors. Legs would obviously be important components in real reactors but were omitted from simulations to speed computation. More details on the legs can be found in the specification of Rogers-908.

FIG. 1G shows snapshots of electron distributions (140, 142) inside two different sizes of small-scale reactors. The simulation on the left (140) is for a reactor about the size of WB-7. The simulation on the right (142) is for a reactor about the size of WB-8. The overall sizes of the simulated reactors are indicated by the full-scale values marking the two tanks' dimensions (144, 146). These tank sizes differed by a factor of two. Tank size is the most important parameter determining the cost of model construction. Another important parameter is the size of the magnets inside the tank. The magnets (134) increase in size by the same factor-of-two as the tank size increases from left-hand to right-hand panels of FIG. 1G. Some of the operational parameters were varied when expanding the scale of the reactors by a factor of two. For example, the size of the aperture confining the fuel gas (136) was made smaller as the reactor size increased from left to right-hand panels. The bias voltage on the magnets stayed the same as the size increased between the two simulations. The three parameters just named, magnet size, aperture size, and bias voltage, are typical examples chosen to illustrate the many operational parameters that may or may not change with scaling toward net-power. Some parameters increase, some decrease, and some remain the same as the scale of the reactor increases.

Choosing values of these many parameters constitutes a METHOD of increasing the scale of the reactor toward net power. The method shown in FIG. 1G is flawed. The size of the plasma ball (142) is smaller than the size of the plasma ball (140), relative to the increasing size of the tanks (144,146). This relatively smaller plasma size is indicative of a general plasma-shrinkage problem which grows as the reactor size grows. Shrinkage is bad. If the size of the plasma does not increase in proportion to the size of the magnets, the power output will not increase enough to balance the rising power consumed by the magnets. The shrinkage of the plasma ball ruins the power-balance more and more as the size grows. This shrinkage is a little recognized problem with the prior art of reactor development. Careful establishment of a Wiffleball must be done during start-up of large-scale reactors to maintain the plasma size. Without the Wiffleball, the reactor size cannot be increased enough to obtain net power.

FIG. 1G shows simulations of small-scale reactors typical of the ones tested in EMC2. If WB-8 had produced measurable energy, its power-balance would have been compared to that of WB-7. Comparing measurements of scaling between the two small-scale reactors would have shed light on the scaling to be expected in a full-size, net-power reactor. Building a full-scale reactor was too expensive to be attempted by EMC2. Fortunately, simulations are not bound by the same financial constraints. It is no more expensive to simulate a large scale reactor than it is to simulate a small scale reactor. Even if WB-8 had produced measurable energy, it still would have failed to demonstrate scaling due to the shrinkage problem described in the last paragraph. Simulations by the Applicant, to be disclosed in this Specification, have since been carried out to find a solution to the shrinkage problem in full scale reactors.

The only prior report of full-scale simulation was presented orally by the Applicant at an international Workshop on Oct. 28, 2015. An official, written version of this presentation, hereinafter called Rogers-2015, appeared on the web following the Workshop. FIGS. 1H and 1J of this Specification reproduce portions of Slide-11 of Rogers-2015. Reference numbers were added in adapting the original slide to be FIGS. 1H and 1J.

FIG. 1H (100) shows a snapshot of electron-particle positions inside a full-sized Polywell reactor. Simulated electron-particles originate in an electron emitter (102) mounted on the right-hand vacuum-tank wall (103). Eight rectangles of conductors simulate boxes containing electromagnets, one of which is indicated by reference lines (104). The magnet (104) squeezes the incoming electrons into a thin beam which crosses through the tank center (108) from right to left. The distribution (100) is a snapshot of a dynamic plot generated by a commercial software package. While the software runs on the computer, the black dots move step by step on the computer screen, one step in position after each time-step.

On the right-hand side of center, the entering beam closely followed the center-line of the distribution. Just to the left of the arrow-head of (108), the beam's trajectory abruptly departed from its original, straight-line path. After the beam crossed the center, it wandered above and below the center-line in a random fashion. From time to time, the beam even turned back toward the right. This wandering is caused by a well-known instability in charged particle beams passing through a plasma. The instability, known as the diocotron instability, caused the beam to wander randomly after it passed the center of the tank.

In a 1965 article entitled "Diocotron Instability in a Cylindrical Geometry," Levy analyzed the effect of the instability on electron beams in electron accelerators. Levy concluded "proper selection of dimensions and potentials can ensure stability [of the beam] against the diocotron effect." In the prior art of 1965, the diocotron instability was considered a nuisance because it disturbed electron beams.

At the time of publishing Rogers-2015, the discovery of this instability in Polywell was only a curiosity. Only later, in this Specification, was it shown to be the key for solving a major problem with large-scale Polywells. As described in the next section of this Specification, an unrecognized problem, called "cusp-trapping," was discovered in the prior art. The diocotron instability turned out to provide the solution to the problem.

The reactor size simulated in FIG. 1H was chosen to be big enough to potentially demonstrate net power. The diameter of the cubic vacuum tank containing the reactor is shown by the maximum scale value (126). This size, 24.2 meters (m), is approximately the same size as ITER. Polywell has an advantage of a much simpler geometry, plus an advantage of burning advanced fuel such as DD. These advantages will make Polywell superior to ITER, both in price and performance.

Research on Polywell in Iran

Since about 2010 Polywell research has been active at the Nuclear Science and Technology Research Institute, AEOL, in Tehran. Their latest publication was submitted by first author Fatemeh Kazemyzade as a poster presentation to the 26th IAEA Fusion Energy Conference held Oct. 17-22, 2016 in Kyoto. The title of the presentation was "The Optimization of Ion and Electron Guns Voltage in a Polywell Fusion Reactor." At the time of the writing of this Specification no further information about the material submitted to the conference was available.

A previous publication by the same first author plus seven other Tehran researchers appeared in the 2012 Journal of Fusion Energy. This paper, entitled "Dependence of Potential Well Depth on the Magnetic Intensity in a Polywell Reactor," was the first to demonstrate the plasma shrinkage problem discussed in the previous section. This paper also used OOPIC Pro simulation software to show that the size of the plasma ball shrank drastically for an increase of a factor of ten in applied magnetic field strength. They simulated magnetic fields strengths of 0.25 and 2.5 Teslas.

Although the 2012 Iranian publication demonstrated plasma shrinkage, the authors did not recognize it as a problem to increasing the scale of Polywell. The small-scale simulation technique they used followed closely the simulation disclosed by Rogers-908, which was published by the USPTO as 2010/0284501A1. This early OOPIC simulation did not include diamagnetism and so did not simulate the Wiffleball effect. Without the Wiffleball effect, the Iranian researchers would not find a solution to the shrinkage problem.

Polywell Development in Convergent Scientific Incorporated (CSI)

Another small company, CSI, founded in 2010, has been actively involved in Polywell development. In 2015, CSI's Chief Technical Officer Devlin Baker announced a breakthrough in Polywell theory. CSI had discovered that all existing Polywell designs suffered from a flaw which would explain the failure of WB-8 to produce neutrons. Later in the prior art, the flaw came to be known by the term "cusp trapping." The CSI announcement was made in a video web broadcast at http://sproutvideo.com/videos/a49bdbbf101be7c22c. The audio portion of this broadcast was transcribed by the Applicant and published in Rogers-2015, with due credit given to CSI. The following is a quote from Rogers-2015, quoting CSI's remarks:

" . . . simulations done at the beginning of 2014, . . . showed that as we approached high densities needed for actual reactor grade performance, in devices of that size, we had a lot of problems actually getting the electrons into the system . . . . There are some pretty fundamental and pretty rock-solid arguments [in the literature] that it is really hard to heat a non-neutral plasma to fusion relevant densities and temperatures with electron beam heating alone. From these scaling laws, which incidentally agreed quite well with our[CSI's] simulations, we found that electron beam injection alone probably won't be an effective way to heat a Polywell up to reactor scale, so we are looking for ancillary ways to do that . . . . "Here ends Devlin Baker's quote as transcribed in Rogers-2015.

Cold electrons are continuously produced in the core of Polywell reactors. A major source of cold electrons comes from the ionization of fuel gas in one or more internal gas-cells. The ionization feeds ions into the core at a rate that balances the loss of ions by leakage out the cusps. Cold electrons are left behind as unwanted byproducts by the process of producing fuel ions.

A second source of cold electrons is down-scattering of electrons from other electrons. Cold electrons produced by down-scattering degrade the power output of the reactor. If not removed, cold electrons from both sources collect in the cusps, the effect now known as cusp-trapping. Cusp-trapping reduces the voltage of the accelerating potential that heats the ions. When the ions cool, the power output drops.

In the prior art, Polywell designs had no mechanism for removing cold electrons. The concentration of cold electrons built up in the outer region of the electrostatic potential formed by the hot electrons. Concentrated there, their electric field repelled the injection of additional hot electrons. Without continuous injection of hot electrons, the potential well, needed for ion acceleration, disappeared.

In a series of articles published in Russia, the diocotron instability was proposed as a possible solution to the problem of cusp-trapping as it was known to exist in a class of Russian fusion reactors called "electromagnetic traps." The Russian literature was summarized in a 1994 review article by T. J. Dolan, hereinafter called Dolan-1994. Dolan-1994 stated the following in reference to the diocotron instability: "2.5.4. Cold trapped . . . electrons produced by ionization of neutral gas tend to become electrostatically trapped in the anode [cusp] region . . . , but the diocotron instability may help remove cold trapped electrons without seriously impairing hot electron confinement." (end of Dolan-1994 quote).

Dolan recorded the conditions required to pump out cusp-trapped electrons from the cusps. For this Dolan credited Yushmanov's publication, "The influence of electron capture in gaps on the efficiency of the magneto-electrostatic trap." In equation (28) Dolan elucidated the conditions for successful diocotron pumping. The essence of Dolan's eq. (28) was to specify that the length of the magnets' bores should be at least five times greater than the radius of the bores.

In FIG. 1H the magnet openings, typical ones of which are labeled (106), were made long and narrow. This shape contrasted sharply to the magnets of WB-8 as shown in FIG. 1C (42). WB-8 had very wide magnet openings compared to their lengths.

The modified shape for the magnet openings did not solve the cusp-trapping problem in Polywell. In its top right-hand panel FIG. 1H (110) shows a curve which graphs the value of the electrostatic potential $\phi$ as a function of position across the horizontal mid-line of the electron distribution (100). The potential $\phi$ has two peaks (111), each located midway through the horizontal magnet openings (106). The peaks (111) are local maxima of ions' potential-energy along the center line of the reactor. The action of the potential is to trap ions in a potential well, centered at the center of the reactor (108).

Negatively charged electrons experienced a force equal in magnitude but opposite in direction to the positively charged ions. Thus, the positions of the two peaks in curve (110) mark the position of minima of potential-energy of electrons. The two peaks (111) appear inverted to electrons and act like local potential wells trapping electrons. As a result of the action of the universal electric force on charged particles, cold electrons became trapped at the positions of the peaks. Once trapped in the magnet bores (106), cold electrons can't leave until they acquire kinetic energy, either from the beam or from passing electrons recirculating through the bores. Until the trapped electrons acquired kinetic energy in amounts greater than the depth of the potential well, they remained trapped.

The curve (112) in the lower right-hand panel of FIG. 1H is a graph of the electrons' density as a function of position along the same central line through the electron distribution (100). The density curve (112) has two maxima, marked (114). These peaks align with the peaks in the potential function (111). The electron density at the peaks (114) is very large compared to the density (116) at the center of the tank (108). This concentration of electrons in the cusps (114), along with the scarcity of electrons at center (116), is a clear indication of failure of this Polywell design. The low central density of electrons (116) corresponds to a low overall density of ions. It is a well-known characteristic of bulk plasmas that the density of ions is approximately equal to the density of electrons. This feature of bulk plasmas is known as "quasi-neutrality." The effects of quasi-neutrality can be seen by comparing FIG. 1H with FIG. 1J.

FIG. 1J shows a snapshot of the distribution of ions (120) made at the same time as the electrons in the previous FIG. 1H. Judging from the similar spacing of the black dots at the center of the two distributions, the central electrons' density (108) is the same as the central ions' density (122). The ions are uniformly distributed inside a sharp boundary (120) located just inside the inner faces of the magnets (124). Only the electrons are concentrated in cusps (114). The ions, on the other hand, are uniformly distributed, matching the electrons' density in the central region (108 & 122). By this comparison, the electrons' central density was shown to be very low due to cusp-trapping. This makes the ions' density uniformly low, causing an unacceptably low power output from the reactor. This was a universal problem with the prior art, almost certainly explaining the failure of WB-8 to produce measurable fusion yield.

The Essential Importance of Wiffleball Formation

The section before the last section of this Specification described step-by-step "scaling" from small-scale to large-scale model reactors as the accepted method to develop net-power reactors. The objective of scaling was to produce net power from the smallest possible reactor. Methods have been tried for optimizing the performance of each small-scale model. A sequence of "start-up" adjustments takes the small-scale reactor from cold and empty to hot and full of plasma. "Start-up" occurs over a time interval of one to ten milliseconds, with longer times for bigger reactors. Simulation has shown that the time interval for start-up is governed by the limited rate of production and diffusion of ions born from an internal gas-cell.

Following the start-up sequence, the reactors enter a second phase of operation called "steady-state." In steady-state the plasma density and temperature remain constant for long times. In real-world reactors, steady-state can last as long as weeks, months or, conceivably, years. During steady-state, electrons and fuel ions will be continuously fed into the reactor and fusion energy will continuously flow out of the reactor.

To avoid the problem of plasma-ball shrinkage, introduced in the section before the previous section, the start-up sequence must include the shaping of the confined plasma into a "Wiffleball" configuration. "Wiffleball" is a term coined by Bussard in a paper published in 2006 in the Proceedings of the International Astronautical Congress (!AC), hereinafter called Bussard-IAC. As previously referenced, the word Wiffleball is the same as the name of a familiar toy. The toy Wiffle Ball is a hollow, spherical shell with regularly spaced holes penetrating the shell. The surprising characteristic of the toy Wiffle Ball is that marbles can be trapped inside the shell for many bounces. Even though the marbles are smaller than the holes, they do not fall out when the ball is shaken. They bounce back and forth inside until they happen to line up perfectly with one of the holes; then they fall out.

Conceptually, Bussard's Wiffleball has an analogous characteristic. Electrons are trapped for many bounces inside an externally-applied magnetic field. The magnetic field has cusp holes along radial lines through the centers of the coils. An electron will only exit when its velocity vector happens to line up closely along the center line of one of the holes. The electrons do not come out for a long time. They stay trapped for many bounces.

The beneficial effect of Wiffleball formation has been verified experimentally at the Kharkov Institute in Ukraine. Lavrentev described the effect in a 2007 publication entitled "Multi-slit Electromagnetic Trap 'Jupiter 2M3'," hereinafter called Lavrentev-2007. The following is a quote from Lavrentev-2007:

"The reduction of electron and ion losses from the trap with growth of plasma density is the result of replacement of the magnetic field in the central region of the trap with growth of plasma density. The collisions of particles in the volume of the superseded magnetic field do not provoke electron losses across a magnetic field. Only particle collisions in a thin (of the order of Larmor radius) transitional layer allow electrons to pass in diffusion volume. With growth of plasma density the volume of the superseded magnetic field increases, and the width of a Larmor layer decreases because of an increase of the magnetic field intensity at the border of the transitional layer. This effect does also cause the reduction of particles [sic] losses with growing plasma density. Similar effect should be observed also with an increase of the sizes of electromagnetic trap." Here ends the quote from Lavrentev-2007.

It would be obvious to one skilled in the art of plasma physics that Lavrentev was aware of the Wiffleball effect by the time of the publication quoted above. Lavrentev's statement that "the volume of the superseded magnetic field increases," in the above quote described Wiffleball expansion without actually using Bussard's words for it. Development of electromagnetic traps, with a view toward making a fusion powered reactor, was documented with regular publications from the Kharkov Institute until a few years before Lavrentev's death in 2011. Shortly after his death, S. A. Vdovin of Kharkov summarized Lavrentev's contribution in an article entitled "Lavrentev's Electromagnetic Traps," published in July 2011. The abstract of the article reads in part, "Computation builds [sic built?] on near-classical transport of electrons found that electromagnetic trap-reactor has acceptable engineering requirements. Electromagnetic traps could be used for neutron generator and heavy ion sources." Despite vague wording and probably poor translation, it appears from the abstract that Lavrentev's approach to fusion energy was officially abandoned at Kharkov after his death. This can be judged from the fact that Vdovin's wording "neutron-generator" is a familiar term frequently used in an attempt to find some use for a disappointing energy research project.

FIG. 1K is copied from "FIG. 16" of Bussard-IAC, showing two alternate ways of forming a Wiffleball during start-up. The upper panel (150) shows a method in which the applied magnetic field $B_0$ is held constant during start-up. The lower panel (152) shows a method in which the applied magnetic field $B_0$ (154) is increased during start-up. Both methods result in the gradual exclusion of the total-magnetic-field lines (156) from the interior of a sphere. The expanding field lines (156) carry the confined plasma (not shown) with them as they move outward from center during the time of start-up. The plasma expands to fill a spherical volume just inside the inner surfaces of the coil magnets. Neither of these methods has been tested in an actual Polywell. The method in which the applied B-field is varied (152) has been tested theoretically by the Applicant and found to cure the shrinkage problem. The shrinkage problem was described previously in the section of this Specification entitled "PRIOR ART—'Scaling' as Determined by Full-Scale Simulation." Wiffleball formation by the method of (152) has been validated and is shown below to cure the shrinkage problem.

It should be noted that the representation of the "Pure Wiffleball" (158) in FIG. 1K was only a suggestive cartoon, not a precise representation of B-field geometry to be expected in a real reactor. Bussard described the reduction of electron losses as being caused by the shrinkage of the diameters of cusp holes (160) as the diameter of the field-free volume expanded. Lavrentev-2007, quoted above, described the reduced losses as arising from the fractional increase in the volume of plasma in the "superseded" volume of the core. Lavrentev was saying that the losses of electrons by scattering into the cusp holes only occurs from a thin surface layer, and that the volume of the layer gets relatively smaller as the superseded volume expands. Despite a minor difference in point-of-view, Lavrentev and Bussard were obviously describing the same effect.

FIG. 1L shows a prior-art simulation of the Wiffleball effect taken from slide-8 of Rogers-2015. The two panels on the left show snapshots of the magnetic field Bx (170) and electrons'-distribution (172) made early in the start-up sequence. The two panels on the right are analogous snapshots made late in the start-up sequence. At the later time, the reactor had reached steady-state conditions, meaning that the applied magnetic fields had been increased to the maximum value permitted using scaled-up, commercial magnets. In the two top panels, the curves (170) and (180) are graphs of the values of the horizontal components of magnetic field vector, Bx, plotted as a function of horizontal positions across the center of the reactor. In the bottom panels, the corresponding snapshots of electrons' positions (172,182) are shown.

The maximum scale value (126) on the horizontal axis is 24.2m, the same size as shown previously in FIGS. 1H and 1J. The simulated reactor in FIG. 1L is approximately the same size as ITER. If Polywell is to compete successfully with ITER, Polywell must produce net power from this size reactor. The amount of power produced depends critically on the strength of magnetic field just outside the plasma surface.

In the top-left panel, magnetic field values along the vertical axis (176) range from −3.00E-03 to 3.00E-03. By the convention of the simulation, magnetic fields are displayed in scientific notation and in the standard magnetic units of Teslas (T). Substituting the more common decimal notation for the computer's scientific notation, the vertical scale ranges from −0.003T to 0.003T. These B-field values are very small for magnets of such large size. Magnets of this size are capable of fields 1000 times higher than the ±0.003T field shown. In actual reactor operation, these small B-field values would be applied, at early times, by turning down a knob on the magnets' power supply to select a small fraction of its maximum capability. Such small values are called for in the early phase of Wiffleball formation, according to the "varying B-field method" of Wiffleball formation discussed in connection with the cartoon in FIG. 1K, reference 152.

According to the prior-art's method, the applied magnetic field is controlled to rise with time during start-up. The rising is programmed to stop when the power supply reaches the full current capacity of the magnets. The full current capacity of the magnet coils is determined by the engineering limitations of how much water, or other coolant, can be pumped through the magnets to cool them. Commercial magnet suppliers specify the maximum current for each magnet they sell. The right-hand panels of FIG. 1L show the simulation for the large-size reactor driven at the maximum capacity of the commercial power supplies. The curve (180) in the top-right panel shows the x-component of the net magnetic field. The field is zero across the central region (186) due to the diamagnetism of the plasma.

Diamagnetism cancels the applied field inside the outer boundary of the quasi-neutral plasma (182). The zero-field region is indicated by the arrow (186). Outside the central region the simulated B-field is not-affected by diamagnetism. The field reaches a maximum value of about 3T, marked (184) on the vertical scale. This field was set to be exactly 1000 times stronger than the field at the same position in the left hand panel. Outside the central region the low-field and high-field curves look the same because both the applied B-field and the ordinate axis limits (176) were scaled up by the same factor. A factor of 1000 reduction from the manufacturer's maximum field was chosen to make the initial electron distribution (172) stable in time and left-right symmetric. Stability is an important characteristic of the plasma at all times from time-zero on. Stability allows the rate of change of the magnetic field to be slower than the inductive time constant inherent to coil magnets. The time variation of the field can be paused indefinitely during start-up to let the plasma and magnets stabilize in time.

Diamagnetism is a familiar plasma characteristic, spontaneously arising in a quasi-neutral, magnetized plasma whenever the plasma density becomes high enough. Inherent zero-resistivity of plasmas leaves charges inside the plasma free to circulate, pushed by the applied-field's magnetic force. The electrical current of the plasma's moving electrons generates an internal magnetic field, directed oppositely to the field generated by the moving electrons in the coils. At maximum density, the field generated by the plasma's electrons perfectly cancels the applied field inside a sharply-defined central region. The theory of plasma diamagnetism was described in the classic 1960 textbook "Controlled Thermonuclear Reactions" by Glasstone and Lovberg. The section "CUSPED GEOMETRIES", subsection 11.27 of that book reads:

"Another approach [to attain confinement] is to treat the case of a completely diamagnetic plasma occupying the central region. There is then a sharp discontinuity separating field-free plasma from the vacuum containing the magnetic field . . . . A consequence of the finite thickness [of the surface sheath] is that the plasma no longer comes to a point at the cusp, but extends to the outside through a 'hole' of radius approximately equal to the sheath thickness . . . . ""

Here ends the quote from Glasstone and Lovberg.

Returning attention to the right-hand panels of FIG. 1L, the horizontal extent of the field-free central region (186) expands during start-up to match the surface of the electrons (182). At the plasma surface, the outward pressure of the electrons just balances the inward pressure of the applied magnetic field. This condition of balancing inward and outward pressure sets the maximum density of the plasma. The balancing condition places the position of the surface of the plasma (182) to lie on a curved line just inside the magnet boxes. This line is the locus along which the inward magnetic pressure just matches the outward pressure of the maximum-density plasma trying to escape.

In the center of the tank, the density of electrons approximately equals the density of ions, as discussed above. The Wiffleball effect increases the fusion-power-output, both because the volume of plasma expands and also because its density increases to match the higher B-field at the surface of the plasma (182). The closer the surface is to the inner faces of the magnets (124), the stronger is the field and therefore the denser is the plasma. As the applied magnetic field increases with time, both the size and the density of the confined plasma increase to the maximum value allowed by the size of the magnets. These increases also cause the power-balance to become the maximum possible with magnets of this size. It is well known to those skilled in the art of fusion reactor design that the fusion power output of a quantity of plasma is proportional to the volume of ions times the square of the density of ions.

A word is in order about the accuracy of the computer simulations shown in FIGS. 1G-1L. A commercial computer program performed Particle-in-Cell (PIC) simulation, as described in a article, "Particle-in-Cell Charged-Particle Simulation plus Monte Carlo Collisions With Neutral Atoms, PIC-MCC," by Professor Charles K. Birdsall of UC Berkeley. This article is hereinafter called Birdsall-1991. Birdsall and his group at Berkeley developed the PIC code over decades, starting in the early 1960's. Development continued at Berkeley until about 2008. More recently, the development of a public domain version, called XOOPIC, continues at the Michigan State University under the direction of Prof. John P. Verboncoeur.

The computer tracks the motions of electrons and ions by solving Maxwell's four equations. Several approximations were necessary to adapt the full PIC technique to run more efficiently on available desktop computers. The main simplification, used in the simulations disclosed throughout this Specification, was to solve Maxwell's equations using the "electrostatic mode" of the simulation code. In this mode, the forces on the electrons and ions derive from an electrostatic potential function $\phi$, computed from an approximate form of one of Maxwell's equations.

The potential function $\phi$ is the solution to the Poisson equation, which is only strictly accurate for low plasma densities, i.e. at early times in the start-up. This "electrostatic mode" sets the internal magnetic field to be equal to the applied magnetic field. If not corrected, the simulated diamagnetic effect would contribute zero to the total field. To include the diamagnetic effect into the simulation, the applied field, as specified in the simulation's input-file, was manually changed between early and late times in the start-up sequence. Between the early-time simulated on the left of FIG. 1L (172) and the late-time simulated on the right of FIG. 1L (182), the applied magnetic field was changed by inserting a 2D region of zero-field at the center of the plasma cloud. The field was arithmetically made zero inside a square region of dimension adjusted to just fit inside the square space between the faces of the magnets (124). The diamagnetic effect could, in principle, have been simulated accurately by running the simulation code in "electromagnetic mode." The "electromagnetic mode" does not compute $\phi$, but rather computes directly the electric and magnetic fields arising from charges and currents. This was attempted; however, the computed diamagnetic field grew so slowly that the simulation ran out of time on the computer before the diamagnetic field became significant. For this reason, the "electromagnetic mode" simulation was not used in preparing this Specification. The manual insertion of the zero-field region was adopted to avoid the necessity of running the PIC code in the slower and less-accurate "electromagnetic mode."

Computer simulation is a less expensive path for designing a net-power reactor, i.e. less expensive than building larger and larger scale models. Rogers-908 disclosed a design for a scale model reactor based entirely on computer simulation. The same commercial software simulation package, OOPIC Pro, was also used in the subsequent patent Rogers-940, filed Sep. 28, 2014.

Rogers-940 simulated a small-scale-model reactor and disclosed a solution to the problem of how to feed in the fuel. Despite the improvement in fueling claimed by Rogers-940, the existing Polywell designs, prior to this Specification, still had several problems. Until solved, these problems will prevent a full-scale reactor based on prior scale-model designs from reaching practical net-power operation. The following problems are outstanding:

(a) Prior-art simulations showed that cold electrons will accumulate in the cusps of Polywell reactors. This little-recognized problem with Polywell is called "cusp-trapping." Cusp-trapping makes the development of scaling invalid for determining the size required to obtain net power. Until a fix for this problem is found, small-scale measurements will not be useful for predicting the eventual success of Polywell as a commercial power reactor. With only the prior art, even small-scale reactor development is unlikely to attract investors.

(b) Even if money miraculously appeared for building a large-scale model reactor based on the prior art, the reactor is bound to fail because cusp-trapping will cause the potential well to decay during start-up. Without a deep potential well, the ions will not get hot and the fusion power output will be zero or at most very small, even in a large-scale reactor. Cusp-trapping is a show-stopper for both small- and large-scale Polywell model development.

(c) Wiffleball formation is also required for efficient scaling to larger sizes. Wiffleball formation has never been measured in model reactors. Bussard proposed two different theoretical methods of establishing the Wiffleball during start-up. Some method to establish Wiffleball must be incorporated to work along with whatever solutions are invented to solve the cusp-trapping problem of paragraph (a), above. Without Wiffleball, the size of the plasma ball shrinks as the reactor size increases. Shrinking plasma size will ruin the power-balance as the reactor size increases. SUMMARY In accordance with one embodiment of the invention, a fusion energy device incorporates a means to pump out cusp-trapped electrons by inducing a diocotron oscillation in entering electron beam(s). In accordance with another aspect, a method of establishing Bussard's Wiffleball during start-up is disclosed. Various other apparatuses and methods are disclosed and validated using reliable PIC simulations.

DRAWINGS

Brief Description of Figures

Closely related drawings/figures have the same number, differing only in alphabetic suffixes.

FIGS. 1A to 1L show test data, a scale-model drawing and simulations from the PRIOR-ART.

FIGS. 2A to 2D show plasma-particles' simulated distributions and APPARATUS for pumping out cusp-trapped electrons, according to embodiments of the invention.

FIG. 3D shows a table of specifications of commercially available coil electromagnets.

FIGS. 4A to 4D show Bitter magnet construction and diagnostics of the Second Embodiment.

FIGS. 5A to 5B show charts of the existing power production in the whole world and in the U.S.

FIGS. 6A to 6C show diagnostics of a malfunction caused by cusp trapping and how the Third Embodiment cures the malfunction.

FIGS. 7, and 7A to 7C show early-time evolution of ion-bunching in the Third Embodiment and similar bunching discovered in Dietrich's experiment at MIT.

FIG. 8A shows diagnostics of charge density as a function of time, during middle and late times of start-up.

FIGS. 9A to 9C, and 9G show time-spectra, spatial distributions, and potential functions of plasmas composed of three particle-species, and the effects of varying particles' currents.

FIGS. 9D to 9F, 9J to 9N, and 9P show exemplary pages of computer code extracted from the input file simulating the First and Second Embodiments.

Figure 1A:
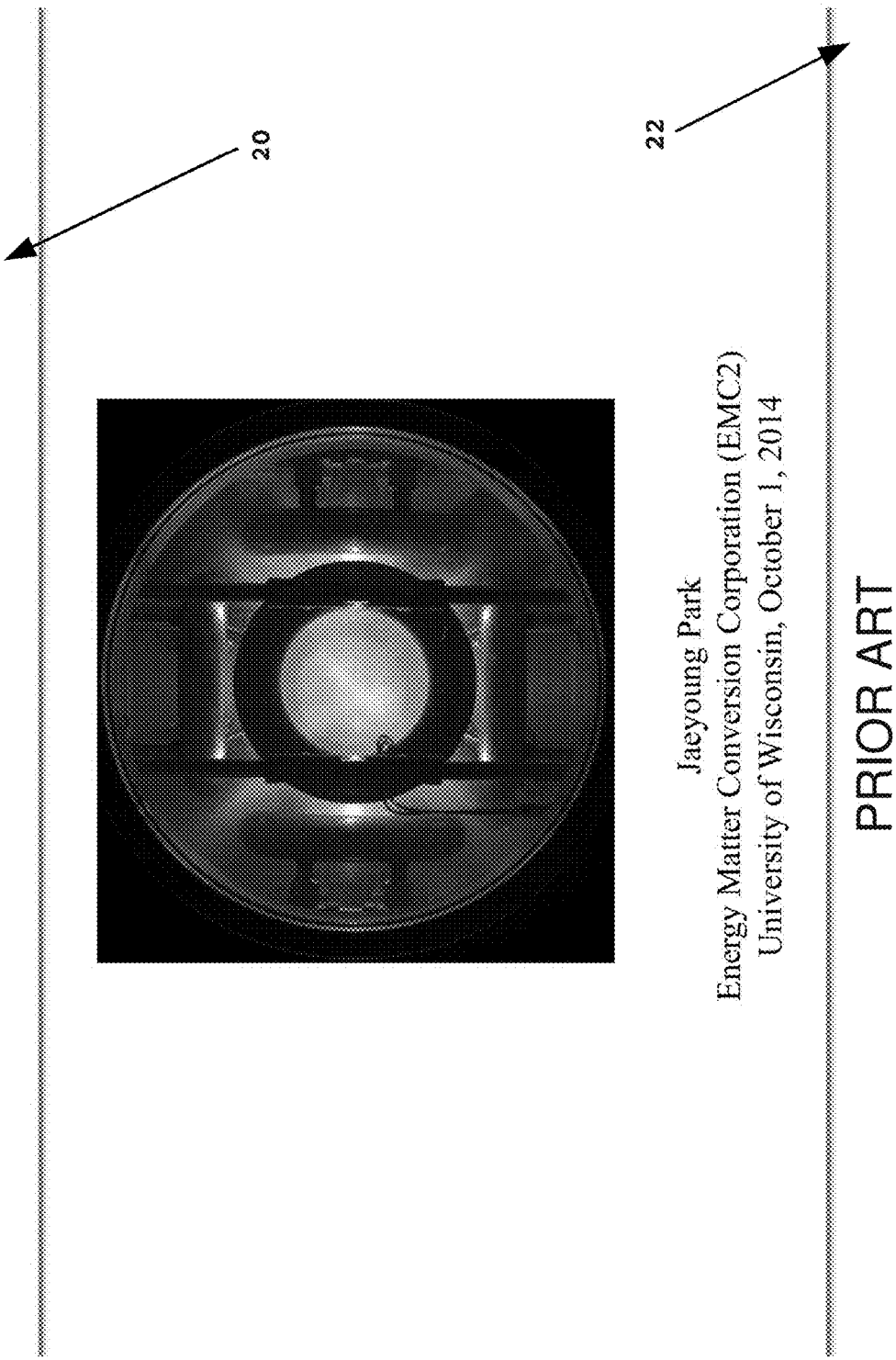

1000 schematic drawing of an embodiment. 1001 control computer. 1002 vacuum tank outline. 1004 vacuum pumps. 1006 vacuum pumping ports. 1009 emitter power control signal. 1010 emitter power system. 1012 electron-emitter. 1013 magnet power control signal. 1014 magnet power supply system. 1015 magnet power leads. 1016 typical airtight magnet box. 1017 typical hollow leg. 1018 probe readout system. 1020 capacitive probe. 1022 fuel gas supply system. 1024 gas delivery tube. 1026 aperture current readout. 1028 high-voltage control. 1030 high voltage. 1032 simulated electrons (grey dots). 1033 simulated ions (black dots). 1036 typical magnetic coil.

DRAWINGS

Reference Numerals 20 title of Park's talk. 22 location of slide number.
30 title of Park's slide-7. 32 Park's principal conclusion. 34 WB-7 metal joints. 36 Number of detected neutrons.
40 title of Park's slide-8. 42 3D rendering of WB-8. 44 Features of WB-8 magnets. 46 Hollow legs joining tank wall.
50 title of Park's slide-9. 52 Improved performance of WB-8. 53 Reduced grid current of WB-8. 54 Higher plasma density of WB-8.
60 Park's final conclusion on WB-8 testing.
100 (FIG. 1H) simulated electrons' distribution in prior-art. 102 position of electron emitter. 103 right-hand tank wall. 104 typical magnet box outline. 106 midpoints of horizontal cusp lines. 108 center of electrons' 2D distribution. 110 1D section of plasma potential. 111 peaks in potential function. 112 1D section of electron density. 114 peaks in electron density. 116 electron density at center of tank.
120 (FIG. 1J) ion 2D distribution in prior-art. 122 center of ions' 2D distribution. 124 inner faces of typical magnet boxes. 126 (FIG. 1L) full scale label, tank diameter.
130 (FIG. 1F) tank wall cutaway. 132 electron emitter on tank wall. 134 magnet coils cutaway. 136 gas cell in prior-art. 138 typical hollow legs cutaway.
140 (FIG. 1G) "WB-6" simulated electrons' positions. 142 "WB-8" simulated electrons' positions. 144 "WB-6" tank diameter simulated. 146 "WB-8" tank diameter simulated.
150 (FIG. 1K) Wiffleball formation with constant B-field. 152 Wiffleball formation with constant electron current. 154 variable applied magnetic field. 156 expanding B-field lines. 158 representation of "Pure Wiffleball." 160 shrunken cusp holes.
170 (FIG. 1L) early 1D section of horizontal(x) magnetic field. 172 electron distribution with reduced B-field. 176 early scale limits on applied B-field. 180 late 1D Bx-field with Wiffleball at center. 182 2D electron distribution with Wiffleball. 184 maximum B-field scale with Wiffleball. 186 zero B-field central region.
200 simulated vacuum tank walls. 202 simulated electron distribution. 204 position of electron emitter. 206 right-hand magnet coil. 208 electron beam traveling right to left.
210 sharp boundary of confined ions. 212 2D simulated ion distribution. 214 left-hand gas cell. 216 outer confining aperture of gas cell. 218 inner apertures. 219 horizontal line through reactor center.
220 secondary electrons and their birthplace. 222 electron beam's turnaround point. 224 diocotron wandering of beam. 226 surface of electron distribution, enlarged.
230 potential function, 1D section through tank center. 232 line along which 1D sections were extracted from 2D. 234 potential shaped by apertures for ion capture. 238 point of relative minimum potential. 239 point of relative maximum potential. 240 upper right-hand panel. 242 gas density inside gas-cell. 244 gas density outside gas-cell, tank background. 246 line marking outer limit of gas cell and potential at the outer limit. 248 applied magnet bias voltage, 50 kV.
300 fusion cross section axis label. 302 graph of deuterium+deuterium cross section. 304 graph of deuterium+tritium cross section. 306 graph of deuterium+helium-3 cross section. 308 graph of deuterium+boron-11 cross section. 310 fusion energy axis. 312 title stating reference frame of fusion energy. 314 two-ions' energy, first embodiment. 316 intersecting cross section, first embodiment. 317 two-ions' energy, second embodiment. 318 intersecting cross section, second embodiment.
320 ions' distribution in velocity-position space. 322 ions' velocity axis. 324 ions' position axis. 326 outer border of ions' position-velocity distribution. 328 dashed line marking maximum velocity of all ions. 330 x-coordinate at tank center. 340 dashed line marking left edge of hot-cube. 342 dashed line marking right edge of hot-cube. 344 first large-division x-coordinate label. 346 line marking median x-velocity in hot-cube. 348 line marking lower limit of ions' velocity at edge of hot-cube.
350 surface point where Bx and Bz are zero. f352 extracted By along dash-dot line. 353 dash-dot (horizontal) line through surface point. 354 central region of zero (Wiffleball) B-field. 356 arrow marking β=1 point at Wiffleball surface. 358 magnetic field By axis. 360 1D section of 2D potential through surface point. 362 horizontal arrow marking potential at surface point. 364 potential voltage axis.

370 tabulated column specifying selected magnet. 372 row specifying magnets' inside-diameters. 374 row specifying magnets' outside-diameters. 376 row specifying magnets' thicknesses (heights). 380 column of specifications of comparison magnet. 382 row specifying maximum field strengths. 384 power consumed by standard magnet. 385 number of turns of wire wound in standard magnet.

400 left-half of Bitter magnet's assembly drawing, 401 figure caption from Sabulsky-2013. 402 steel mounting flange. 404 hollow water distribution block. 406 copper arc conductors. 408 brass arc conductor. 410 arrows showing current flow paths. 412 cooling water flow paths. 414 polyester insulators. 416 right-half of assembly drawing.

420 new surface point, second embodiment. 421 typical magnet box corner. 422 vertical lines marking x-position of surface point. 424 1D section of By through new surface point. 425 marking B-field at new surface point. 426 new maximum B-field, 25 Teslas. 427 intersection of marker with ordinate axis. 428 marker of potential voltage at new surface point. 430 maximum potential voltage on ordinate axis. 432 left-hand aperture, made narrower than all other apertures.

440 marker of maximum ion velocity, second embodiment. 442 marker of minimum hot-ion velocity. 444 marker of median hot-ion velocity. 445 intersection point of median velocity line with velocity axis. 446 lines marking horizontal limits of hot-cube, second embodiment. 448 horizontal position axis.

450 ions' 2D positions' distribution, second embodiment. 452 vertical limits of hot-cube. 454 ions outside hot-cube in face cusp. 456 missing ions inside hot-cube in corner cusp.

510 pie chart of world's electricity production. 512 pie-slice representing coal production. 513 pie-slice representing gas production. 514 percentage from coal equaling 39%. 516 percentage from gas equaling 22%.

520 table of coal-fired power plants in U.S. 522 dividing line above plants producing more than one gigawatt each. 524 column of table showing breakdown by totals. 526 total power from small plants. 528 total power from plants producing more then one gigawatt each.

600 secondary electrons' distribution. 602 third particle type, MCCelectrons. 604 gas-cell birthplace of MCCelectrons. 606 left-hand aperture opened wide. 608 MCCelectrons in cusp adjacent to birthplace. 610 arrows showing magnets' corner spacing. 612 MCCelectrons far from birthplace.

620 primary (beam) electrons' distribution. 622 1D vertical section of electrons' 2D density. 624 vertical line through center of electrons. 626 electrons' density axis. 628 center of tank. 630 semi-log graphs of three particles' counts vs. time. 632 logarithmic ordinate (counts) axis. 634 linear abscissa (time) axis. 636 graph of electron counts, wide apertures. 638 graph of ions' counts, wide apertures. 640 graph of MCCelectrons, wide apertures. 642 maximum simulated time, wide apertures. 644 positions of local maxima of electrons' density along vertical line.

650 electron position distribution, third embodiment. 652 typical electrons in corner cusp. 654 left-hand magnet box squeezing cusp electrons. 656 bottom magnet box squeezing cusp electrons. 660 1D section of electron density along vertical line through center. 662 vertical line through center. 664 maximum density scale value, same as in previous Figure (6B). 665 center coordinate. 667 reduced amplitude cusp density peaks. 670 graphs of three particle counts vs. time. 672 beam electrons' counts. 674 ion counts. 676 MCCelectrons counts. 678 time axis marked in seconds from first time-step. 680 time in seconds at end of start-up.

700 (FIG. 7A) 2D ion position distribution, second embodiment. 702 narrow aperture for extracting. 704 horizontal line through bunch's position. 705 vertical line through bunch's position. 706 size of tank, second embodiment. 708 size of tank, third embodiment. 710 2D ion positions, third embodiment. 712 narrow spacing between magnet corners, third embodiment.

730 (FIG. 7) snapshot of ion bunch at extreme rightmost position. 731 time of snapshot at extreme rightmost position. 732 snapshot of bunch at extreme leftmost position. 733 time of snapshot at extreme leftmost position.

740 (FIG. 7B) graph of ions' charge density at a point. 742 axis of charge density in units of charge per area. 744 origin of time axis, time-zero. 746 label of maximum time, to match Dietrich's. 748 label of midscale time. 750 label showing charge density at time-zero. 752 last cycle of oscillation (at maximum time).

780 earliest time of Dietrich's thesis measurement. 781 oscillating voltage measured by "capacitative probe." 782 voltage axis, arbitrary units. 784 time axis, labeled in seconds. 786 latest time of Dietrich's measurement, 1.2 ms. 788 Dietrich's terminology for the observed frequency of oscillation. 789 Dietrich's terminology for the theory of bunching, copied from McGuire. 790 last cycle of oscillation, reducing in amplitude.

800 ion charge density, expanded time scale. 802 initial simulation time. 804 final simulation time. 806 line showing average density as a function of time. 810 ion charge density at a later time. 812 initial time of later simulation. 814 final time of later simulation.

900 electron counts, FIGS. 9A, 9B, 9C, and 9G. 901 simulation time axis. 902 ending time of simulation, 1.1 ms. 903 secondary (MCC) electron counts. 904 ion counts. 905 voltage along central 1D section of potential. 906 lines marking limits of gas-cell. 907 ions' 2D spatial distribution. 908 arrow pointing the initial direction of beam electrons. 909 arrow pointing to the minimum voltage of the potential function. 910 local maximum of potential in right-hand magnet. 911 gas-cell interior. 912 ions escaping through right-hand magnet's bore.

913 (FIG. 9C) dotted line marking the voltage at central minimum. 914 potential voltage scale, normalized to maximum (bias) voltage.

915 (FIG. 9D) input-file block containing original symbol definitions. 916 ratio of magnets' size to selected catalog size. 917 ratio of Bitter magnet's current to catalog magnet's current. 918 scaled product of amperes times turns. 919 Wiffleball relative diameter. 920 Wiffleball half-diameter in meters. 921 spacing gap in meters. 922 outer spacing magnets to tank. 925 table of horizontal B-field component in Teslas. 926 table of vertical B-field. 927 step function usage. 928 Wiffleball radius usage. 929 opening line of input file code.

930 electron emitter current injected. 931 magnet bias voltage. 932 emitter diameter, zero for large scale simulations. 933 PIC cell size in meters. 934 0/1 flag to disable/enable right-hand gas-cell. 935 flag to disable/enable right-hand gas-cell. 936 electron-cross-section factor multiplying gas density in all PIC cells. 937 background gas density, added to all PIC cells. 938 scale factor of magnet current with magnet size. 939 pressure in gas-cell.

940 (FIG. 9G) ions lost through top magnet's bore. 942 ions lost through bottom magnet's bore. 943 graph of 1D potential function along a vertical line through tank center. 944 scale of vertical positions. 945 graph-point of maximum potential along vertical. 948 dashed line connecting potential maximum with ion dots in 2D.

950 (FIG. 9K) block header of Monte Carlo Collisions specification. 951 name of secondary electrons. 952 block header of MCCelectrons particle specie. 953 block header of electrons particle specie. 954 electrical charge on an electron in Coulombs. 955 charge on deuteron, minus one electron's charge. 959 table of number of gas atoms in each PIC cell.

960 block header for specifying emitter characteristics. 961 emitted current in amperes. 962 start of four definitions of emitter position and size. 965 block header of vacuum tank specification. 966 voltage on tank, a grounded conductor. 967 block header defining geometry tank. 968 opening brace at block header.

970 block header specifying magnet boxes and apertures connected to them. 971 bias voltage on apertures and magnet boxes. 972 block header defining first of apertures and boxes. 973 comment line replacing similar "Segment" blocks for document brevity.

990 block header of user defined diagnostic plot. 991 a single point in 2D, i.e. one PIC cell. 992 number of time-steps to average into one point of time spectrum. 993 embedded factor of ⅕ expressing fractional x-dimension of bunch. 994 deuteron maximum velocity computed from its maximum energy.

DETAILED DESCRIPTION

FIGS. 2A-2D

PREFERRED EMBODIMENTS

Apparatuses for Pumping Out Cusp-Trapped Electrons

One embodiment of a fusion reactor is shown in FIG. 2A. A computer simulation displayed this snapshot of 2D electron particle positions in a full-scale, potentially-net-power Polywell reactor. A surrounding vacuum tank is shown by the square enclosure (200). Shown inside the tank is a simulated electron distribution (202). The position of each simulated electron particle is plotted as a black dot. Vacuum tank (200), electron emitter (204), and electromagnets (206), have identical form and function to those of a small-scale model of the prior art, shown in FIG. 1F. In FIG. 1F vacuum tank, electron emitter and electromagnets were indicated by reference lines (130), (132) and (134), respectively.

From the emitter (204) in FIG. 2A, a narrow beam of electrons (208) entered the tank, traveling from right to left through the tank's center. The simulation was configured to make the electron-beam particles appear close together in the Figure. For this reason the beam (208) could be distinguished by its straight-line shape, even against a dense background of trapped electrons (202). While the simulation was running on the computer, such snapshots were displayed and refreshed at short time intervals. The successive positions of the particles created the illusion of beam particles moving across the tank, initially from right to left, then reflecting from the opposite tank wall to return from left to right. All the background electrons in the snapshot had been seen to originate from beam particles scattering from each other at earlier times in the simulation. Beam electrons scattered from each other and, over time, filled the space inside the magnets (206).

Figure 2B:
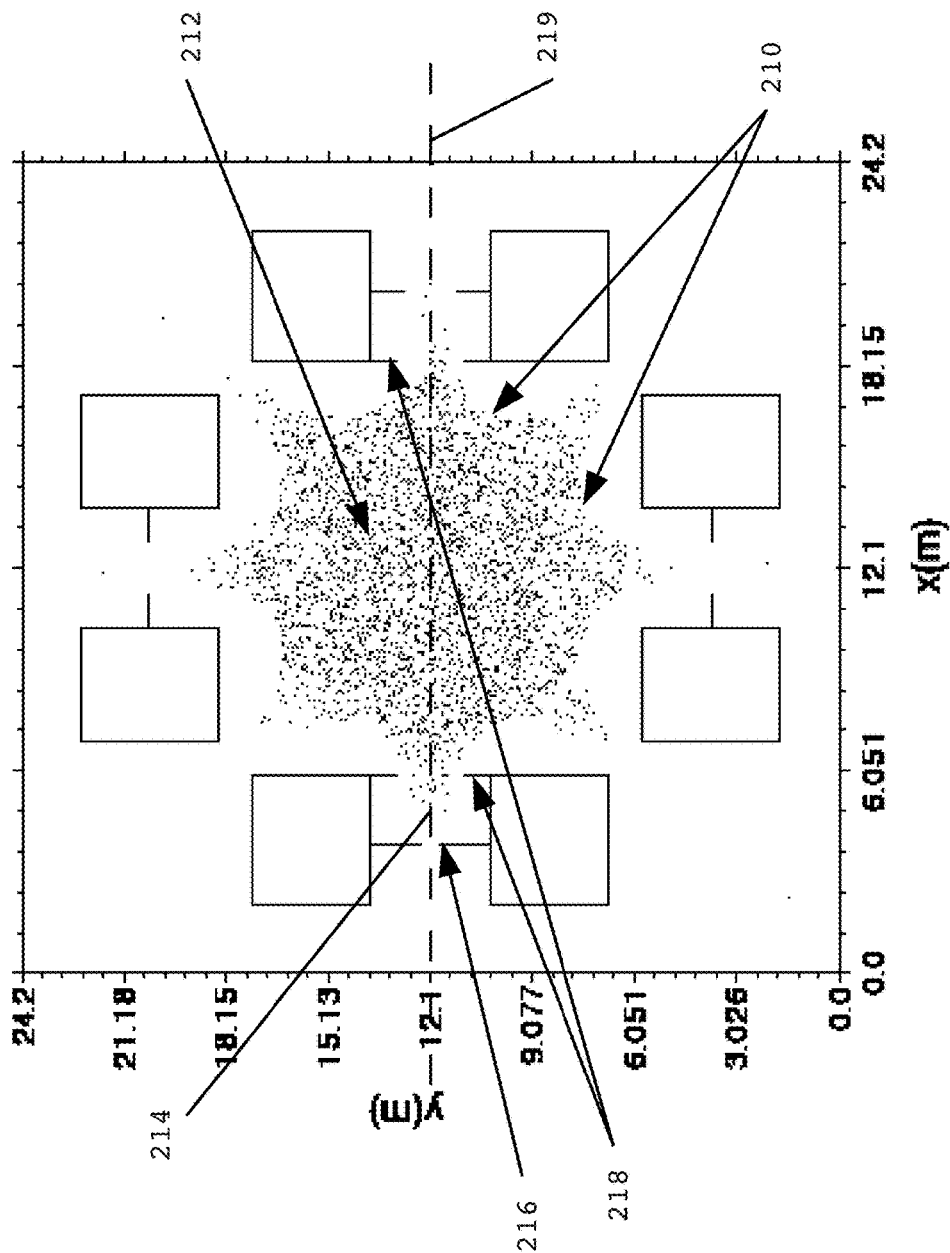

FIG. 2B shows a snapshot of ion particles (212) made at the same time as the electrons in the previous Figure. Each ion-particle's position is plotted as a black dot. The ions were born of electron ionization of neutral gas. The neutral gas, deuterium in this embodiment, was confined in a gas-cell (214) by an outer-aperture (216) and by one of several inner-apertures (218). The apertures provided for differential pumping of the gas, some of which necessarily leaks out of the cell before it can be ionized. Differential pumping is a well-known vacuum technique, applied for the first time in Polywell by Rogers-940. The technique allows for a pressure differential from inside to outside the cell. This eases the load on the vacuum pumps required to maintain a low vacuum pressure exterior to the cell.

In this embodiment, the outer aperture (216) had a second, crucial role to play. It served as an electrode which selectively removed low energy electrons from the plasma. To control the amount of electrons it extracted, the width of the outer aperture (216) was adjusted to be narrower than the other apertures (218). The narrower the aperture (216), the larger the fraction of the circulating electrons it collected.

Figure 2C:
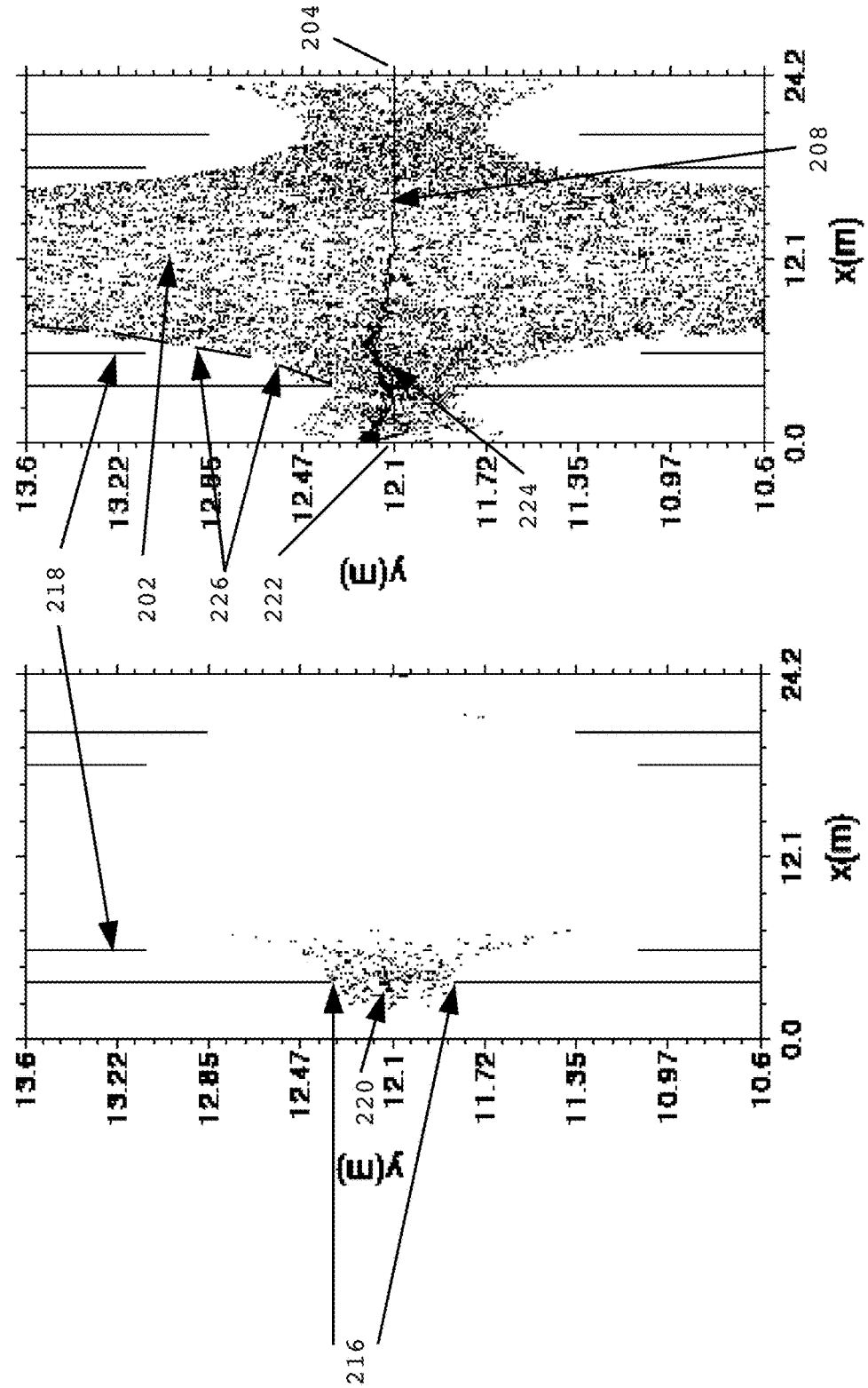

FIG. 2C shows central sections of the same reactor, but displayed with vertical scales expanded from the previous figures. The width of the outer aperture is indicated by the distance between the two arrow-heads of reference lines (216). In the left-hand panel, FIG. 2C shows a snapshot of the positions of secondary electrons (220) born from gas ionization in the gas-cell. The snapshot was made at the same simulated-time as the previously shown ions and primary beam electrons. The simulation program separately tracked three types of particles, namely primary (beam) electrons, ions, and secondary electrons.

The time of the snapshots was chosen to be early in start-up so that the dots did not overlap. This allowed estimating particle densities from the spacing of the dots. At this time the secondary electrons (220) had not yet moved far from their birthplace in the gas-cell. By comparison, the primary electrons (202), originally from the emitter (204), filled most of the central space of the reactor. The primary electrons (202) generated an electrostatic potential well. The formation of the potential well is an essential design feature of Polywell. The potential well heats and traps ions, inducing them to fuse and to produce fusion energy.

As an unwelcome side-effect from the shape of the potential, the potential well traps low-energy electrons in the cusps. If not removed, these cusp-trapped electrons build in density and cause fatal problems, as discussed in the PRIOR-ART sections of this Specification. Even at this early time in start-up, a concentration of trapped beam electrons is visible in the right-hand panel of FIG. 2C. Trapped beam electrons form a broad region of closer spaced dots between the arrow-head of line (208) and the emitter (204). The dots in this region are closer spaced than at the center of the reactor, which is to the left of the arrow-head (208). Closer spacing is an indication of higher density.

In simulation, gas ionization was modeled by a computer technique called "Monte Carlo Collisions" (MCC), as described in Birdsall-1991. Each Monte Carlo collision produces a deuteron-ion plus a low-energy electron. Pairs of these particles are born close together at various points inside the gas-cell. The most likely position for them to be born was where the gas density and electron-beam density are both large, i.e. at the center of the gas-cell (220). From this birth position, the positively charged ions fall down the inside slope of the potential well and into the center of the tank. The secondary electrons are left behind in the gas-cell. There they will remain trapped until gradually heated by passing beam-electrons. The apparatus of this embodiment was designed to efficiently extract these secondary electrons.

The newborn secondary electrons are most dense at the center of the gas-cell (220). The OOPIC program tracks the secondary electrons separately from beam electrons, even though both types of electrons interact identically with the fields and with other electrons. The electrons of the beam (208) passed through the gas-cell from right to left, reflected from the electric field near the tank wall (222), and then returned to pass again through the gas-cell from left to right. Gradually the beam heats the secondary electrons left behind from ionization. Diocotron oscillations of the beam increase the rate of energy transfer from hot beam electrons to cold secondary electrons.

Diocotron oscillations are visible as a vertical spreading of the beam near the arrow-head of reference line (224). Oscillations spread the beam vertically at the position where it passes through the gas-cell. This spreading concentrates the beam energy at a position where it is effective to heat the trapped electrons. Once heated, they moved away from their birthplace and in the process many hit the aperture (216).

Figure 2D:
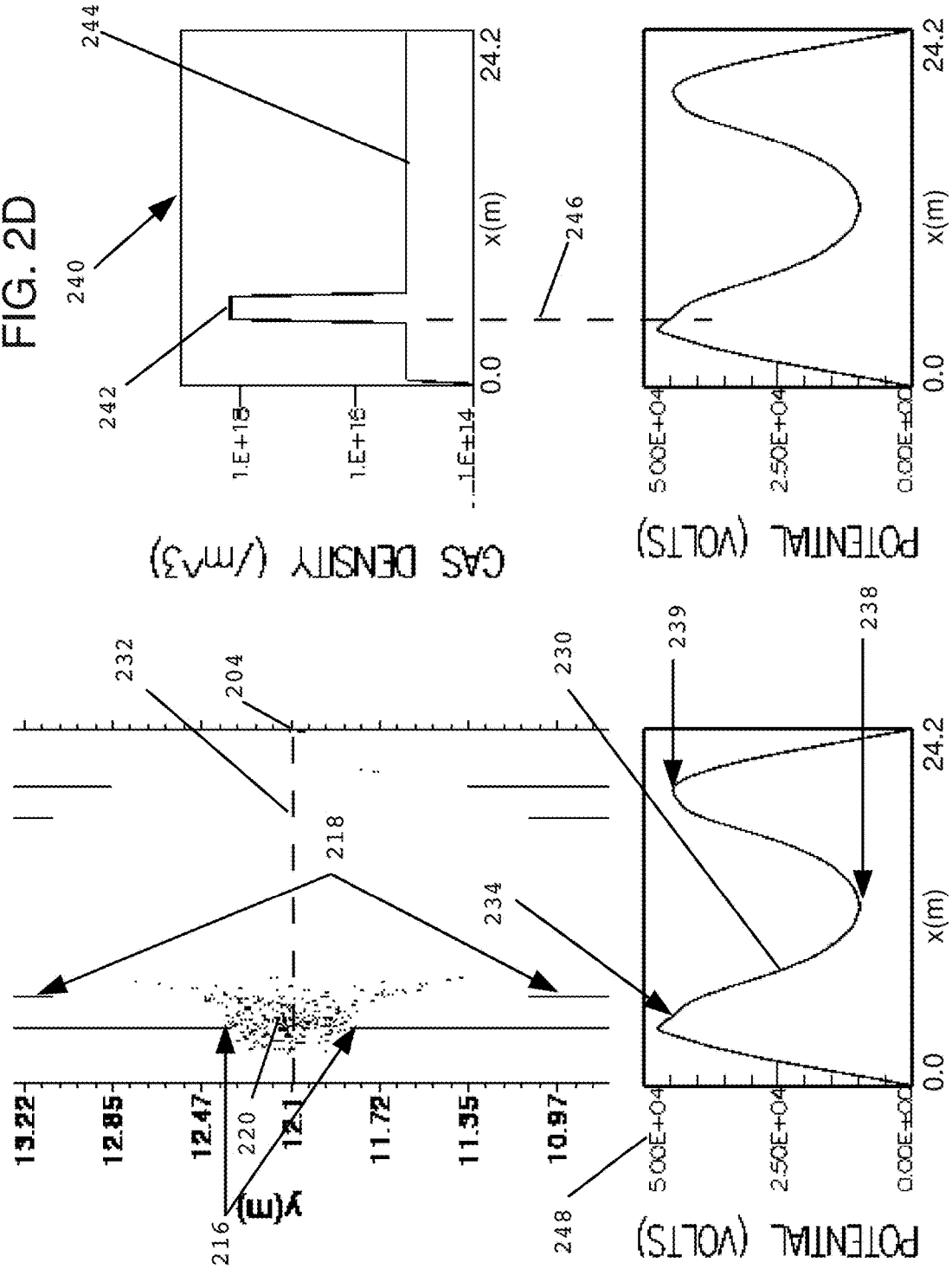

The lower left-hand panel in FIG. 2D shows a graph (230) of a section of the electrostatic potential plotted along the dashed line (232). The dashed line is shown in the upper left-hand panel superimposed on the same distribution of secondary electrons, copied from the previous Figure. The aperture (216) shaped the potential inside the gas-cell. The shaped portion of the potential is near the arrow-head (234). The potential (234) exhibits a downward slope to the right. The slope-to-the-right is essential for accelerating newborn ions to the right, toward the center of the tank. If the potential were not sloped to the right, some of the newborn ions would fall down its outer-slope, to the left, and be lost on the left tank wall (222). The need to collect ions efficiently created a third, important function for apertures. Originally intended to confine gas for differential pumping, they also shaped the potential for efficiently accelerating ions toward the center. The maximum potential voltage occurs just to the left of arrow-head (234).

The upper right-hand panel of FIG. 2D (240) shows a graph of the neutral gas density along the same line (232) through tank center. The beam travels along this line (232) and so "sees" two different gas densities at different positions (x) along its trajectory. Inside the gas-cell, it sees a dense gas (242). Outside the cell, the beam sees a 1000-times less-dense gas (244). The ratio of the density inside the cell (242) to the density outside the cell (244) was chosen to be 1000, large enough so that most of the ions were born inside the cell. The peak in the potential 870 (234) aligns with the narrowest (216) of the apertures, which also aligns with the outer edge of the high-density gas, marked by vertical dashed line (246). The lower-right panel is an identical copy of the lower-left panel, placed for ease of comparison below the curve of gas density (244).

Ions born outside the gas-cell are harmful to power-balance. Outside the gas-cell the potential difference between the ions' birthplace and the center of the tank is either too small or points ions away from center. Ions either reach the center with too little energy to fuse, or ions run to the tank and are lost before ever entering the central region. For example, ions produced at the center of the tank would experience a flat potential, as indicated by reference arrow (238). A flat potential does not accelerate ions at all. The resulting cold ions would be trapped at center, without enough energy to fuse. Even worse, the cold ions would rob heat from the newborn, hot ions falling in from the gas-cell, making them also too cold to fuse. The energy it takes to produce and heat ions outside the gas-cell is energy wasted. If there are too many of these ions born outside the gas cell, the power-balance suffers.

The factor-of-1000 difference in density from inside to outside the gas-cell was a design parameter taken from "FIG. 4E" of the Rogers-940 patent. It should be understood that different pressure-ratios would also be useful in other embodiments of the present invention. Other widths might provide a more economical trade-off between the desire for cheap vacuum pumping and the desire for large power-balance. Cheap vacuum pumping would push the design to have high background pressure. Large power balance would push the design to have very low background pressure; thus, all the ions born are born in the gas cell and none in the background gas.

Attention is redirected to FIG. 2C. As the secondary electrons were heated by the beam (208), they moved upward or downward away from their birthplace (220). If the aperture (216) were not present, or if it were wider-open like the other apertures (218), the secondary electrons would join the primary electrons by flowing along the surface of the confined plasma. A portion of this surface is indicated by the dashed line touched by the points of the arrows (226). The dashed curve (226) was added manually to guide the eye along the natural surface of the confined plasma (202). From the physics of cusp-confinement, the secondary electrons were required to follow lines of constant B-field magnitude. Electrons of different energies followed different magnetic field lines.

The dashed curve (226) is a line-of-constant-B-magnitude along which minimum-energy electrons can join the bulk plasma (202) as soon as they acquire enough kinetic energy from the beam. Only a small fraction of the newborn secondaries makes it to the bulk plasma. Most die by hitting the aperture (216) before they can travel very far along the dashed curve. This death happens before they have acquired the minimum amount of kinetic energy they need to join the bulk plasma.

This interception of the secondary electrons by the aperture (216) selectively removes the secondary electrons from the simulation before they can join the bulk plasma (202). As an undesirable side-effect, the aperture (216) also intercepts a portion of the beam electrons (202), and not just low-energy ones of these electrons. The confined electrons of all energies normally circulate in and out through the gas-cell, as well as in and out along all the other cusp lines pointing out from the central region. Recirculating electrons from the bulk plasma which accidentally hit the aperture (216) do not all have low energies. They would not contribute to the cusp-trapping problem even if they had not hit the aperture. On the contrary, they would be useful in the bulk plasma (202) to maintain a deep potential well. Removing hot beam-electrons was an undesired, but necessary, side-effect of removing the cusp-trapped electrons. The size of the opening in aperture (216) was selected to control the fraction of valuable, beam electrons (202) lost to the aperture. This width of the aperture is an important design parameter defined by the METHOD of the invention. The method is described more in subsequent sections of this Specification.

The position of the gas-cell shown (220) was on the opposite side of the tank from its position shown in the prior-art drawing, FIG. 1F (136). In the prior-art drawing, the gas-cell (136) was shown to be on the right-hand side of the tank, the same side as the electron emitter (132). In the present embodiment, the use of diocotron oscillations to heat the secondary electrons made it necessary for the gas-cell and electron emitter to be on opposite sides of the tank. Reference to FIG. 2C will make this clear.

In FIG. 2C, the beam (208) appears well collimated (by the right-hand magnet) when it enters the tank from the right. Diocotron oscillations caused a random wandering of the beam (224) after it crossed the center of the tank, going from right to left. The random wanderings were obvious in the on-line display; the beam looked like a twisting, headless snake. Sometimes the beam wandered upward, sometimes downward. Sometimes it curled back on itself. To illustrate the general character of the oscillations, the snapshot shown in the right-hand panel of FIG. 2C was selected as typical from the many snapshots displayed in sequence on the computer screen as time advanced, step by step. In space, the onset of oscillations was seen to occur at the position where the kinetic energy of the electrons had fallen to a low value as they approached the center from the right.

As the beam-electrons approached the center of the tank, they decelerated under the action of the electrostatic potential. The upper left-hand panel of FIG. 2D enlarges a part of the corresponding panel in the previous figure. A dashed line (232) marks the beam's path from emitter (204) to gas-cell (220). The lower left-hand panel of FIG. 2D shows a curve (230) plotting the value of the potential function along the dashed line. By standard physics convention, the potential function shows the potential energy of a particle with positive charge. For a particle of negative charge, such as the electron, the roles of potential and kinetic energies interchange. The same curve (230) gives the kinetic energy of beam electrons. As each beam electron travels from the emitter (204) to the center of the tank, its kinetic energy rises and falls with its position, as indicated by its abscissa value x(m). At the center of the tank, the kinetic energy of the beam-electrons had fallen to a small fraction (238) of the ~40 keV (239) they had at the right-hand magnet. The electron energies at the maximum (239) and minimum (238) of the potential function were read by extending the arrows (239, 238) horizontally to intersect the ordinate axis. The scale maximum, 50 kilovolts (248), was labeled automatically by the simulation program from searching for the maximum potential voltage among all the cells of the simulation plane. At each point a beam electrons' kinetic energy, measured in electron-volts, was numerically equal to the potential, measured in volts.

FIGS. 2B-3D

First Embodiment

Large Scale Model Made with Coil Electromagnets

In order to be useful for generating nuclear power, a Polywell reactor must produce more power than it consumes. By standard definition, the power is the volume integral of the power-density of the fusion reactions in the confined ion plasma. A familiar formula for power density is given in textbooks, for example Glasstone and Lovberg, "Controlled Thermonuclear Reactions," published in 1960. According to eq. (2.17) of Glasstone and Lovberg, the power density of a deuterium plasma is $\frac{1}{2} n^2 <\sigma v> Q$, where n is the particle-density (ions per unit volume), $<\sigma v>$ is the <average over relative velocities v> of fusion cross-section($\sigma$) times ion-ion relative velocity(v), and Q is the energy released by each fusing pair of deuterons. The units of power density, as calculated from the formula, will depend on the units chosen for the component terms. In this section, cgs units will be used, in which case power density will be in units of watts per cubic centimeter. The power output of the model reactor was computed by performing a volume integral of the density expression, using simulated ion density n and velocities v.

FIG. 2B shows uniform ion density (212) inside a sharp boundary (210). Ion density n is uniform everywhere inside, and zero outside the boundaries shown by arrows (210). Uniform density was indicated by the appearance of uniform spacings between the black dots (212). The factor $<\sigma v>$ was very small for the portion of ion density near the surface. As an ion approaches the surface its velocity v falls smoothly to zero at it climbs up the inner slope of the potential well. As v falls to zero so does the product $\sigma v$. Due to the smallness of the factor $<\sigma v>$ at the surface, most of the contribution to the volume integral comes from plasma near the center of the reactor, well inside the surface. To simplify the integration of power density, the limits of integration were moved inward from the surface (210). Limits of integration were determined by analyzing the simulation diagnostic by the method to be disclosed next. With these observations, the integral of the power density could be simplified to be the integral of $<\sigma v>$ over only a limited, central volume of the plasma.

The main challenge in integrating the density function comes from the variation of the $<\sigma v>$ term, which was only determined graphically, not analytically. The <brackets> around $\sigma v$ specify performing an average of $\sigma v$ over all values of relative velocity v at each spatial position. Because both $\sigma$ and v vary independently from point to point inside the plasma volume, a separate averaging over v was needed at each position. However, the averaging process was further simplified by the unique character of the ions' motion in the potential well. Ions at the same position in space had the same energy. The magnitude of any particle's velocity depends only on its energy. Thus, the vector velocities of all the ions at any one position have the same magnitudes. The ions at each position have velocities differing only in direction, not magnitude. Furthermore, the directions of the velocities are isotropic in space. In other words, the directions of the velocities are randomly distributed. These two features made it possible to average the cross-section a over a uniform distribution of the velocities' relative angles from zero to n radians. The resulting average $<\sigma v>$ depended only on a scaler v, rather than on a vector velocity. The scaler magnitude v was known at each position in space from the value of the potential at that position. A section of the simulated potential for this embodiment was shown in FIG. 2D. The curve (230) is a section of the 2D potential along a horizontal line through the center of the tank.

Figure 1B:
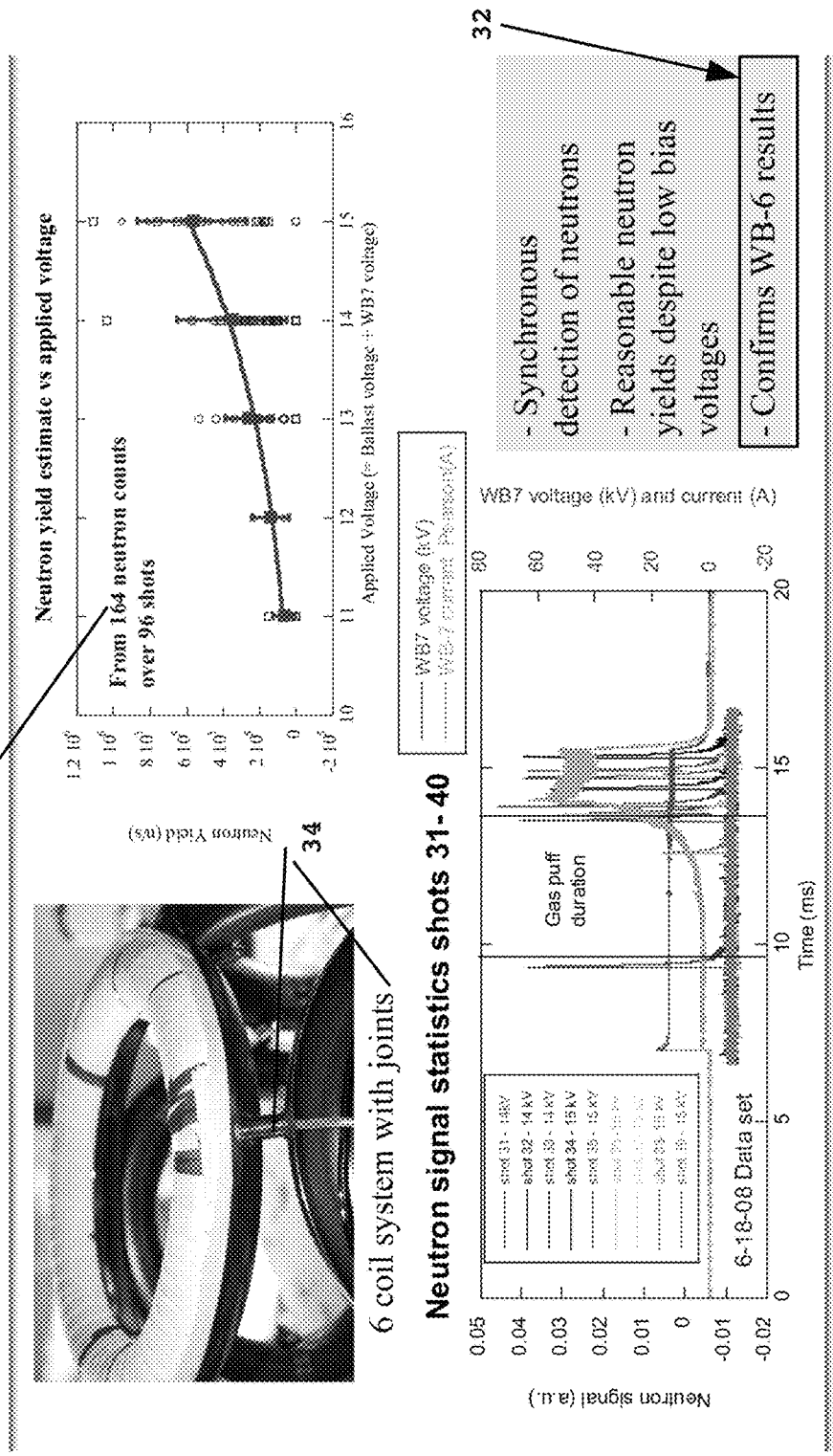
Figure 1E:
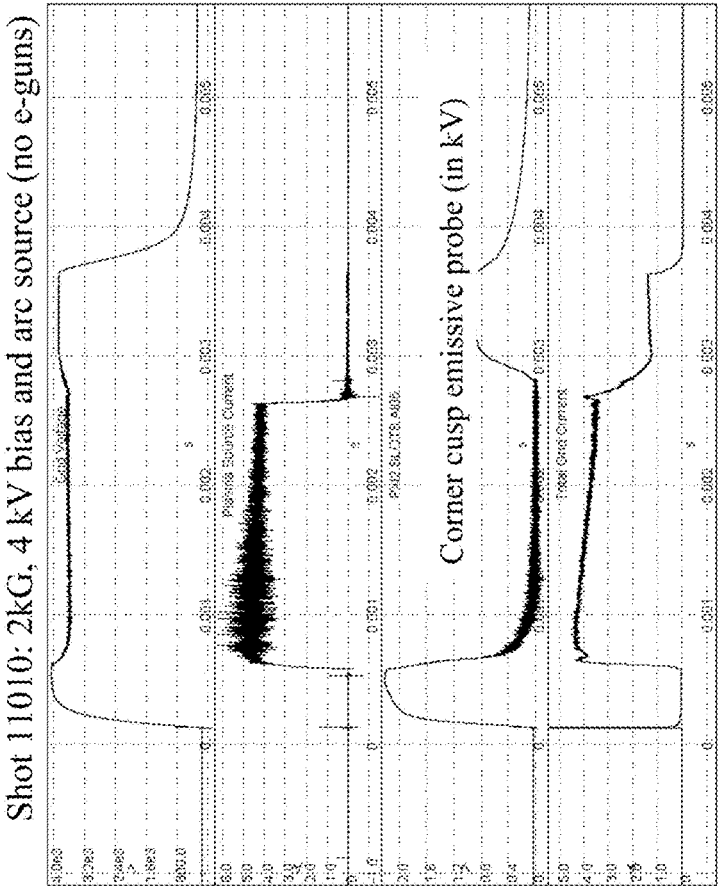
Figure 1G:
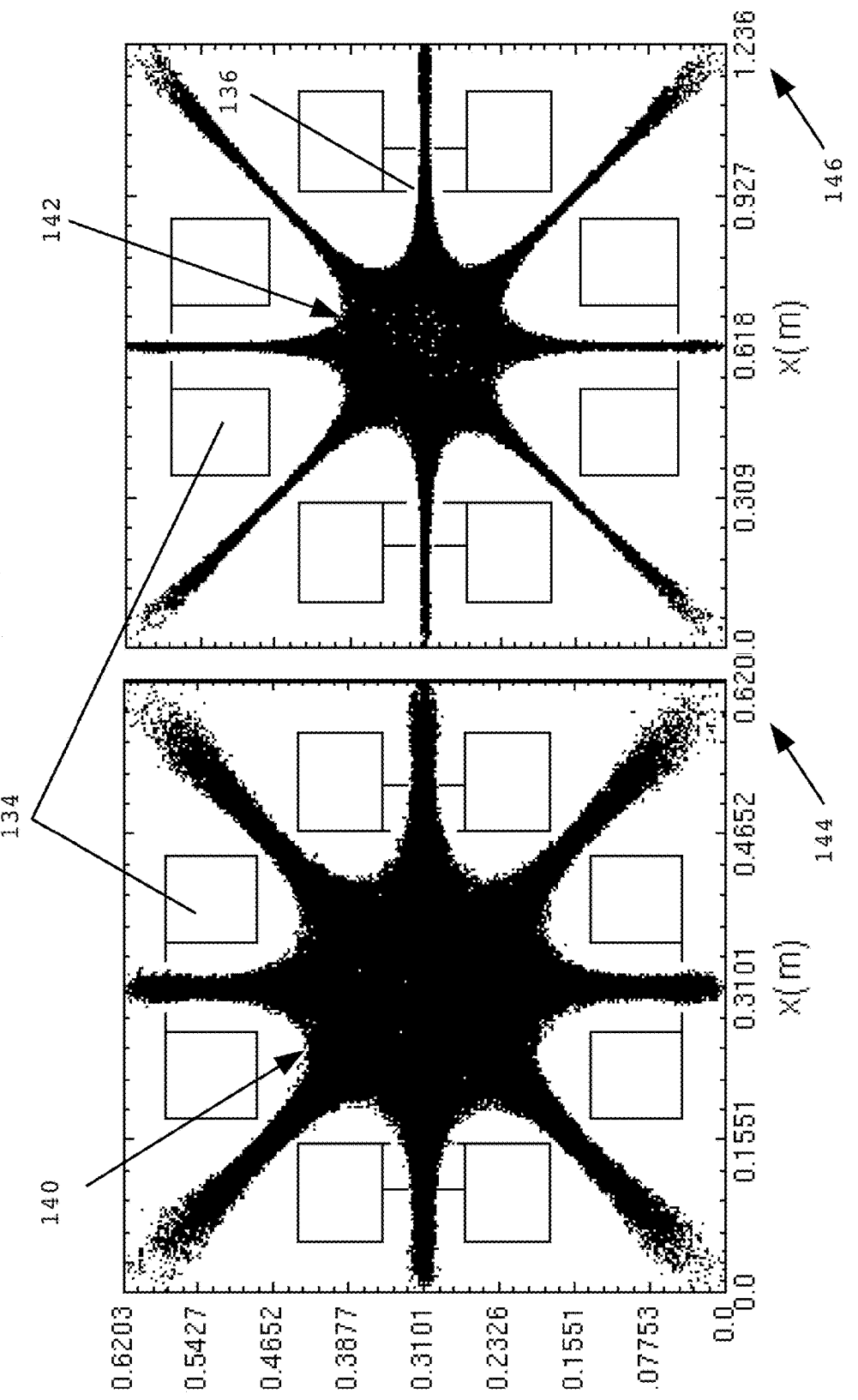
Figure 1H:
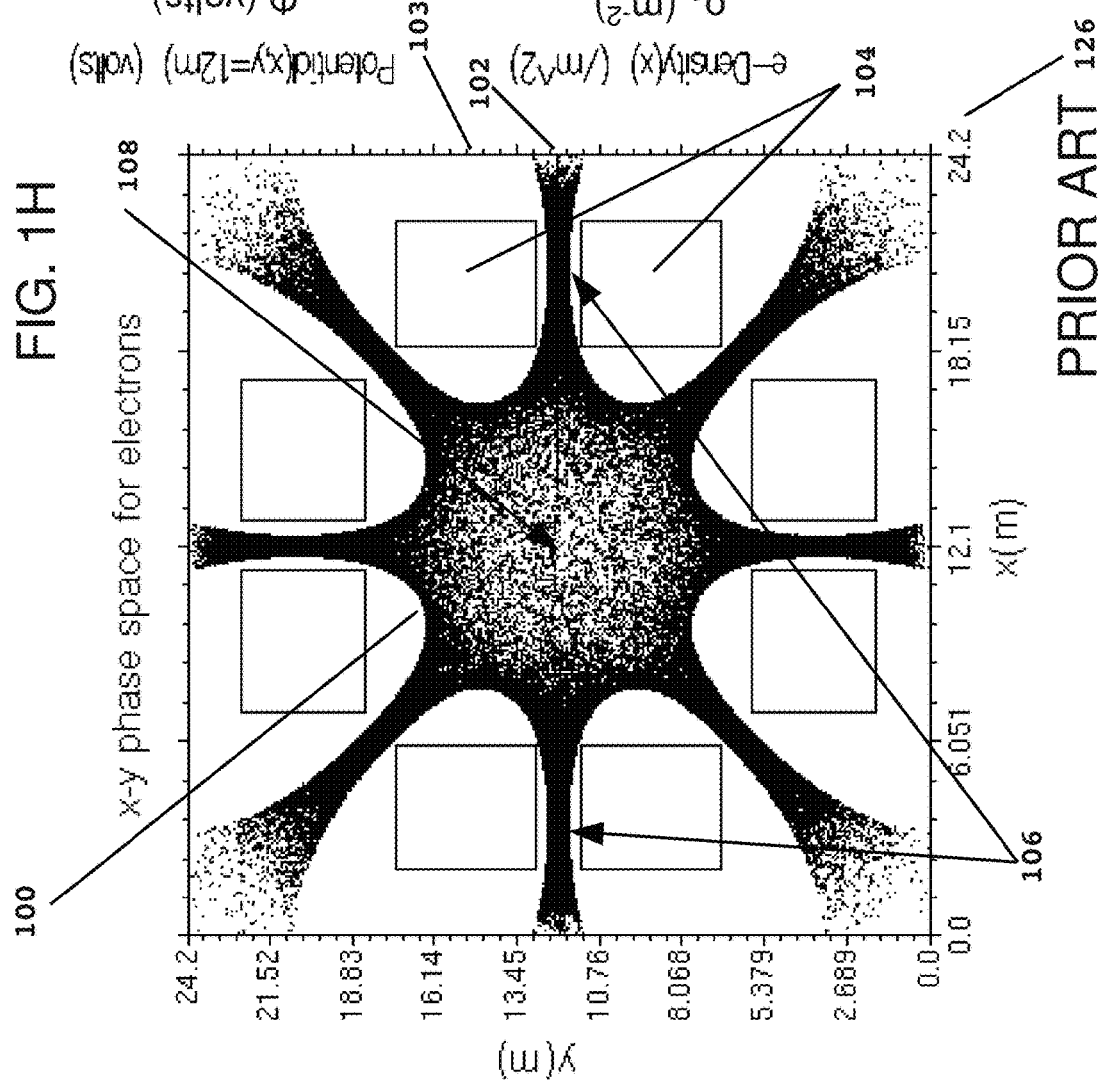
Figure 1K:
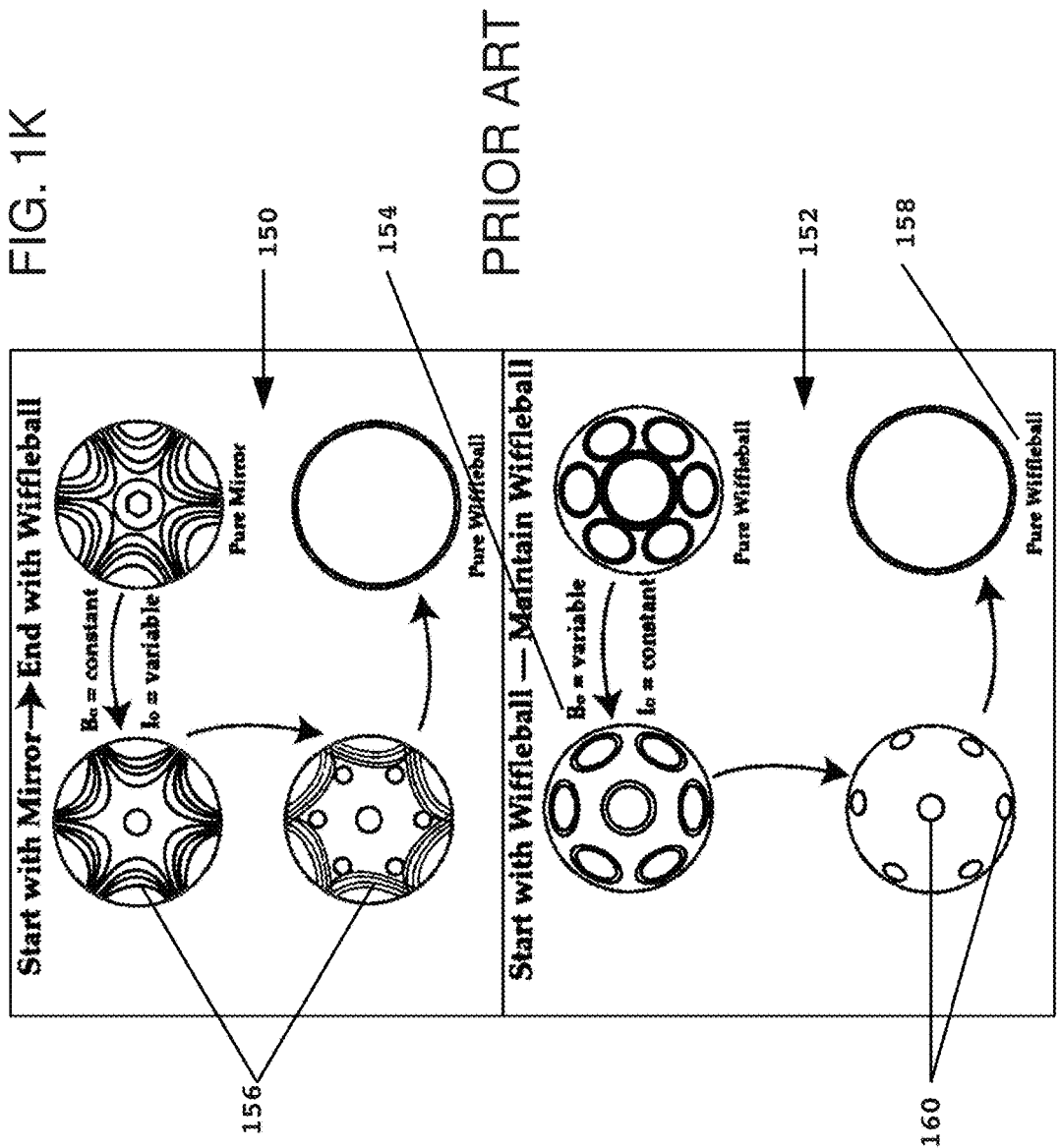
Figure 3A:
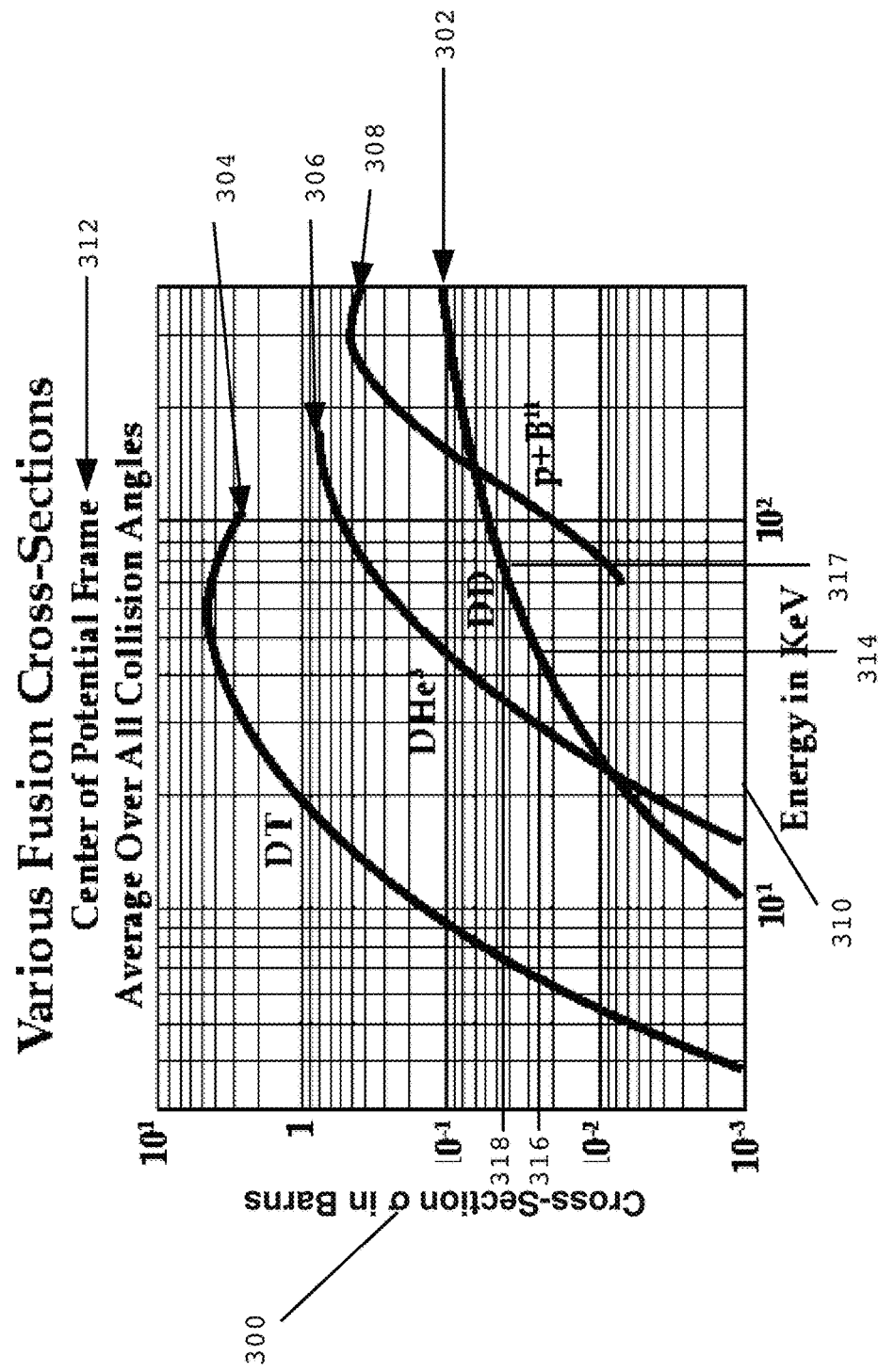
FIGS. 3A to 3C show graphs and simulated diagnostics used to predict the power-balance of a large-scale reactor, according to the First Embodiment.

Now to examine the velocity dependence of the cross section a: FIG. 3A shows four graphs of angle-averaged cross-sections, plotted against ordinate scale (300), which is marked in units of barns. (According to standard definition, one barn equals 1 e-24 square centimeters.) This Figure was adapted from "FIG. 1B" of Rogers-940, which was in turn adapted from "FIG. 13" of Bussard's published presentation, "Should Google Go Nuclear." The 4 graphs are labeled by the isotope symbols for pairs of fusing ions, showing 4 popular choices of fusion fuels. The curve labeled DD (302) is the angle-averaged cross-section for deuterium fusing with deuterium, appropriate to the present embodiment. Other fuel choices, labeled DT (304), $DHe^3$ (306) and $p+B^{11}$ (308), have advantages in other useful embodiments. The DD cross-section a (300) is a function of "Energy in KeV" shown along the abscissa scale (310). This energy is the total energy in the center of potential reference frame (312). Two fusing deuterons both have the same energy in this frame. From the standard relationship between energy and velocity, the energy for referencing the abscissa (310) was the sum of two identical contributions, namely ½ $Mv^2$+½ $Mv^2$, where M is the ion mass and v is the magnitude of the velocity of each ion.

Figure 3B:
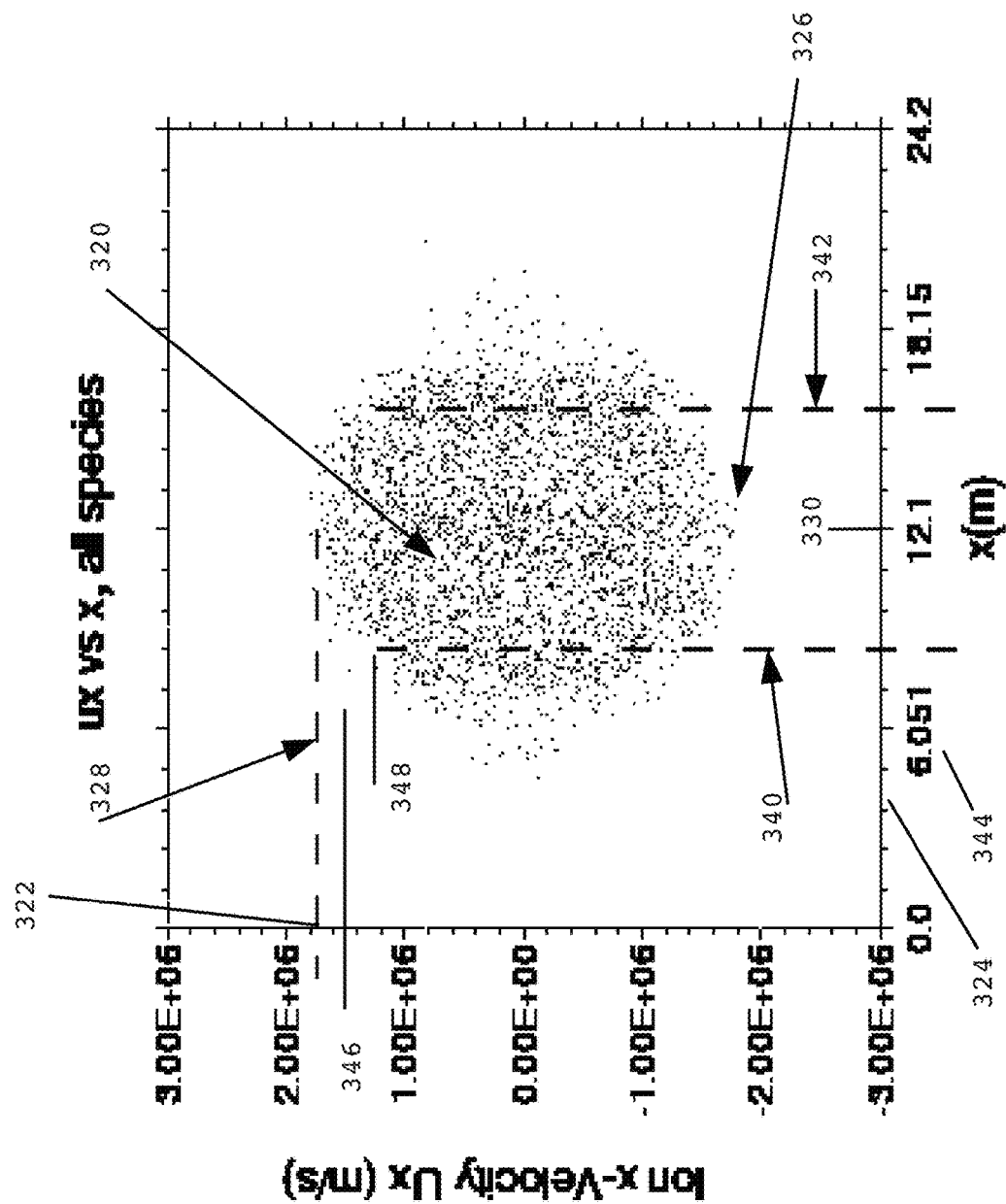

FIG. 3B shows a snapshot of the ions' velocities vs. positions (320) as dots in two-dimensional (2D) velocity-position space. The vertical axis (322) indicates each ion's horizontal-velocity component, Ux, measured in units of meters per second (m/s). The abscissa (324) indicates the ion's horizontal position, x, measured in units of meters (m). While the simulation was running, the dots (320) were seen to rotate in clockwise circulation around the center of the Ux vs. x distribution. On the outer border (326) of the Ux vs. x distribution, the horizontal component Ux was inferred to be equal to the whole magnitude of the velocity v. The other component of v, namely Uy, was found equal to zero on the border.

The same dots, representing these border-ions in FIG. 3B, were also identified in FIG. 2B. In FIG. 2B the border-ions were seen to move horizontally back and forth along the central axis of the 2D position space. The border-ions' central-trajectories approximately followed the dashed line (219) in that Figure.

Returning attention to FIG. 3B, dots representing ions of maximum velocity were marked by the dashed line (328). This line intersects the Ux axis (322) at velocity 1.8e6 m/s. From the formula E=½$Mv^2$, this maximum velocity converts to a maximum kinetic energy of 35 keV. This maximum kinetic energy occurred on each circuit when the ions crossed tank center, marked at the center of the x-axis (330). Maximum ion energy, as converted from maximum velocity (328), was found to be the same as the potential energy difference the newborn ions fell through on their first trip to the center.

The newborn ions' initial fall converts potential energy from their initial position into kinetic energy of their velocity. A consistency check was performed to compare maximum-energy measured by velocity with maximum-energy measured by potential difference. Attention is directed to the potential function graph (230) in the lower left-hand panel of FIG. 2D. The potential energy of ions at their birthplace (234) was be read by extending the horizontal arrow (239) leftward to the ordinate axis. At the top of the axis the simulation marked the maximum potential voltage as 50 kilovolts (248). The ions potential energy at tank center was similarly read on the same axis by extending the horizontal arrow (238) leftward. The difference of potentials marked by the arrows (239) and (238) computes to 35 kilovolts, which corresponds to kilo-electron-volts (keV) for the energy gained by ions falling through that potential difference. The 35 keV from converting the maximum velocity equals the 35 keV from converting the potential difference. This comparison confirms the interpretation of the border-ions' observed trajectories in FIG. 3B as being due to a mechanism of converting the potential energy of the well back and forth into kinetic energy of ions traveling horizontally.

The observed back-and-forth motion of the ions in FIG. 3B allowed further simplifying the volume integral of the power density to obtain the power. The ions have near zero kinetic energy at the edges of the well. The DD cross-section, plotted in FIG. 3A (302), falls exponentially to zero as the ion energy falls below 2 keV, the energy indicated on the horizontal scale by reference line (310). The limits of integration were reduced to integrate only over the central volume of the distribution shown in FIG. 3B (320). Vertical dashed lines (340) and (342) enclose the chosen range of integration. Outside the range of x between the lines, the fusion cross-section was small enough to be considered negligible compared to its central value. Integrating only between the lines eliminated from integration the portions of the plasma where the ions were too cold to fuse. Reading from the horizontal scale (324), the distance between the dashed lines is 6 small divisions. The length of six small divisions equals 6/5 times the length of one large division. The length of a large division is shown at (344), as the value plotted by the simulation program as labeling the first of the large scale markers. Assigning the distance between the lines the symbol "a," then a=(6/5)*(6.051m)=7.26m. The length a, just computed, was used as the edge dimension of a "hot-cube." To a good approximation the hot-cube contained only hot ions.

To further simplify the integration of the power density over volume, the product <σv> was approximated in the integrand by the median velocity inside the hot-cube times the cross-section evaluated at this median velocity. In FIG. 3B the median velocity was marked by horizontal line (346). This line was positioned midway between the line of maximum velocity (328) and a line of minimum velocity (348). The minimum velocity line (348) was established as marking the velocity the ions reach on each circuit at the moment they cross the boundary of the hot-cube. The boundary of the hot-cube is indicated by the vertical dashed line (340). Ions with less than this velocity produced negligible fusion, and the volume containing them was excluded from integration. A horizontal reference line (346) was placed to mark the median velocity, by the definition of "median," halfway between maximum (328) and minimum (348) velocities. The value of Ux, where the line (346) intersects the vertical scale, is the required median value of velocity. This was the velocity which was eventually used to retrieve the DD fusion cross-section from the appropriate graph (302) in FIG. 3A.

Reading the intersection point of the median-velocity, line (346) with the scale (322) gave the median velocity as v=1.5e6 m/s. Converting this to energy via the formula ½$Mv^2$ yielded 22 keV for the median energy of the ions inside the cube. The appropriate energy for referencing the DD cross-section scale in FIG. 3A was the total kinetic energies of both fusing ions, which was twice 22 keV, or 44 keV. (Two fusing ions always have energies equal to each other, for the reasons explained above.) The vertical line (314) marks this energy along the abscissa (310) in FIG. 3A. The line (314) intersects the DD curve (302) at a point where a=0.025 barns. This value of cross-section was read from the cross-section scale (300) where the horizontal line (316) intersects the vertical scale. This was the required, angle-averaged fusion cross-section, evaluated at the ions' median velocity.

The remaining two numbers, required to compute the power output from the textbook formula for power density, were the value of the central ion-density, n, and the energy released per fusing DD pair, Q. The ion density was determined from simulation diagnostics using the following well-known characteristic of Polywell reactors: The outward pressure, exerted by electrons at the surface of the plasma, equals the inward pressure, exerted by the magnetic field confining the electrons. The ratio of pressures, conventionally designated by the Greek letter beta, was taken from the Plasma Formulary, page 29, as: 13=(4.03e-11)n$T/B^2$, where n is the electron density (per cubic centimeter), T is the electron energy (in electron-volts) and B is the magnetic field (in gauss). Solving the β=1 equation for n yielded the following formula for electron density: $n=B^2/T/4.03e-11$. T and B were evaluated at a convenient point on the surface of the confined plasma. The selected point is indicated by the arrow (350) in FIG. 3C. From the plasma's property of quasi-neutrality, it was known that the central electron and ion densities were equal. The above formula for electron density was therefore used to compute the required ion density.

Using the β=1 equation to determine ion density was an important step in calculating the power output. The required plasma densities were not directly available from the simulation. The densities in the simulation, such as the one shown in the lower right-hand panel of FIG. 1H (112), are two-dimensional (2D), having units of inverse area. The plasma density n required to compute the power density in a 3D reactor is a 3D density, having the units of inverse volume. The connection between the 2D simulation and the realistic 3D density was made utilizing the high degree of symmetry at the point (350) in FIG. 3C. At this point the B-field, electron energy, and plasma density in the simulation were simply related to the required 3D quantities. Because the ion density is uniform inside the boundary of the Wiffleball, finding the density at this one point determined it everywhere.

Figure 3C:
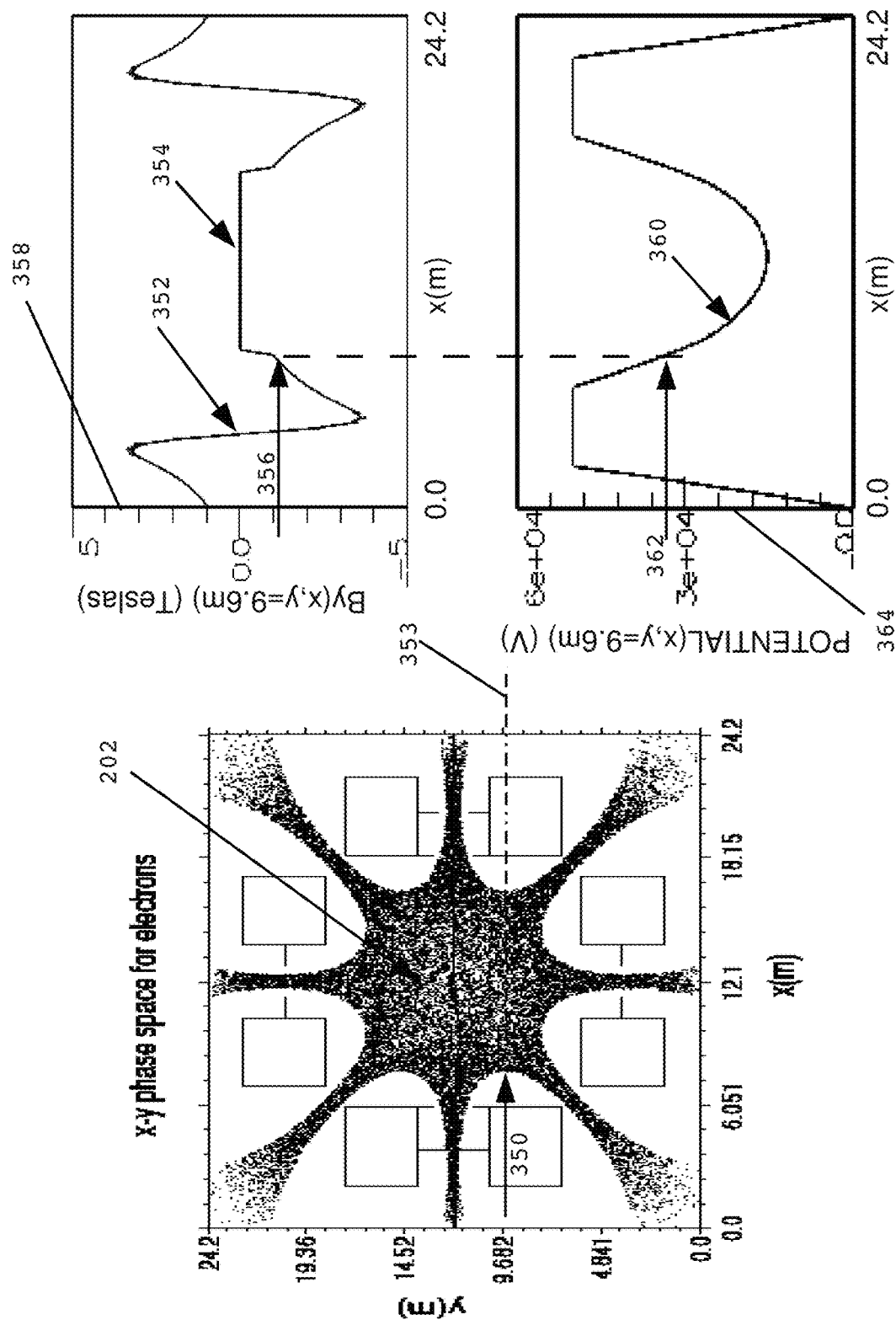

FIG. 3C shows the same electron distribution (202) shown previously in FIG. 2A. In FIG. 3C the tip of the arrow (350) shows the position of the convenient surface point selected for evaluating B and T. The surface of the electron distribution at this point has a useful feature. The tangent to the surface at that position is a vertical line. Because the electrons follow magnetic field lines, this meant that the magnetic field vector also pointed vertically. In other words, the x-component of magnetic field was zero, i.e. Bx=0 at the marked position (350). The third component of magnetic field, Bz, was also known to be zero by symmetry.

The Bz component from the magnets mounted on the top and bottom faces of the cubic reactor canceled due to the up-down symmetry of a cube. The simulation plane was placed midway between the top and bottom magnets, for the very reason that the third component of magnetic field, i.e. perpendicular to the plane, was equal to zero. Magnetic field vectors from top and bottom magnets point in opposite directions, one from the other, and thereby add to zero.

By these arguments, at the chosen point (350) the magnitude of the vector B was found to be just equal to its By component. The top right-hand panel of FIG. 3C shows a graph (352) of the simulated y-component of magnetic field. The three components of the magnetic field vector were available as three of the many standard diagnostics from the simulation. By is a function of x and y in the simulation plane. The graph (352) represents By along a horizontal section of the 2D By-function, the position of the section being specified to pass along the dotted line (353) through chosen point (350). The curve (352) exhibited two separate regions of magnetic field, one inside and one outside the central Wiffleball. In the central region, the field was uniform and of zero magnitude (354), due to the Wiffleball effect. Outside the Wiffleball, the field varied according to the distance to the magnets. The exterior field exhibited pairs of maxima and minima at the positions along the section line (353) nearest the left and right magnet-wires' positions. The magnet-wires themselves are not shown, but their positions can be inferred from the fact that the wires were placed at the geometrical centers of the rectangles representing the magnet boxes, 8 of which are shown in the left-hand panel. The point of the arrow (356) marks the position on the graph (352), at which the field first became non-zero passing through the surface of the Wiffleball. This line intersected the By axis (358) at the point where the magnitude of the field just balanced the outward plasma pressure. Interpolating the intersection point on the vertical scale, the indicated field reads By=−1.1 Teslas.

The electron energy at the surface point (350) was determined from the simulated potential function. For the reasons discussed above, an electron's kinetic energy at any position was equal to the value of the potential at that position, multiplied by the charge on the electron(e). In the lower right-hand panel of FIG. 3C, the graph (360) shows a section of the 2D potential, plotted along the same horizontal line (353) through the surface point (350). A vertical dashed line connects points at the same x-positions in the By graph (352) and in the potential graph (360). To facilitate reading the electrons' energy, a horizontal arrow (362) was placed to mark a point on the potential energy scale (364), from which the relevant value of electron energy was read. The value where the line (362) met the scale (364) reads 34 kilovolts. At the selected surface point (350) the electrons' kinetic energy was thereby found to be T=34 keV.

Having collected the required values of magnetic field and electron energy, the ion density was determined from the equivalent electron density, found by solving the β=1 equation. To translate B into the required cgs units, B=By=1.1T was converted to 11,000 gauss using the standard conversion factor of Teslas to gauss. The kinetic energy T in cgs units was 34,000 electron-volts. Substituting these into the δ=1 equation for electron (=ion) density, the expression for density reduces to: $n=(1.1e4)^2/(3.4e4)/(4.03e-11)$ cm$^{-3}$=8.9e13 cm$^{-3}$.

The only factor still required to integrate the power density was the energy yield per fusing DD pair, Q. This was computed from the data on pg. 44 of the Plasma Formulary. The energy liberated by each DD fusion was shown to be the average of the energy from two equally-probable branches of the fusion reaction. Fifty percent of the time the D+D reaction produces a triton+proton final state, liberating 4.03 MeV of energy. The other half of the time it produces a He$^3$+neutron final state, liberating 3.27 MeV of energy. The average energy yield over many fusion reactions, occurring randomly and continuously in a hot plasma, is the average of 4.03 and 3.27 MeV, Q=½ (4.03+3.27)MeV=3.65 MeV=3.65e6 eV. Converting to cgs units with the standard ratio of eV to watts, Q=(3.65e6 eV)(1.6e-19watts/eV/second)=5.8e-13 watt-seconds.

Using the values of the component factors, as determined above, the integrated power output Pout was computed by integrating the textbook formula for power density inside the volume of the hot-cube containing all the hot ions. The cross-section a, read from the DD graph in FIG. 3A (302), was converted to cgs units by multiplying the resulting 0.025 barn cross-section (316) by the standard conversion factor of barns to square centimeters. One barn equals 1 e-24 square centimeters, therefore a=0.025e-24 cm$^2$. The median velocity converted to cgs became v=(1.5e6 m/s)(100 cm/m) =1.5e8 cm/s. Finally, the edge dimension of the hot-cube, 7.26m, converted to 726 centimeters, and its volume converted to $(726)^3$=3.8e8 cubic centimeters. Combining all factors in cgs units, Pout=½ n$^2$<σv> a$^3$ Q=(0.5) (8.9e13)$^2$< (0.025e-24) (1.5e8)>(726)$^3$ (5.8-13) watts=(0.5) (7.9e27) (2.5e-26) (1.5e8) (3.8e8) (5.8-13) watts=3.1 megawatts.

The crucial performance measure of any fusion reactor is its power-balance. Power-balance was computed as the standard ratio Pout/Pin, where Pout was the fusion power output, 3.1 megawatts just calculated. The denominator of power-balance, Pin, was the power required to confine and maintain the plasma at fusion temperature. From the basic design of Polywell, Pin was the sum of the power to activate the magnets plus the drive-power accelerating the electron beam into the core. The magnets confine the plasma and the drive power heats the plasma. Pin was computed as follows:

The power consumed by the magnets dominated over electron drive in determining Pin, according to the following logic: Magnet design is a well-developed field and many choices of magnets were found available from commercial suppliers. In the prior art, research groups like EMC2 and Kharkov Institute fabricated custom magnets from basic materials. For their small-scale model testing, commercially available magnets might have been a better choice.

Commercial magnets have proven more reliable and less expensive than custom made magnets of matching capabilities. In previous simulations of small-scale reactors, e.g. in Rogers-908 and Rogers-940, a commercial magnet was selected to approximately match the size of the custom magnets used in WB-6. For the simulation of the much larger reactor of this embodiment, the same magnet was virtually scaled up in size to be suitable to produce useful power. FIG. 3D shows a table of specifications of several different standard magnets from GMW Associates of California. Each column of the table specifies a different sized magnet. The magnet selected for detailed simulation is specified in the column referenced by arrow (370).

All the magnets tabulated in FIG. 3D are made in the GMW factory by temporarily winding square-cross-section, hollow copper wire onto a circular spool of diameter equal to the Inside Diameter (372) shown in the table. Many turns of wire are wrapped to build up the desired Outside Diameter (374) and Thickness (376). In the case of the selected magnet, 460 turns (385) of wire are wound. Once the desired dimensions are reached, the coil is removed from the spool and potted in epoxy to make it rigid. To activate the magnet, DC current and cooling water are passed through the wires comprising the wound coil. By varying the DC power-supply's output current, any desired magnetic field up to a specified maximum can be obtained from the coil. In the case of the selected magnet (370), the maximum field at the center of the open bore was specified as 0.16T in the first row (382) of the table. For each magnet, the maximum magnetic field (382) is limited due to a maximum cooling capacity of the water flowing through the hollow wire. The input power must not be allowed to exceed the cooling capacity of the cooling system, or else the magnet overheats and melts.

The magnets of FIG. 3D were too small to confine enough plasma to produce net power. Bigger magnets were simulated by scaling up the size of the selected magnet, shown in table column (370). This scaling was accomplished by multiplying all three of the dimensions of the magnet by a common scale factor. The scale factor is represented in the following discussion by the symbol "S." The 3 dimensions scaled-up were the Inside Diameter (372), Outside Diameter (374), and Thickness (376). Each of these three dimensions was multiplied by the same factor, S, thus keeping the shape of the bigger magnet the same as the original. Keeping the shape the same as the catalog magnet assured that bigger magnets could be made using the same coil-winding technique developed for the standard magnet.

The scale factor S determined the size of the magnet simulated. S=1 specified the standard magnet (370), appropriate for simulating WB-6. As the magnet size was increased in simulating larger scale-models, so did the power required to reach its maximum magnetic field. As a byproduct of sustaining the maximum magnetic field, the power specified in the table (384) was deposited continuously inside the magnet as waste heat. To limit temperature rise, waste heat must be carried away by the cooling water at the same rate it is generated by the consumed power. In the case of the standard magnet (370), the table specified the amount of waste heat to be 1.75 kW (384).

FIG. 3D also shows specifications of other sizes of commercial magnets. Comparing these other magnets with the standard magnet (370) showed how the magnetic field scales with size. For example, the magnet in the first column (380) has maximum field (382) equal to one-half the maximum field of the standard magnet (370). This smaller magnet also has the scale of its three dimensions (372, 374 & 376), approximately equal to one-half the corresponding sizes of the standard magnet. By the definition of the scale factor S these two magnets are related by the value of the scale factor, S=½. This comparison established a universal relationship between size and maximum magnetic field. As long as the shape stays the same, the maximum field increases in proportion to the scale factor S. A magnet twice as big will produce twice the maximum field.

In determining the scaling of Pin as a function of S, the crucial specification was the power consumed by the magnet. The power consumed by the selected magnet is shown (384) in the second row of the table. The power consumed by this larger magnet, 1.75 kW, is seen to be much larger than the power consumed by the smaller magnet, which from the first column (380) was only 110 W. To predict how the magnet power scaling related to the geometrical scale factor S, the following principles of electrical engineering were used:

Electrically, an electromagnet functions like a big resistor. The heating power dissipated by any resistor is, by Ohm's Law, equal to its electrical resistance(R) times the square of the current(i) passing through the resistor. The resistance of a coil, like a simple wire, is proportional to the length of the wire divided by its cross-sectional area. In terms of the scale factor S, the resistance(R) of a coil scales as its circumference, which scales as S, divided by its cross-sectional area, which scales as $S^2$. (For readability in the text of this Specification, the caret symbol often substitutes for superscripting; $S^2$ means S raised to the second power, or in other words S-squared.) The quotient $S/S^2$ equals $1/S$. In other words, as the dimensions of a magnet grows by a factor S, the resistance decreases by a factor $1/S$. From the Plasma Formulary pg. 20, the magnetic field at the center of a circular loop of wire is proportional to the current in the loop divided by the diameter of the loop. The diameter is proportional to S. To raise the central field by the same factor S, as one skilled in the art would see, the current must scale as $S^2$. Combining these factors, the scaled-up power increases by the factor $(i^2)R$, which is proportional to $(S^2)^2/S$ which equals $S^3$. In other words, magnet power scales as S to the third power.

In summary, this analysis of magnet power scaling demonstrates that increasing the size of the three dimensions of a coil by a common factor S, raised the power the coil consumed by the factor $S^3$. By the formula for the volume of a cylinder, the volume of copper in the coil was also proportional to $S^3$; thus, the power scaled in proportion to the volume of the magnet. Since Pin is dominated by magnet power, Pin also scales as $S^3$. In other words Pin scaled as the volume of the magnets.

The scale factor S was chosen to make the simulated vacuum tank about the same size as ITER, the logic being that reactors larger than ITER would not likely be interesting to power companies. ITER has a diameter of about 25m. By trial and error running of the simulation program, the appropriate value of S, to produce a tank diameter 25m, was found to be S=30. In FIG. 3D the power consumed (384) shows as 1.75 kW. Six of the scaled-up magnets would therefore consume six times the reference magnet's power and also times the cube of the scale factor S. Plugging in the numbers, this power would be Pin=6×1.75×30$^3$ kW which equals megawatts.

The size of Pin far exceeded the expected power output of Pout=3.1 megawatts. For this first embodiment, the power-balance is predicted to be 3.1 divided by 284, which equals only 0.011. This power-balance is two orders of magnitude smaller than the desired power-balance of unity. To obtain a practical power reactor, a design change was needed to improve the power-balance by more than two orders of magnitude.

A possible improvement would be to substitute the more reactive fuel deuterium+tritium 1275 (DT) for the chosen DD fuel. According to the cross-sections shown in FIG. 3A, at the ion energy indicated (314), the DT curve (304) is more than two orders of magnitude bigger than the DD curve (302). Using the more reactive fuel would more than make up the difference required to build a break-even Polywell reactor. However, DT fuel comes with the disadvantage that it needs a supply of a radioactive and expensive gas, either tritium or a compound of tritium. In the opinion of the Applicant, this would make a reactor burning DT unacceptable to power industries. Power industries are the intended end users of the subject invention. The substitution of DT fuel for DD fuel was not pursued in simulation, but is within the scope of the invention.

FIGS. 4A-4B

Second Embodiment

Substituting Bitter Magnets for Coil Magnets

As described in the previous section, the textbook expression for the power output of the reactor was simplified using reliable approximations. The approximate expression used was Pout=½ n$^2$<σv> a$^3$ Q. With the approximations, "n" was the ion density determined from the β=1 condition, "a" was the DD fusion cross-section evaluated at the median velocity, "v" was the median ion velocity, "a" was the hot-cube's diameter, and "Q" was the average energy yield of each fusing DD pair. Each of these 5 factors could be increased by creative design choices. Increasing any or all of them would increase Pout, which is the product of all of them. Increasing Pout would increase the power-balance, which equals Pout/Pin.

The most responsive parameter to design improvement was the ion density n. The density can be increased by increasing the surface magnetic field B.

The density n depends on the surface magnetic field and electron energy via the β=1 formula, n=B$^2$/T/4.03e-11, where B is the surface magnetic field and T is the surface electron energy. This equation shows that the density n rises quadratically with B-field. In the previous paragraph, the expression for Pout rises quadratically with n. By the law of exponents, the two equations combined show that Pout rises as the fourth power of magnetic field B. This fourth power dependence meant that doubling the strength of B-field raised Pout by 2$^4$, which equals a factor of 16. The exponential sensitivity of power output to the magnetic field meant that raising the magnetic field strength was the first choice for improving the power-balance.

In simulating the first embodiment, a magnet was chosen from the catalog of GMW Associates, shown in FIG. 3D. Coil magnets, of which the GMW magnets are typical, have the advantage of being commercially available and robust. But they do not have the highest field-strength for their size. The magnetic field is limited by the cooling capacity of the water pushed through the hollow core of the wire. According to catalog entry (385), the magnet (370) was manufactured by winding 460 turns of continuous, hollow wire.

More-efficient, water-cooled magnets have been developed for physics experiments. The magnets, called Bitter magnets, were invented by Francis Bitter in 1933. A recent Bitter design was described in a 2013 publication by Sabulsky et al. The article, "Efficient Continuous-Duty Bitter-Type Electromagnets for Cold Atom Experiments," is hereinafter called Sabulsky-2013. The article contains extensive test data and engineering details. The Sabulsky magnet-design can be adapted to the present embodiment without undue experimentation. Sabulsky-2013 describes the general advantages of the Bitter design over conventional (i.e. wire-wound) electromagnets in the following paragraph, quoted from the article:

"Most [conventional, e.g. GMW] electromagnets used in cold atom experiments are constructed out of copper wire or refrigeration tubing wound into cylinders. These designs are easy to manufacture and can easily fit around a vacuum component. There are many drawbacks to these designs, however. Electrical power is dissipated into cooling water that flows in series with the current, leading to a large temperature gradient in the device, a high resistance to cooling water, and significant differences in temperature between the water supply and return. Furthermore, construction of conventional coils requires a significant amount of epoxy, which can degrade over time, and the coil can not be easily modified. Finally, simple wire-wound electromagnets produce weaker magnetic fields by comparison to more advanced [Bitter] designs." Here ends the Sabulsky-2013 quote.

FIG. 4A was reproduced from "FIG. 1." of Sabulsky-2013. Sabulsky's original figure caption was also included (401), and was modified to replace references to colors in the original figure. Sabulsky's color figure and color-references in the caption were modified to make them suitable for gray-scale reproduction. Numbered reference lines replaced the functions of the original colors.

The "a" half of the Figure (400) shows two magnets, arranged facing each other. These two are the only magnets needed for Sabulsky's experiment. Each magnet was supported from one end by a steel mounting bracket (402). This design feature left the bore open and the opposite end of the magnet free of service connections. The same feature is useful in Polywell. A cubic Polywell would be assembled by adding four identical magnets to the two shown in FIG. 4A (400). Other polyhedra besides a cube would also be possible for mounting these magnets, such as the dodecahedron shown in "FIG. 6" of Rogers-908. These other shapes would be obvious to one skilled in the art of Polywell reactor design.

The internal features of the Sabulsky-2013 design are shown in the "b" half of FIG. 4A (416). A Bitter magnet was assembled by stacking identical copper arcs (406), separated by identical insulators (414). The arcs were connected to form a spiral electrical circuit comprised of 31 turns of conductors. An electric current (410) flowed in the spiral to make a strong magnetic field in the hollow bore. A special arc (408), opposite the mounting bracket (402), was of the same shape as the other arcs, but made of brass to add rigidity to the stack. The stack was held in compression by eight screws threaded into the mounting bracket. The compression of the stack was strong enough to resist natural magnetic forces tending to separate the arcs. The compression also sealed in the water so that water did not leak out between the arcs.

Flowing water was supplied to a distribution block (404) inside of which were milled channels distributing the water equally to flow down through four holes and back through four alternate holes drilled through all arcs and insulators. A typical pair of holes is referenced (412) in the Figure. Water flowing down through each one of the holes was split into 31 separate paths. These paths flowed along both top and bottom surfaces of each arc. Each arc was thereby cooled by eight water circuits, four on its top surface and four on its bottom surface. Magnet cooling was improved both by having many water-flow circuits and also by engineering the shape of the water flow paths. In particular, the cooling channels next to the arcs were made 6 mm wide and 0.25 mm high. Like in an air-cooling fin, such a wide, flat shape is efficient for heat conduction.

Using the same simulation program, performance of the Sabulsky magnet was compared to the previously simulated wire-wound magnet of the first embodiment. A ratio of field strengths was derived from the published specification data on the two magnets. This ratio was used as input to the simulation to multiply the maximum drive-current of the magnets, keeping the size the same as the magnet of the first embodiment. The simulation then produced diagnostics that predicted plasma characteristics to be expected if Bitter magnets of the same size replaced the wire-wound magnets already simulated. This technique allowed the structure of the simulation program to remain the same except for changing an arithmetic multiplier of the magnets' drive currents. Simulated magnet currents were raised by a multiplier to adapt the wire-wound magnet's field to the increased magnetic field expected from a Bitter magnet.

The Bitter magnet in Sabulsky-2013 produced a maximum field of 2.0 kilogauss at the center of the bore. But the Sabulsky magnet was smaller than the selected magnet in the GMW catalog. In the previous section of this Specification, it was shown that the magnetic field from a coil magnet is proportional to the volume of the copper conductors in the magnet. Reversing the equation, magnetic field is proportional to the cube-root of the volume of copper. The measured Bitter field of 2.0 kilogauss was scaled up by the cube-root of its volume ratio to the GMW magnet, shown in FIG. 3D (370). This scaling predicted that a same-sized Bitter magnet would have a field four times stronger than the GMW magnet. This factor-of-four was used as input to the simulation program. The factor multiplied the current in the wires representing the magnets, located at the centers of the magnet boxes. Using the stronger magnetic field, the power-balance was computed from the simulation diagnostics by the same technique as was employed for the first embodiment.

An empirical ratio of 4.0 between Bitter magnetic field and conventional, wire-wound magnetic field was programmed into the simulation as a factor scaling the current in the magnets. This scaling simulated magnets having the same shape as the selected GMW magnet, but with 4 times higher magnetic field. Although suitable Bitter magnets are not currently available commercially, they would no doubt be produced commercially if a lucrative market appeared.

Figure 4B:
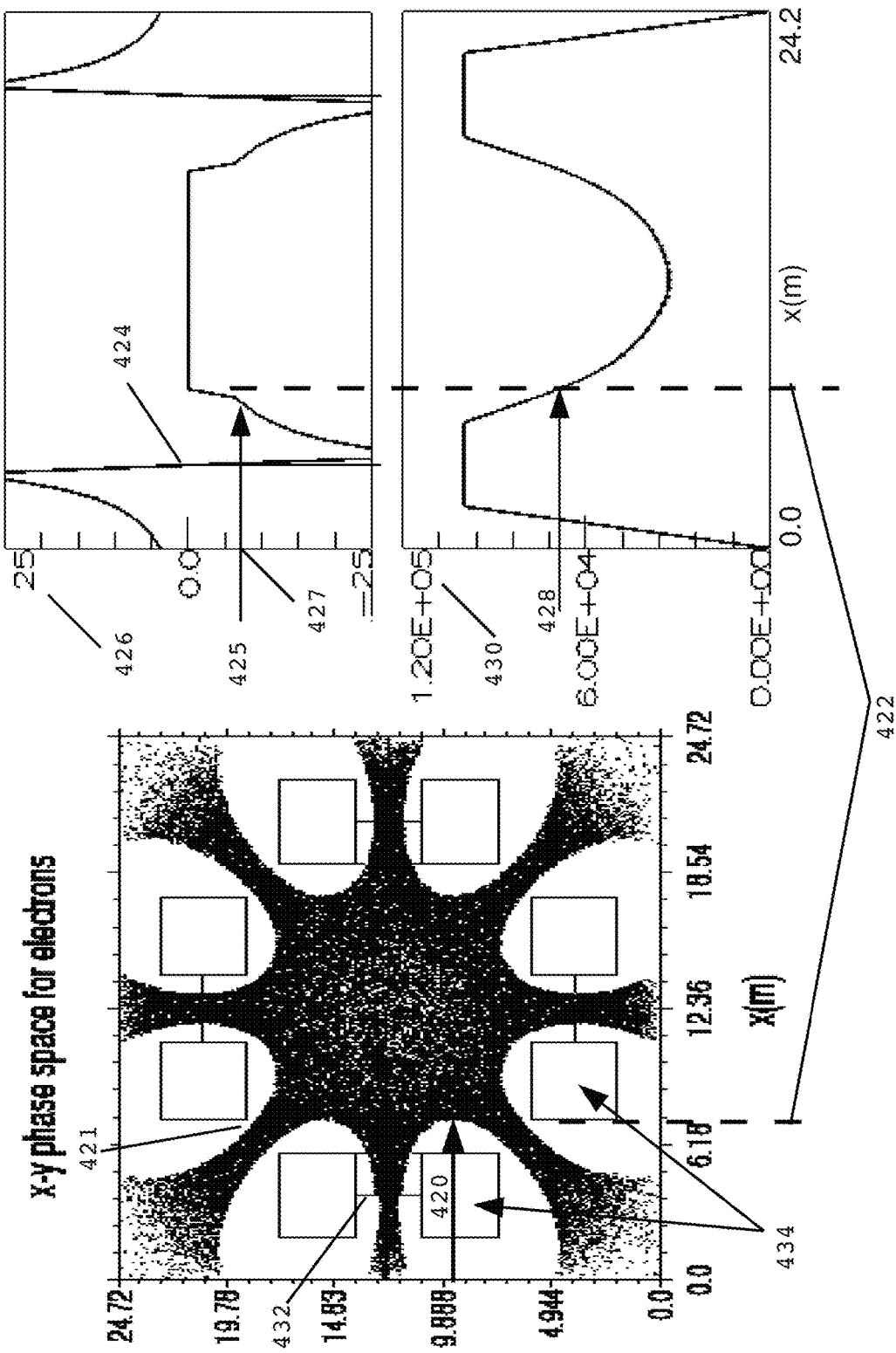

FIG. 4B shows snapshots of diagnostics simulating the same size (S=30) magnets from the first embodiment, but with 4-times stronger fields. These diagnostics were used to calculate the simulated ion density, n. The density increased due to the increased magnetic field. The higher magnetic field of the Bitter magnets also squeezed the cusps to narrower widths. In order to obtain a desired 50% of electron current extracted on the aperture (432), it was necessary to adjust other parameters of the simulation in addition to the magnetic field.

FIGS. 9C-9P

The Structure of the Simulation's Input File and Method of Optimizing

At the beginning of each run of the simulation, the computer reads an input file which described the structure of the reactor, voltages, and drive-currents. From time-zero, simulated time advanced step by step, producing updated diagnostic displays on the computer screen at each time step. FIG. 9C shows the first page of the input file and FIG. 9P shows the last page. The complete input file comprised 606 lines of computer code. Not all the pages of code in the input file were reproduced in FIGS. 9C-9P, only those requiring explanation beyond that already disclosed in the prior art. Here attention is directed mainly to the portions of the input file that have changed in the two years since the application for Rogers-940 was filed. Rogers-940 used the same OOPIC Pro software and a similar input file.

The file shown in FIGS. 9D-9P was created and modified using a standard text-editor program. FIG. 4B shows typical diagnostics output by the simulation program after reading this input file. The file had been edited to describe the second embodiment. The same file was edited further to simulate the third embodiment. It should be understood that this discussion of FIGS. 9D-9P is for the purpose for teaching the workings of the simulation. The input file was further edited to describe other embodiments, even beyond the ones disclosed in this Specification. These other simulations were used to extend the scope and ramifications of the invention.

The first page of the input file is shown in FIG. 9D. It begins with a Description block (929) giving the name of the computer file, "patP6s30c4d81mr2.inp," followed by two lines of description between braces, "{" and "}." Then comes the "Variables" block (915). The Variables block opens with a left brace "{" on the line after (915) and continues to the bottom of FIG. 9F.

In FIG. 9D, assigning the variable "radiusScale" (916) sets the size of the magnets to be thirty times bigger than the standard magnet from GMW. The next line, referenced (917), created and assigned a variable subsequently used to set the field strength of the Bitter magnets as follows: The variable named "currentScale" (917) takes the value 4.0, Sabulsky's empirical ratio of Bitter magnet field to GMW magnet field. Further down in the listing, "magCurrent" (918) takes a value proportional to "currentScale" (917) multiplied by a new variable "magScaleF" (938). Finally, this product is further multiplied by amperes (70), and by turns (466), both from the GMW catalog. This scaling-up of the magnets' current from its catalog value included a factor of the square of magnet size ("radiusScale"), assigned to "magScaleF" (938). This factor accounted for the rise of the magnet current with magnet scale as the square of the scale factor S. The $S^2$ dependence derived from the known rise of the magnet power as $S^3$ combined with the known decrease of the magnet resistance as 1/S.

By these assignments, variable "magCurrent" (918) was prepared for use in the Control section of the input file. In FIG. 9J "magCurrent" occurs implicitly as a factor determining the variable "wS" on the right-hand side of lines (925 and 926). "wS" set the overall scale of the x- and y-components of the vector magnetic field. The assignment of variable "wS" is not shown explicitly in this specification. Its use here was identical to its use in Rogers-940. In that prior disclosure, "wS" was assigned in "FIG. 4D." In the Control section shown in FIG. 9J of this Specification, the time-zero B-field vector was computed and stored as a function of 2D position. This B-field initialization is described further in the section entitled "(2) Wiffleball Size."

The input file also controlled the ratio of extracted electron current to injected electron current. The width of the extraction aperture was determined by an assignment in FIG. 9F. Line (980) reads "cellOuterApertureL=2*cellSize." The expression on the right-hand side of the equals sign is "2*cellSize." This assignment specifies that the dimensions of the opening in the outer aperture of the left-hand gas-cell was to be twice the size of one PIC cell. The size of PIC cells had been assigned previously in FIG. 9E (933). The integer "2" multiplying "cellSize" was the smallest multiplier permitted by a convention of the PIC software. The next larger permitted size would replace the "2" by "4," twice as big. Varying the multiplier of "cellSize" to be 0, 2, or 4 provided too coarse a variation of the extracted current. To obtain finer control on the extracted current, the size of the PIC cells themselves was adjusted. This was done by trial-and-error adjustment of the number of cells spanning the tank, assigned at line (981).

Additionally even finer control of the extraction current was obtained by adjusting the size of the Wiffleball. It had been noted from diagnostics that specifying a larger Wiffleballs produced larger cusp widths. Without changing the size of the aperture, the extracted current could be changed by adjusting the the size of the Wiffleball. For the same size aperture, making a larger cusp width made the fraction of extracted electrons larger.

Relative Wiffleball size was assigned in FIG. 9D line (919), which read "diamagneticScale=0.81." The "0.81" on the right-hand side of the equals sign specified that the Wiffleball diameter was 81% of the space between the opposing magnets. Inside the Wiffleball, the magnetic field was zero, as shown by the central flat portion of the graph in FIG. 3C (354). In operating a real reactor, the Wiffleball size would be expanded to fill completely the space between the magnets. In simulation, the size was adjusted by trial and error to obtain the desired electron current on the extraction aperture. This method of simulation subverted the "normal" use of Wiffleball diameter. The subversion was chosen to side-step one of the limitations of the simulation software. Boundaries specified for simulated structures were automatically shifted by a fraction of a cell-width to align them with the nearest cell boundary. Two cell widths was the smallest aperture width which placed the two edges of the aperture both at cell boundaries.

The use of "cellSize" and "diamagneticScale" to adjust the extracted current was done without loss of generality. Small percentage changes in these variables made correspondingly small percentage changes in the plasma diagnostics important for power-balance. Only the current on the extraction aperture (432) was very sensitive to these two parameters; thus, small changes were sufficient to adjust the extracted current without effecting other diagnostics.

FIGS. 4B-4D

Computing Power-Balance in the Second Embodiment

The power-balance for the second embodiment was computed by the same method as for the first embodiment, using the new diagnostics from the edited input file. FIG. 4B shows diagnostics from which the revised power-balance was computed. As previously, a point (420) was chosen on the surface of the Wiffleball where the magnetic field was known to have only one non-zero component. In the upper right-hand panel, a graph (424) shows the one non-zero component By, plotted along a horizontal line through the chosen point (420). The maximum ordinate value (426) was 25 Teslas, five-times increased from that of the first embodiment.

A horizontal arrow (425) marks a point on the graph (424) at the x-coordinate (422) of the chosen surface point. The magnetic field at this surface point was read from the intersection of the horizontal arrow (425) with the ordinate axis (427), indicating a surface field of By=−7T. As expected, the magnitude of field was much increased from the 1.1T found with the wire-wound magnets. The magnitude 7T field of the second embodiment was more than the factor-of-four increase expected from the four-times stronger magnet current. The extra increase came from the additional expansion of the Wiffleball. Recall that the Wiffleball had been manually expanded to adjust the ratio of extracted to injected electrons' currents.

From the inversion of the β=1 equation, the plasma density also depended on the electron energy at the same surface point. The lower, right-hand panel shows a graph of the electric potential along the same line through the surface point. The dashed line (422) intersects this curve at the point (428) where the value of the electron energy was required. The maximum scale value (430) was manually selected to exhibit the full range of voltage inside the tank. Among the physical components simulated, the voltage ranged from zero at the tank wall to kV at the magnet boxes. The electron energy was read from the intersection of the arrow (428) with the ordinate axis as T=67 keV.

With this knowledge of the magnetic field and electron energy, the electron density was calculated from the inverted β=1 equation. The electron density, due to quasi-neutrality, was equal to the ion density, n. The inverted β=1 equation was as follows: $n=B^2/T/4.03e-11=(7e4)^2/(6.7e4)/(4.03e-11)=1.8e15\ cm^{-3}$. As expected, this density was much bigger than in the simulation of the first embodiment, which had produced a density of only $8.9e13\ cm^{-3}$. The Bitter magnets did indeed lead to increased density. The simulated density, n, rose by a factor of 180/8.9=20.

The next factor required to evaluate the fusion power, Pout, was the <σv> product evaluated at the median ion velocity. The median velocity was read from a snapshot of the ion velocity vs. position, shown in FIG. 4C. The maximum ion velocity, at the center of the potential well, was marked by the horizontal line (440). The velocity at the point where the ions cross the boundary of the hot-cube was marked by the line (442). The median velocity midway between (440) and (442) was marked by the horizontal line (444), which intersected the vertical axis at a scale reading of v=2.0e6 m/s (445).

This velocity 2.0e6 m/s was substantially greater than the velocity of the first embodiment, shown to be 1.5e6 m/s in FIG. 3B (346). The reason the velocity increased between the first and second embodiments was that the simulated electron energy was chosen to be a factor-of-two higher for simulating the second embodiment. Raising the electron energy increased the depth of the potential well. A deeper potential well accelerates the ions to higher velocity. The ion velocity v contributes to Pout both directly and indirectly. It contributes directly as a factor in $<\sigma v>$. It contributes indirectly via the angle-averaged cross-section $\sigma$, which depends on v via the energy ($Mv^2$), shown on the abscissa scale (310) in FIG. 3A.

The cross-section a rises steeply with ion energy. This can be seen referring to FIG. 3A. The ion-energy simulated in the first embodiment was 44 keV, marked by vertical line (314). Exploiting the quadratic dependence of energy on velocity, a new ion energy was computed from the previous energy by multiplying the previous energy by the square of the ratio of velocities. This value of energy, 78 keV, was marked on the abscissa scale by vertical line (317). The ordinate value where line (317) intersects curve (302) was marked by horizontal line (318). At the point where this line intersected the cross-section scale (300), the relevant cross-section was read as $\sigma$=0.045 barns.

The product $<\sigma v>$ was evaluated as the product of the new value of cross-section times the new median velocity. The combined effect of increased a and increased v was to increase the power output Pout by more than a factor of two. It was tempting to go still further in increasing the electron drive energy. However, several considerations weigh against this as a means of further increasing the power output. For one thing, the bias voltage on the magnets, 100 kV, was already pushing the rated maximum voltage of commercially available insulators, connectors and cables.

A second consideration weighs against increasing the electron input energy. The slope of the DD cross-section curve (302) decreases as the ions' energy rises. In the $\beta$=1 equation, density n is inversely proportional to the surface electron energy T. Pout contains the product of $n^2$ falling as $1/T^2$ with $\sigma$ rising with rising energy, but at an ever slowing rate. The inverse dependence of n on T eventually overpowers the rise of a with energy. This competition between a falling function multiplied by a rising function means that an optimum beam electron energy exists, one which maximizes the power output. The optimum choice of bias voltage depends on all the actual values and slopes of these factors. In practice, the optimum value can be determined by testing real devices with a variable-voltage bias-supply. Supplying a range bias voltage to the magnets and finding the one that yields the maximum neutron rate will fix the optimum bias. Such variable-voltage power-supplies are commonly available commercially. Varying the electron energy by trial and error in a real device might be faster and more accurate than using trial and error in simulation. It seems likely that the two magnet bias energies simulated, 50 kV in the first embodiment and 100 kV in the second embodiment, will bracket the optimum bias energy.

From the positions of the cross section curves in FIG. 3A, it would be clear to one skilled in the art of fusion energy that the optimum bias energy would be lower for deuterium+tritium fuel (304) and higher for p+boron-11 fuel (308). In these cases the optimum ion energy would lie to the left, at lower energy, from the points of maximum cross section. For DT fuel the maximum cross section (304) occurs at about 60 keV and for pB-11 it occurs at about 300 keV (308).

The next factor required to compute Pout in the second embodiment was the volume of the plasma of hot ions. As before, this was computed from the diagnostic plot of ion velocity vs. position. For the second embodiment, this diagnostic is shown in FIG. 4C. The volume of hot plasma was calculated as the volume of a cube of edge dimension equal to the horizontal distance between the dashed lines (446). This distance, read from the horizontal scale, was six small divisions. Five small divisions spanned the interval from the origin of the scale, labeled "0.0," to the first large division (448), labeled "8.24." The units of the labels are meters, by the conventions of the simulation. The hot-cube's dimension was therefore the following: a=(6/5)*(8.24m) =9.9m. This size was larger than the size in the first embodiment (FIG. 3B), which was 7.26m. Other things being equal, Pout is proportional to the volume of the Wiffleball. This volume-factor increased as the cube of the ratio of edge dimensions, $(9.9/7.26)^3$=2.5. The plasma volume in the second embodiment was 2.5 times bigger than the plasma volume in the first embodiment. This increase comes from the expansion of the size of the Wiffleball, a fringe-benefit of using the Wiffleball size to tune the fraction of extracted electrons.

Figure 4D:
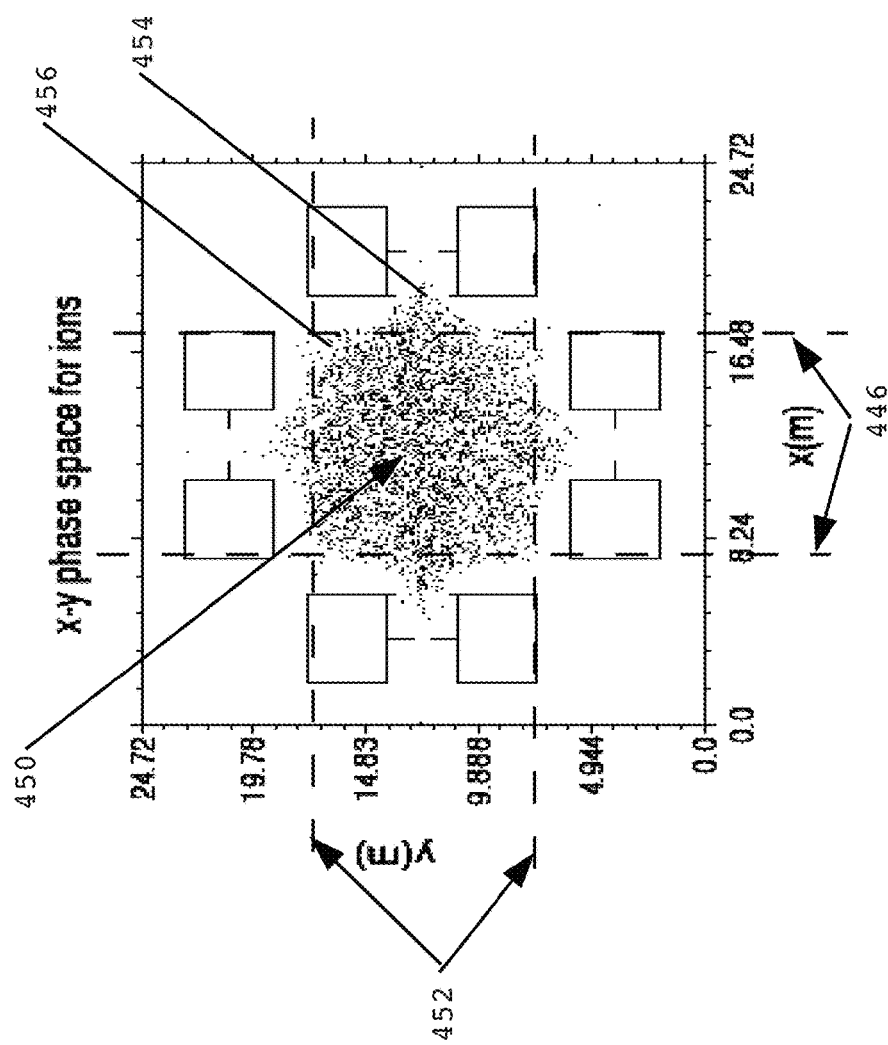

The approximation to cubic plasma shape was made to facilitate integrating the density over volume. To validate the goodness of this approximation, a snapshot of simulated ions' positions in x-y space is shown in FIG. 4D (450). The vertical lines (446) were shown previously in FIG. 4C. The horizontal lines (452) are spaced the same distance apart but rotated ninety degrees from the vertical. The square enclosed by the lines is a section of the hot-cube used to estimate the volume of fusing plasma. The boundary of the ion cloud, shown by the black dots, follows the square outline enclosed by the lines. The agreement was not perfect. Plasma in the cusps (454) was omitted from integration as it should be; it was cold. Plasma inside the square is seen to be sparse at the four corners, one of which is referenced (456). The corners were integrated as if they had the same density, n, as in the center. This part of the volume was falsely counted as containing hot plasma. This error was only a small fraction of the total area of the square, and so was considered an acceptable uncertainty in the computed volume. This error was considered acceptable because this error was estimated to be less than the essential uncertainty in other factors. For example, the complex interplay of a and v contributed an uncertainty to the averaging of $<\sigma v>$ over the hot-cube's volume. This effect created a bigger uncertainty in $<\sigma v>$ than the error in estimating the volume of hot plasma.

The increased plasma size was a beneficial side-effect from the adjusted size of the Wiffleball. As discussed above, the Wiffleball was expanded from the one in the first embodiment. This expansion was required to control the fraction of cold electrons extracted on the outer aperture, shown in FIG. 4B (432). In a real reactor, the loss fraction might better be controlled by directly varying the aperture size, fabricating apertures just large enough to extract half the electron drive current. In a real reactor, the size of the Wiffleball might better be adjusted to optimize other features of the design. Making the Wiffleball as large as possible without having electrons hitting the other internal structure would maximize the plasma volume, and thereby maximize the power-balance. It would be clear to one skilled in the art that a range of design parameters are available in this embodiment. These design parameters can be varied by trial and error to optimize the performance of the reactor, according to various known figures of merit. These various values of parameters are included in the scope of the invention.

Having collected the needed component factors, the power-balance in the second embodiment was computed. Recalling the textbook formula as modified for quasi-neutrality and uniform ion density, the simulated power output was computed from the formula Pout=½ $n^2 <\sigma v> a^3$ Q=(0.5)

$(1.8e15)^2 < (0.045e\text{-}24)$ $(2.0e8) > (990)^3$ $(5.8e\text{-}13)$ watts=$(0.5)$ $(3.2e30) < (4.5e\text{-}26)$ $(2.0e8) > (9.7e8)$ $(5.8e\text{-}13)$ watts=8.1 gigawatts.

The measure of success of any reactor is the power-balance Pout/Pin. The output power, as just computed, was Pout=8.1 gigawatts. The input power Pin was computed by scaling up the input power of the first embodiment, using the electrical characteristics of the Bitter magnets compared to the coil magnets. Pin for the first embodiment was computed to be 284 megawatts. Scaling this previous power-input to estimate the new power-input of the second embodiment was done as follows:

The Bitter magnets' electrical characteristics were modeled as those of a loop of metal wire with characteristic resistance R. By design, the hypothetical Bitter magnet matched the simulated conventional, wire-wound magnets in all three spatial dimensions. As is known by anyone skilled in electrical design, the resistance of a loop of wire is proportional to the circumference of the loop divided by the cross-sectional area of the wire. Since the two magnets were matched in both circumference and cross-sectional area, they would have the same resistance. From Sabulsky-2013, the maximum magnetic field and current of a Bitter magnet would be four times bigger than a wire-wound magnet of the same size. The power dissipated in a resistor is, by the standard engineering formula, equal to the resistance R times the square of the current passing through it. Compared to the first embodiment, the current rose by a factor of four while the resistance stayed the same. This raised the required input-power by the square of the current ratio, $4^2$. Then Pin equaled 16 times 284 megawatts which gave 4.5 gigawatts (GW). Inserting Pin as the denominator of power-balance, the power-balance evaluated to the following: Pout/Pin=8.1 GW/4.5 GW=1.8. This was comfortably larger than unity. The simulated reactor of the second embodiment produced more power than it consumed, paving the way toward a design for practical fusion power plants.

A portion of the output-power, Pout, would be recycled back into the reactor to provide the input power, Pin. The amount of power leftover after subtracting Pin is conventionally called "net power." Net power would be converted by one of well-known means to produce electricity for the power grid. The net power output, which would be produced by the design just simulated, would be the difference Pout minus Pin, 8.1 GW−4.5 GW=3.6 GW. This power would be delivered at the inner surface of the vacuum tank in the form of kinetic energy carried by a mixture of neutrons, protons, tritons, and $He^3$ particles from fusion reactions in the core.

Following the arrival of fusion-output particles at the walls of the vacuum tank, their kinetic energy would be converted to electricity, using a yet unspecified form of power converter. Various types of power converters are well known to those skilled in the art of power conversion. Method and apparatus to convert particle energy into electricity are known in the prior art and are not claimed as part of this invention. A brief summary of optional power converters will be included here to provide context for the invention.

This invention can work with any of a range of possible power-converter designs. Power converters in common use have efficiencies in the range 0.35 to 0.65. For example, power converters operating on the Rankine Cycle have efficiencies around 0.35. Alternatively, electrostatic converters can convert the kinetic energy of charged particles directly into electricity, a process known as "direct conversion." Direct converters can operate with efficiencies as high as 0.65. A drawback to direct conversion is that it can only convert energies of charged particles, not neutrons. The DD reaction simulated in this example produces a portion of its output energy as neutrons, so direct conversion would not be a good choice for use with DD fuel. Direct conversion would be appropriate for aneutronic fuels, such as p+B11, c.f. FIG. 3A (308). For this reason, the efficiency of the Rankine Cycle was used in the following example. A typical efficiency of 0.35 was assumed for the Rankine Cycle. It should be understood that the assumption of the efficiency of the Rankine cycle was only for the purpose of teaching one possible embodiment. The assumption should not be interpreted to limit the scope of the invention.

To estimate the amount of usable power in this example, the electric power available to the grid would be the net power multiplied by the efficiency. The usable net power would therefore be 3.6 GW times 0.35, or 1.2 gigawatts.

FIGS. 5A-5B

Utility of the Second Embodiment in the U.S. Power Industry

A scaling relationship between the power output and reactor size was derived from the modified textbook formula for power output, Pout=½ $n^2 <\sigma v> a^3$ Q. The factors that rise with increasing size are the ion density, n, and the reactor diameter, a. The density, n, rises as the 2nd power of size, so $n^2$ rises as the 4th power of size. The diameter, a, rises in proportion to the magnets' diameter. Combining these factors, Pout rises as $n^2 a^3$, which means the power output Pout rises as the 7th power of size. This exponential gain in power with size means that a reactor only fractionally bigger than the simulated 25m can produce much more power than the 1.2 gigawatts of power estimated by simulation. For example, to double the power, the reactor size would only increase by a factor of $2^{1/7}$ which equals 1.10. Multiplying by the simulated size of 25m yields 28m as the scaled reactor size. In other words, increasing the reactor size from 25m to 28m diameter would double its power output.

On the other hand, smaller power output than the 1.2 GW simulated would not be practical, at least not in this sample calculation, which was specialized to a cubic reactor burning DD fuel. The above estimate of the scaling of Pout referred to the gross power output, not net power. At break-even size the denominator of the power-balance, Pin, equals the numerator, Pout. In other words, the power-balance is equal to one. Net power is the difference between Pout and Pin. When the two are equal, zero net power is produced. Power-balance decreases in a predictable way with the size of the reactor. The denominator of power-balance, Pin, scales as the 3rd power of the size of the magnets, as shown in the previous section disclosing the first embodiment. The power-balance is the quotient of Pout, scaling as the 7th power, divided Pin, scaling as the 3rd power. By the rule of exponents, the quotient therefore scales as the 4th power of size. The size of the break-even reactor would thus be the size of the simulated reactor, 25m, scaled down by the inverse 4th root of the power-balance, $1.8^{-1/4}$=0.86. By this analysis, the size of the break-even reactor would be 25m times 0.86, which equates to 22m. A 22m reactor would have a power-balance of unity, meaning it would produce no net power. It would be obvious to one skilled in the art of power production that reactors of 22m or smaller could not be used to produce net power using the second embodiment.

The second embodiment will be useful to replace most existing coal- and gas-powered electricity-generating power plants. FIG. 5A shows a pie-chart (510). The areas of the pie-slices are proportional to the percentages of world-wide power consumption, classified by type of fuel. The largest slice of the pie is the one on the left (512), representing coal-fueled power plants. As a percentage of the world total, these coal-fueled power plants furnish 39%, as labeled (514) to the left of that slice. Replacing coal-powered plants by fusion-powered plants, built according to the second embodiment, would eliminate this major source of atmospheric pollution.

The next largest source of pollution, gas-powered plants (513), would also be replaced by the Applicant's fusion-powered plants. This would eliminate another 22% of polluting fuels, as shown in the label (516) below the pie.

FIG. 5B shows a table (520) containing a list of coal-powered plants in the U.S. The power plants entered in the table are grouped in order of increasing power output. A dashed line (522) is shown separating the chart into upper and lower parts. Above the line (522) are groups of plants producing less than 1000 MW each. Below the line (522) are groups of plants generating more than 1000 MW each. From the preceding discussion, the second embodiment was not suited to replace power plants producing less than 1000 MW. The plants above the line (522) are too small to benefit from the second embodiment. The second embodiment was found suitable to replace the plants having larger power output, listed below the line (522).

Further analysis of the table was made to calculate what fraction of the energy demands of the U.S. could be replaced by fusion power according to the second embodiment. The 3rd column, headed by the title "Total Capacity" (524), lists the total power output capacity of all the plants of each size. The numbers in the 3rd column (524) were summed above the line (522) and recorded (526). The numbers below the line (522) were summed separately and recorded (528). The total capacity of the plants below the line (528) greatly exceeds the total capacity of the plants above the line (526). This means that most of the energy from coal comes from large power-plants, i.e. the ones producing more than 1000 MW of power each. The reactor design of this embodiment will eventually replace most of the coal-powered plants listed below the line (522), approximately ⅔ of the total coal-powered plants presently in operation. This will have a major, beneficial impact on society, dramatically improving the world's air-quality.

The simulation and discussion of this section showed that the second embodiment of the invention will eventually be very useful to the power industry. In the meantime, the predictable scaling of the design will immediately speed small-scale models' development toward building larger and larger scale models.

FIGS. 6A-6C

Third Embodiment

Pumping Out Cold Electrons Via Reduced Corner-Gaps

This section of the Specification discloses an alternative apparatus for removing cusp-trapped electrons from the plasma. This apparatus comprises a third embodiment of the invention. The third embodiment will be compared to the second embodiment for performance.

In the process of developing the apparatus of the third embodiment, a simulation was performed which demonstrated how badly the prior art was malfunctioning before providing a means of pumping out cusp-trapped electrons.

Analyzing this simulation's diagnostics sets the stage for curing a fatal problem with Polywell in the prior art. The demonstration only became possible once the input file had been expanded to provide additional diagnostics needed to demonstrate the success of the third embodiment. The same input file that demonstrated its success was later used to demonstrate its failure. Changing the simulation from demonstrating success to demonstrating failure only required adjusting one of the simulation's variables by a small amount. Although the apparatus simulated belongs to the prior-art, the METHOD of showing its failure is new, only made possible by the improved simulation from an improved input file, about to be disclosed.

Figure 6A:
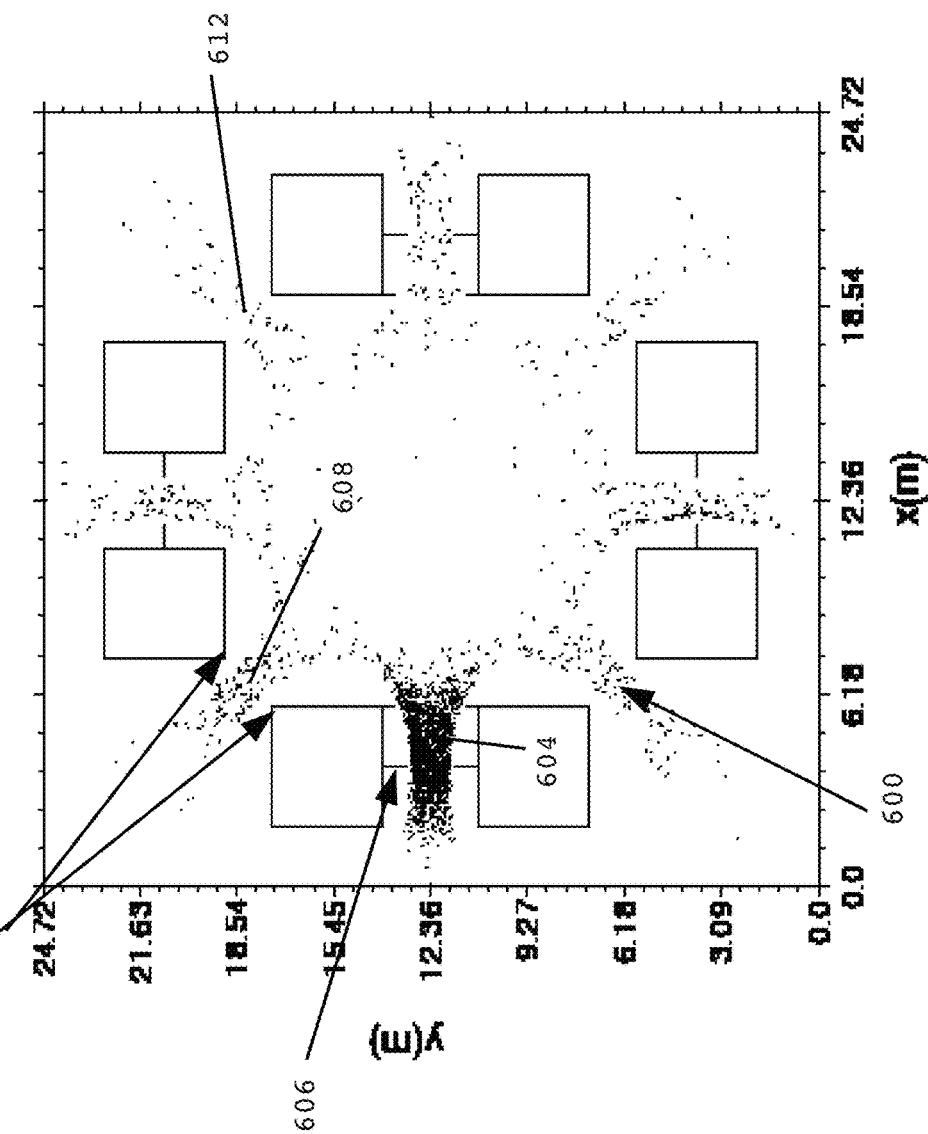

FIG. 6A shows a snapshot of simulated, secondary electron particles, each particle represented by a black dot. "MCCelectrons" (602) were simulated by Monte Carlo Collisions (MCC), an executable feature of the simulation software. MCC simulated gas ionization in the fuel-gas, contained in a gas-cell (604) located in the left-hand cusp. The apparatus simulated in FIG. 6A differed from the previous apparatus, shown in FIG. 2C, in only one detail. In the new simulation the left-hand aperture (606) was opened a little wider than before. While the simulation was running, the dots representing the secondary electrons were seen to circulate back and forth through the aperture (606) without hitting it. As the simulated time advanced, each secondary electron gained energy from collisions with the incoming electron beam and gradually migrated to become trapped in other cusps. The shape of the distribution in the nearest adjacent cusp (608) was typical of all the other cusps. The density of particles was seen to be greater in the cusps near the gas-cell (600 & 608) than in those farther away, such as the cusp labeled (612). This was because it took time for the electrons to migrate around the outside of the potential well to reach the farther cusps. At the time of this snapshot, the electrons which were trapped in cusps farther from the gas-cell, for example in the cusp indicated (612), were similar in shape to the nearer cusps, but lower in density because of the early time of the snapshot.

Figure 6B:
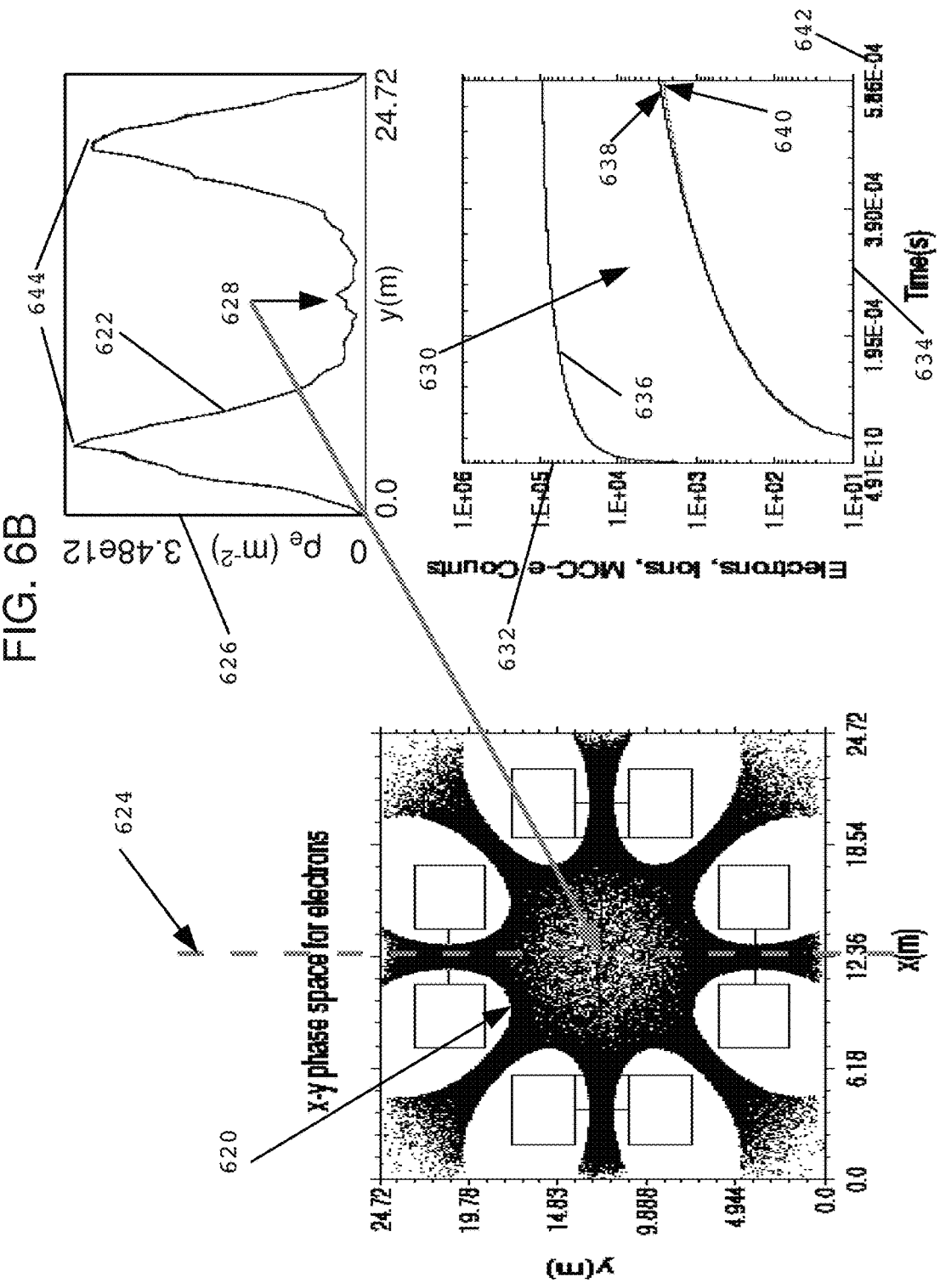

The simulation separately tracked secondary electrons and primary electrons from the emitter. FIG. 6B shows a snapshot of the positions of the primary electrons (620) in the central plane of the reactor. Graph (622) shows the density of electrons along a vertical path (624), through the center of the reactor. The ordinate (626) of this graph is a linear scale of electron counts per unit area of the simulated central plane. Without any means to extract them, down-scattered, primary electrons accumulate in the cusps, leaving the center of the reactor (628) largely devoid of electrons. This type of electron distribution is a disaster for power-balance. An unavoidable characteristic of bulk plasmas is quasi-neutrality. The lack of electrons at the center was necessarily balanced by a lack of ions at the center. Lack of ions translates to lack of fusion. Lack of fusion translates to negligible power-balance.

This configuration of this prior-art apparatus, with no mechanism for extracting cold electrons, is shown to illustrate the magnitude of the problem that the invention sought to solve. Unless some means of extracting cold electrons were added to the basic Polywell, the simulation showed the power-balance would always be poor. In FIG. 2C, a first embodiment was shown to improve power-balance by extracting cold electrons with a narrow aperture (216). Without that extraction, FIG. 6B showed that the reactor functioned poorly, due to the relatively low central ion density.

Not only was the central electron density low, but the potential well was unstable, decaying in later simulated time. This was demonstrated by a simulation-diagnostic (630), shown in the lower right-hand panel of FIG. 6B. A logarithmic ordinate scale (632) showed the numbers, as a function of simulated time (634) of the three types of particles tracked by the simulation. The simulated counts of electron-particles (636), ion-particles (638), and MCCelectron-particles (640) were plotted as separate curves. The curves representing ions (638) and MCCelectrons (640) are seen to be almost identical. They were barely resolved only at the latest times, i.e. at the tips of the arrows (638) and (640), when they slightly separated vertically. The almost identical ion and MCC-electron counts show the two particles were equally well trapped in the reactor. Trapped ions were desired. Trapped secondary electrons were not. Because secondary electrons had lower energies than primary electrons, they tended to concentrate in the cusps. Methods developed to get rid of the secondary electrons also got rid of down-scattered primary electrons. This was the advantage of tracking secondary electrons. Tracking the secondaries proved useful; they were like tracer bullets indicating where to aim the simulation.

Instability was evidenced by the fact that the number of primary electrons continued to increase indefinitely with time. In a practical reactor, the electrons' curve (636) would level to a constant value at later times, required for steady-state operation. This curve (636) kept rising with time, even at the latest time simulated (642). At still later times (not shown), snapshots of the electrons' density (622) showed that a larger and larger fraction of primary electrons became trapped in the cusps. The peaks (644) grew higher and higher relative to the central density (628). As time went on, a smaller and smaller fraction of primary electrons was held at the center (628); larger and larger fractions were held in the cusp peaks (644). The decreasing fraction of electrons at center caused the depth of the central potential well to become shallow with time. There were fewer negative electrons at center to attract the ions to center. Eventually the potential well vanished and the ions all escaped. To reach steady-state, it was necessary to find a way to extract cold electrons.

FIG. 6A shows that the spatial distributions of electrons in the corner cusps (600, 608 & 612) were similar to the spatial distribution in the cusp of their birthplace (604). In the corner cusps, a typical one labeled (608), the spatial distribution of secondary electrons filled the space between the magnets (610) almost uniformly. This suggested that the magnet boxes (610) could be used to extract cold electrons by squeezing the boxes in on the corner-cusps' distributions. To make the third embodiment, the spacings of all the magnet boxes were decreased, moving them closer together at their corners. Corner spacing (610) was typical of the four corner spacings before the magnets were squeezed together.

FIG. 6C shows a snapshot of electron positions (650) in the third embodiment. While the simulation software ran on the computer, the electrons' positions changed on the computer screen. The electrons were observed to circulate out and in along the eight cusp lines. A typical cusp is the one in the lower left corner of the tank, indicated by reference arrow (652). Some of the recirculating electrons in the cusp (652) were observed to hit the corner of the magnet box at position (654). The magnet boxes were modeled as electrical conductors by the simulation program. According to the convention of the simulation, electrons hitting such conductors were removed from the plasma and their charges drained to ground. The current of electrons hitting the magnet boxes was again adjusted to equal half the injected current. The gaps between the magnet boxes in all four corners were decreased by trial and error. As a standard feature of the simulation program, the totals of each type of particles' currents on the magnet boxes, and separately on the tank walls, were displayed as functions of time. The spacing of the magnets was decreased step by step and the simulation run over and over, until the desired fraction of one-half was displayed.

The sum of the electron current on all the magnet boxes plus the electron current on the tank walls was found to be exactly equal to the specified injection current from the emitter. This was as expected from the known principle of charge conservation. In the third embodiment, the apertures in the magnets' bores were set wide open so as not to intercept any electrons. With no current falling on the apertures, the magnet boxes and tank walls were the only remaining structures capable of extracting electrons from the plasma. The physics principle of charge conservation, plus the condition of steady-state density, guaranteed that the sum of the electron current lost on magnet boxes, plus the electron current lost on the tank walls, equaled the injected current. That the expected relationship was observed in the diagnostic displays confirmed that all the electrons were accounted for and that the magnet spacings were correctly adjusted.

The MCCelectrons were separately tracked. For them, charge conservation required that the sum of the MCCelectrons current hitting the magnet boxes equals the ion current hitting the tank walls. That the rate of production of ions equaled the rate of production of MCCelectrons was guaranteed by the nature of neutral gas ionization. That the ions were lost only on the tank and the MCCelectrons only on the magnet boxes was visible from the on-line diagnostics' displays of particle positions.

Although MCCelectrons interact with the fields and with each other like regular electrons, they were given a unique name to identify their birthplace and birth-energy. The name "electrons" was assigned in the input file of the simulation to name the electrons born in the electron emitter at the tank wall. By this convention, "electron" is used in this Specification to mean "beam electron" as opposed to MCCelectron, which refers to a secondary electron.

In the upper right-hand panel of FIG. 6C, the graph (660) shows a 1D section of a standard simulation-diagnostic, the 2D density of electrons. As before, the section was taken along a vertical line (662) through the center of the tank. The ordinate axis (626) was matched to have the same scale as in the previous FIG. 6B. In the previous case, the scale had been automatically adjusted by the simulation program to accommodate the maximum electron density found by its searching the 2D simulation plane. The same full-scale value was manually set in FIG. 6C to match at the top (664) of the ordinate scale (626). Comparing the previous central density (628) with the new central density (665) showed the improvement made by positioning the magnets closer together. The central value of electron density (665) is about twice as big as it was previously. More importantly, the relatively high densities of cusp-trapped electrons, seen previously in FIG. 6B (644), are much reduced. In FIG. 6C the remaining peaks at the same positions (667) are much smaller. Even in the absence of cusp-trapped electrons, such modest peaking of density was to be expected in the regions (667). Recirculating electrons are squeezed together by the converging magnetic field lines. Along the vertical line (662), the field lines are close together at the centers of the bores of the top and bottom magnets, causing the modest peaking (667) remaining in the third embodiment. Squeezing a plasma, like any compressible fluid, increases its density in the local region where the squeezing takes place.

The most important improvement of the third embodiment can be seen in the lower right-hand panel of FIG. 6C (670). The graph (672) shows the number of electron particles in the simulation as a function of start-up time plotted along the abscissa (678). The number of electrons (672) reached a steady-state value early in the start-up and remained constant for all time. The number of ions (674) rose continuously during the simulated start-up time and reached a constant value at the latest time simulated (680). Constant electron and ion numbers, independent of time, were the essential signs of steady-state being reached. These signs were missing in the previous simulation, shown to demonstrate the failings of the prior art. In FIG. 6B the electrons' counts (636) rose indefinitely with time, with no sign of leveling off.

Returning attention to the lower right-hand panel of FIG. 6C, the graph (676) shows the number of secondary MCCelectrons as a function of time. Secondary electrons were cold electrons born one-for-one with the ions in the gas-cell. For reasons discussed above, cold electrons were not wanted in the plasma. The number of secondary electrons reached a constant-in-time value (676), an order of magnitude smaller than the number of ions (674). This was a vastly different situation from the previous simulation, before the magnets were moved closer together. Graphs in FIG. 6B (630) showed the secondary electrons' number (640) nearly equaled the ions' number (638), even at the latest time simulated (642). Moving the magnets to new positions removed cold electrons and left behind ions and hot, primary electrons occupying the central plasma. This is the essential function of the new magnets' positions in the third embodiment.

Re-positioning the magnets to be closer together was an alternative way of removing cold electrons, alternative to the narrow aperture shown in the left-hand panel of FIG. 4B (432). The corners of the magnet boxes had a vastly different structure and occupied different spaces than the apertures. For this reason, using the magnets to accomplish the same function as the apertures provided certain advantages for the third embodiment over the second embodiment.

FIGS. 7-7C

Comparing the Second Embodiment with the Third Embodiment

Figure 7:
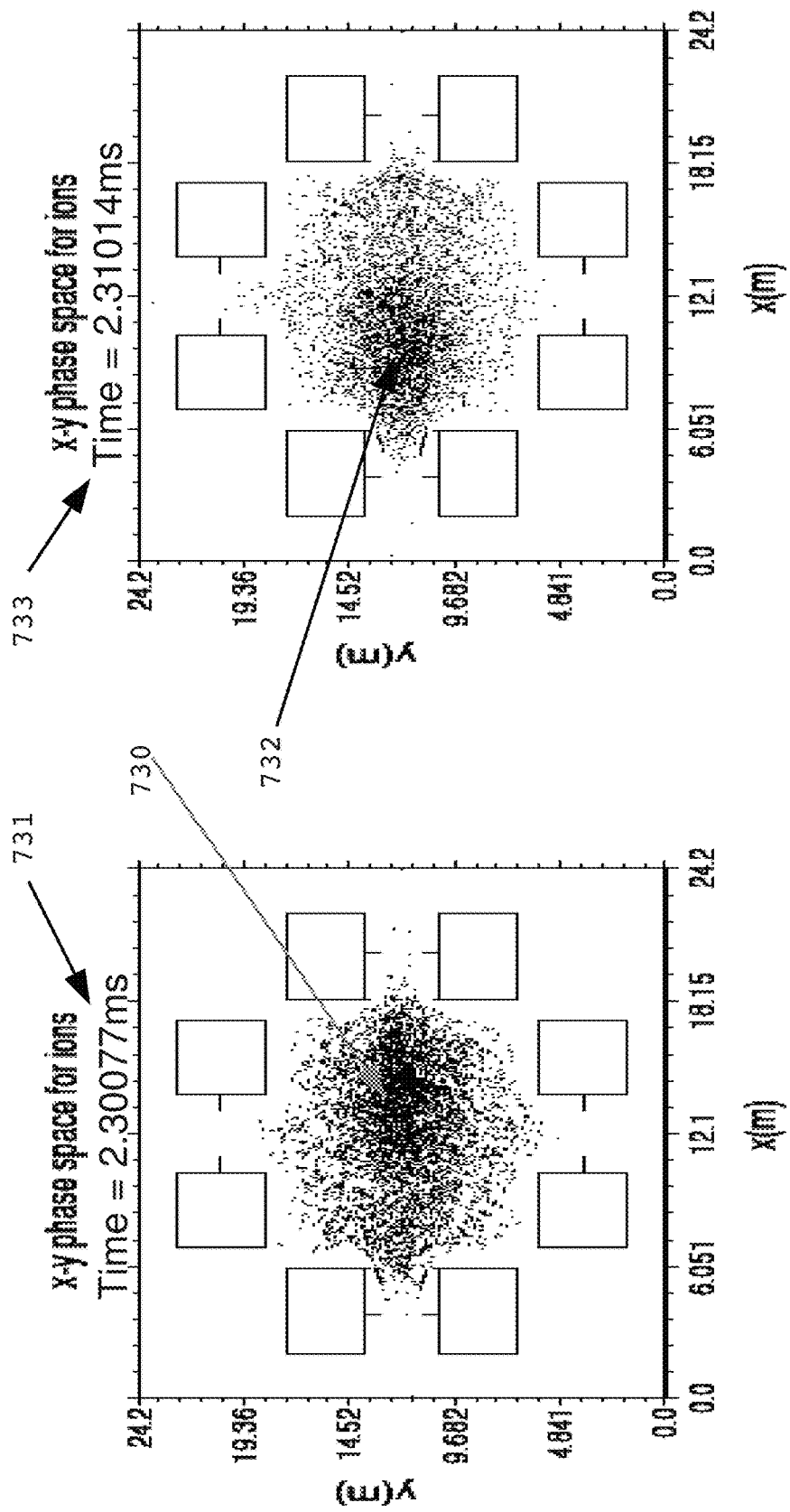
Figure 7A:
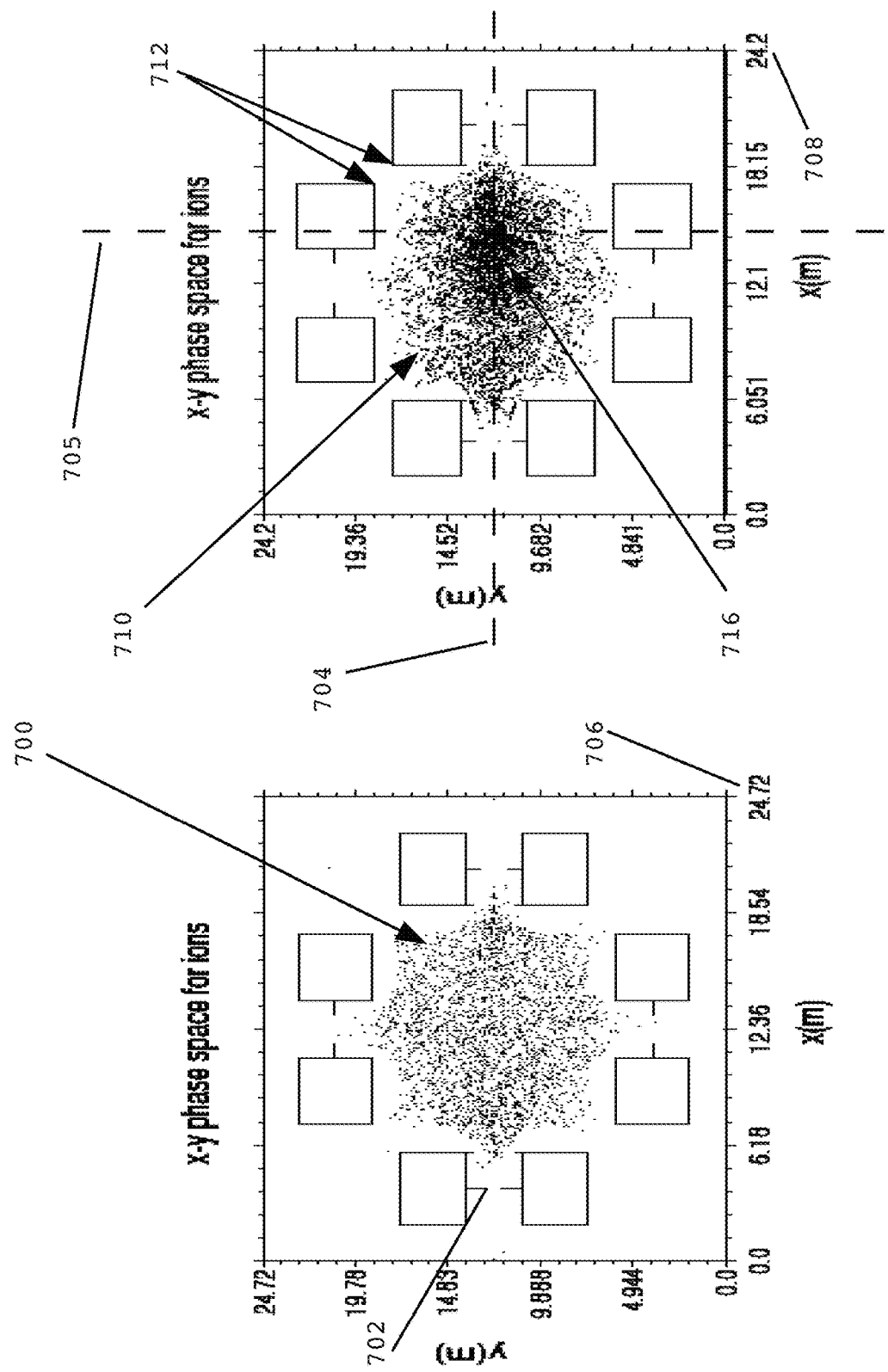

FIG. 7A shows snapshots of ions' 2D positions late in start-up, 2-3 ms after time-zero. A snapshot of the second embodiment is on the left (700) and a snapshot of the third embodiment is on the right (710). Recall that the second embodiment is characterized by a narrow aperture (702) and the third embodiment is characterized by magnets close spaced at their corners (712). The magnets used in simulating the third embodiment were the same Bitter magnets as in the second embodiment. With these magnets moved closer together, the third embodiment had a smaller vacuum tank, 24.2m (708), vs. 24.72m (706). The new size was only slightly smaller than the former size. From the β=1 condition, quasi-neutrality, and equivalent electron energy, the ion density was expected to be nearly the same in the third embodiment as in the second embodiment. Surprisingly this was not so.

In the second embodiment, the snapshot (700) showed the density of ions to be uniformly distributed inside a bounded, 2D region. The third embodiment (710) showed ions concentrated in a bunch (716), located to the right of center. In the on-line display of this diagnostic, the bunch (716) was observed to travel periodically back and forth across the tank with little change of shape. No similar bunching of ions or coordinated motion was observed in the second embodiment. In that case, start-up led directly to the uniform distribution (700) shown in the left-hand panel.

While the simulation ran, it displayed a control panel showing elapsed time and selectable control buttons to "Start" and "Stop" the simulation. The simulation was manually stopped and the elapsed time was recorded by hand from the screen. FIG. 7 shows snapshots taken when the bunch was observed to be on the right-hand side (730) of the bounded region. The time of the snapshot (731) was entered by hand at the top of the panel. A short time later a second snapshot showed the bunch had moved to be located on the left-hand side (732). The time of that snapshot was also recorded (733). The later time (733) differed from the earlier time (731) by ten microseconds. By watching the motion of the bunch and recording the displayed time at each crossing back and forth across the tank, an average transit time was estimated by repeated hand calculations. This transit time was found to be equal to the diameter of the potential well divided by the average velocity of the individual ions crossing the well. The bunch bounced with the same velocity as the individual ions comprising it. The velocity of an ion at each position could be calculated from the known relationship between a particle's velocity and its energy. The energy of an ion at any instant was determined by the voltage of the electrostatic potential at the ion's instantaneous position.

To refine the measurement of the bunch's bounce time, a diagnostic recording the ions' charge density was added to the simulation. The charge density in a selected PIC cell was recorded as a function of time. FIG. 7A shows the selected cell's position as the point of intersection of a horizontal line (704) with a vertical line (705). The ions in the snapshot (710), with the dashed lines overlaying them, were copied from the previous snapshot in FIG. 7 (730).

The horizontal position (705) of the sample-point was chosen to be half-way from center to the outer surface of the Wiffleball. The diameter of the Wiffleball had already been adjusted, as described above, to obtain the desired ratio of injected to extracted electron current. The selected diameter of the Wiffleball was chosen as a convenient measure of the diameter of the potential well. The well diameter was a secondary plasma parameter, not known at the time the variables are assigned in the input file. The diameter of the potential well determined the separation of the turn-around points of ions as they reflected back and forth. The diameter of the potential well had been observed to be approximately equal to the diameter of the Wiffleball. The diameter of the Wiffleball was a parameter predetermined by editing the input file; thus, it served as an estimate of the diameter of the potential well, an estimate known at time-zero. By choosing the sample point to be deep in the potential well, the entire bunch was assured to pass through the sample point on each bounce.

Displaying a diagnostic of the ions' charge density was accomplished by utilizing a previously unused feature of the simulation program. Approximately 25 standard plasma diagnostic plots are provided by default with the OOPIC Pro software. Ions' charge density was not one of the standard diagnostics. To define this new diagnostic, the input file to the simulation was expanded to include the "Diagnostic" operator shown in FIG. 9P at reference line (990). Following the word "Diagnostic" are 10 lines of OOPIC Pro code defining how the charge density was to be sampled and stored. The diagnostic was formed by the simulation program by analyzing the ions' motion as instructed by these 10 lines of code. The lines pointed-to by the arrows (991) defined the physical position of a selected point in the simulation plane. The horizontal coordinate of the point was defined in terms of a variable named "dia2," occurring on the right-hand side (995) of the assignments indicated by the two arrows (991). Variable "dia2" was assigned in the Variables block as shown in FIG. 9D (920). The expression on the right-hand side of (920) evaluates to one-half the diameter of the Wiffleball. Wiffleball size was chosen as previously described and will be described further in the subsequent section of the Specification entitled "(2) Wiffleball Size." The position defined for the sample point was also marked by the intersection of the dashed lines in FIG. 7A.

In order for the stored charge density to have adequate statistical significance, the charge accumulated in the PIC cell at the specified position was averaged from several sequential time-steps. This feature of averaging time-steps was provided by the software designers as a feature of the specified operation of the "Diagnostic" function of the software. The averaging feature was selected by editing in the "Ave=" (992) assignment in FIG. 9P. According to the OOPIC Pro Users Manual, "Ave=" assigns an integer giving a defined number of time-steps to be averaged together. As programmed by the input file, the running simulation stored the time-averaged density as a time spectrum. The interval of time from one stored density value to the next was the number of time steps given by the assigned value of "Ave=." The accumulated time-spectrum was displayed as a graph on the computer screen. The motivation for using "Ave=" feature was to average out statistical noise. Too-little smoothing (the default was one time-step) would leave too much statistical noise, resulting in a jagged time-spectrum. The default value would produce a time spectrum too jagged to analyze the properties of the periodic motion of bunches.

As is known to one skilled in the art of particle detection, statistical noise is present in any measurement involving counting particles. The smaller the count, the larger the noise. In order to make an accurate measurement, a large number of particles must be counted, not just one or two. By the convention of the OOPIC language, the sample point, selected by the four lines of "Diagnostic" code (991), specified an area in the simulated plane consisting of a single PIC cell. The number of ion particles in the whole simulation volume was approximately equal to the number of cells. At any instant in time, the selected cell might have zero, or one or two ions in it, depending on the random motion of the ions. From time-step to time-step the number would fluctuate by a large percentage of its average value. By standard analysis techniques, fractional statistical noise in a particle count is the reciprocal of the square-root of the number of counted particles.

For example, if 100 ions were counted in an interval of time, the statistical noise of the averaged measurement would be 1 divided by the square root of 100, which evaluates to 0.1. This decimal, expressed as a percentage, is 10%. A measurement of 100 ions in the number of time steps specified by the assignment of "Ave=" statement (992) would theoretically result in a density measurement accurate to ±10% of the true value of the density. The actual number of time-steps specified by the "Ave=" statement was made as large as practically possible to obtain the best statistical accuracy in the average density measured at the sample point. An upper limit was calculated for the number of time steps to average in computing the density.

Too-much smoothing would result from averaging too many time steps. Too many time-steps would average together ion-charges outside and inside the bunch as it passed the sample point. Averaging together charges outside and inside the bunch would wash out the difference in sampled-charge between when the bunch was at the sample point and when it was elsewhere. The value specified in the "Ave=" statement was made big enough to average out statistical noise and small enough to not wash out the density differences between cells in the bunch from cells out of the bunch.

In FIG. 9P the expression on the right-hand-side of the "Ave=" equals sign (992) computed the number of time-steps for a deuteron of maximum kinetic energy to cross one-fifth of the diameter of the tank. The expression displayed inside the innermost parentheses (994) was the square of the velocity of a deuteron of maximum possible energy. This expression comes from inverting the usual expression for kinetic energy $E=\frac{1}{2} Mv^2$, to yield $v=\text{sqrt}(2E/M)$. The "sqrt" operator applied to the expression in parentheses (994) invoked the built-in square-root function, the constant 1875 MeV was a deuteron's mass (M) expressed in energy units, c stood for the velocity of light, and numerically the velocity of light was universally known to be c=3e8 m/s. If maximum energy deuterons formed the bunch, the bunch would pass the sample point in the minimum number of time-steps. Calculating the time-steps for the fastest ion guaranteed that the averaging did not wash out the time structure of the bunch.

The logical derivation of the expression (992) proceeded as follows: The fastest possible ion would be produced by the deepest possible potential well. The deepest possible potential well would have depth equal to the maximum possible electron energy, hence the "elecEnergy" factor inside the innermost parentheses (994). The maximum possible electron energy, measured in electron-volts, was numerically equal to the bias voltage impressed on the magnet boxes. The fraction one-fifth multiplying "diameterinCellsX" (993) (which reference number also occurs in FIG. 9E) was chosen by observing that the horizontal size of the bunch in FIG. 7A appeared to be approximately one-fifth of the horizontal (x) diameter of the tank. Averaging this computed number of time-steps preserved the time structure of the bunch's motion, even for the fastest possible ions.

For a consistency check, the value of the expression on the right-hand side of the "Ave=" statement was evaluated by hand using the variable values assigned in the relevant page of input file, i.e. in FIG. 9E. This time estimate, for the fastest possible ion to cross one-fifth the diameter of the tank, evaluated to 1.7 microseconds. From the previous analysis of FIG. 7, it took the bunch ten microseconds to bounce once across the well. To cross ⅕ of the well would take one-fifth of this, (10/5=) 2.0 microseconds. The fastest ion would take 1.7 microseconds, somewhat less time than the observed bunch's 2.0 microseconds. This slight underestimation of the bunch's transit time is consistent with the known property of the potential well being shallower at the edges than at the center. Ions slow down as they approach the edges of the well. Average ion velocity is therefore expected to be less than the maximum velocity the fastest ion would have at the center of the well. The consistency check succeeds.

Figure 7B:
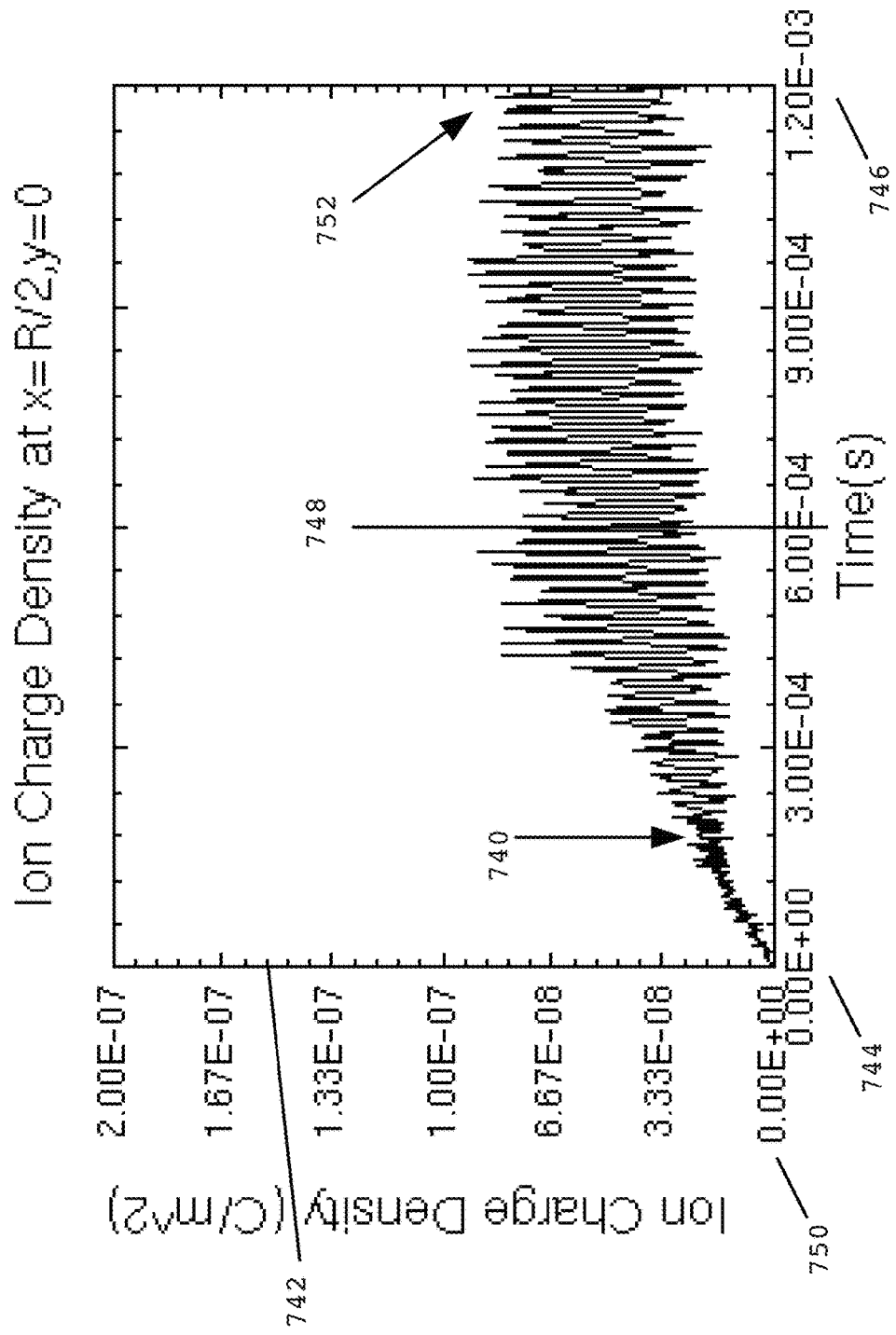

FIG. 7B shows a graph (740) of the ions' charge density at the sample point, as a function of time. The simulation displayed charge density plotted against an ordinate axis (742). The axis (742) is calibrated in units of Coulombs per square meter. Time-zero (744) was, as usual, the time that the electron beam was turned on. The maximum time, 1.2 ms, plotted at the end (746) of the "Time" scale, was selected for the Figure to illustrate the build-up of charge at the earliest times of reactor start-up. Initially the charge density rises from zero (750) as ions are gradually produced by electrons ionizing the gas in the gas-cell.

The most notable feature of the graph is the spontaneous build-up of oscillations beginning at the time indicated by the arrow (740). The oscillations continue, superimposed on a gradually rising charge density, until the latest time plotted (746). The time interval from one cycle to the next was the time it took the bunch to travel from the sample point, across the potential well, bounce from the edge of the well, and then return to the sample point. The cycles continue as long as the bunch bounces back and forth across the well. From the kinematics of motion, the time interval from cycle to cycle was twice the distance across the well divided by the average velocity of the ions traveling across the well.

The graph of oscillating ion density in FIG. 7B was analyzed to more accurately compute the ions' transit time. The computation consisted of counting the number of cycles between two convenient points in time and then dividing the time interval by the number of cycles. The times chosen are shown by a line (748) and arrow (752). The line (748) intersects the time axis at its midscale point, labeled "6.00E-04," or in other words, 0.6 ms. The time indicated by the arrow (752) is the maximum time of the simulation (746), labeled "1.20E-03," or in other words, 1.2 ms. Counting the number of cycles, visible in FIG. 7B, from mid-scale to full-scale of the time axis gave a count of 33 cycles. The elapsed, simulated time from mid-scale to full-scale was the difference of the two times mentioned above, 1.2 ms minus 0.6 ms, which equals 0.6 ms. This was the time it took the bunch to cross back and forth across the well 33 times. The time it took the bunch to travel twice (i.e. back and forth) across the well was therefore 0.6 ms/33=18 microseconds. Coupled with the known diameter of the well, this time measurement gave an accurate measure of the average velocity of the ions.

The bunching behavior of the third embodiment provided a potentially useful tool for measuring the ions' velocity. The higher the ions' velocity the higher their fusion cross-section and, therefore, the higher the power output of the reactor. Measuring the time-interval of the ions to cross the well can, in principle, be accomplished by measuring the frequency of the oscillations of ions' charge density at a point. Such a measurement would provide a valuable aid to tuning a reactor for maximum performance. To determine if such a measurement is indeed practical, further simulations were performed. Published research on ion bunching provided guidance for what simulations to do.

Similar ion-bunching behavior has been observed in small-scale reactor testing at MIT. FIG. 7C reproduces a figure from the 2007 PhD thesis of Dietrich, entitled "Improving Particle Confinement in Inertial Electrostatic Fusion for Spacecraft Power and Propulsion." The Figure shows a graph (781) of voltage from a probe located at the outside edge of a Faraday cage inside a vacuum tank containing a plasma of Argon ions. The vertical axis (782) shows the probe voltage as a function of time plotted on the horizontal axis (784). The Figure's caption stated that the signal oscillated at the "bounce frequency" (788) of the Argon ions. The time scale (784) between zero (780) and maximum (786) spans 1.2 ms. From reading the text of Dietrich's thesis, it appears that the displayed time interval, zero to 1.25 ms, was the entire time range of Dietrich's experiment.

Dietrich chose Argon ions to measure bunching instead of a lighter ion because the heavier Argon ions gave a bigger signal on his capacitive probe, improving the experiment's signal-to-noise ratio. The same oscillating signal might have been seen with a plasma of lighter ions, but this was not possible due to the limited signal-to-noise sensitivity of the experimental apparatus. The oscillating signal measured the density of ions at their turn-around point at the end of their trajectory across the potential well. Although Dietrich's apparatus and method were different than the Applicant's, the character of the oscillations he observed was identical to the Applicant's simulation shown in FIG. 7B. Apparatus similar to Dietrich's could be used with little additional experimentation to measure a similar signal in a reactor of the Applicant's design. Dietrich's capacitive probe and associated circuit are shown on pages 49-50 of Dietrich's thesis.

Another MIT thesis studied the theory of bunching using PIC simulation. A similar oscillating voltage pattern to Dietrich's was disclosed by McGuire in his PhD thesis entitled "Improved Lifetimes and Synchronization Behavior in Multi-grid Inertial Electrostatic Confinement [IEC] Fusion Devices." The plasma phenomenon McGuire called "Synchronization" was more commonly called "bunching" in various prior research publications. Extensive publications from the Weizmann Institute will be described in more detail in the next section of this Specification. The terms "bunching" and "synchronization" refer to the same phenomenon and should be considered interchangeable.

In the Figure caption shown in FIG. 7C (789), Dietrich described the oscillations he observed in his experiment as "Evidence of two-stream instability." The name "two-stream instability" was apparently a mistake. McGuire invented the name to describe the oscillations of density he simulated with OOPIC. Following McGuire, Dietrich adopted the same name by referencing McGuire's earlier thesis. McGuire's thesis is referred to by Dietrich as his reference "[357]."

McGuire's thesis simulated multiple "uniform counter-streaming beams" of ions from six independent ion injectors, one on each of the six beam-lines of his simulated IEC device. On the contrary, both Dietrich's real device and the Applicant's simulated device incorporated only one ion source. With only a single ion source, counter-streaming ion beams could not occur. Yet all three devices, two simulated and one real, exhibited similar oscillations in density. These oscillations could not have been due to "two-stream instability," at least not by the conventional definition of the term "two-stream instability."

For the standard definition of "two-stream instability," McGuire referenced Francis Chen's textbook, "Introduction to Plasma Physics." In Chen's book, section 6.6 is entitled "Two Stream Instability." Here Chen states that the instability exists in plasmas composed of mixtures of electrons plus ions. The spontaneous rise of the instability is described as being due to the Doppler shift between electrons' and ions' plasma frequencies. Doppler shift causes the plasma frequencies of electrons and ions to coincide, which drives the instability as a resonance between ions' and electrons' inherent motions. McGuire's plasma consisted of pure ions, and therefore could NOT exhibit two-stream instability. Dietrich's experiment also had only an ion specie, not electrons plus ions as required to exhibit two-stream instability.

In the MIT theses, the use of the word "instability" to describe the bunching oscillations was perhaps unfortunate. In plasma research an instability is almost always a bad thing. On the contrary, research at the Weizmann Institute showed that "bunching" increased ions' lifetimes, rather than reducing them. Also, in the case of Polywell, the "bunching" oscillations turned out to have a beneficial use, namely providing a non-invasive method to measure the depth of the potential well.

The published MIT simulations and experiment plainly showed the observed oscillation in potential was caused by ions bunched in density, bouncing back and forth across the potential well. The good agreement between simulation and experiment in the MIT work showed that the OOPIC software gave an accurate prediction of a real-world plasma confinement device. The two theses at MIT also gave increased confidence that the present simulation, using the same software package, would give a realistic prediction of the performance of the Applicant's embodiments, even when expanded to full-scale reactor size. This is an important confirmation of simulation because only by simulation can full scale reactor performance be predicted.

In the disclosure of this Specification, the existence of bunching made impractical the computation of the power-balance in the third embodiment. Without bunching, the third embodiment would be expected to have nearly the same power-balance as the second embodiment. Both embodiments employed the same Bitter magnets. The simulated size of the third embodiment was only slightly smaller in size than the second embodiment. Yet the distributions of ions were vastly different, as seen by comparing the left and right-hand panels in FIG. 7A. In the first and second embodiments, an assumption of uniform ion density was used to compute the power-balance. This simplification did not hold for the third embodiment due to the bunching (716).

Even without an accurate prediction of power-balance, the third embodiment offered a promising advantage over the second embodiment. The oscillating behavior of the ions' density at the sample point, shown in FIG. 7B, will allow the depth of the potential well to be known by measuring the frequency of the oscillation. The probe to do that can be located at a point well away from the center of the reactor, as was done by Dietrich. The probe is not claimed as part of this invention, but a method of exploiting the oscillations is claimed. Such a non-invasive measure of this important internal parameter would be a useful aid to tuning a reactor. With many parameters to be adjusted during start-up, such feedback would be a valuable tool for obtaining maximum power-balance.

FIGS. 7A-8A

Physics Principles Underlying Ion Bunching

Dietrich's data, reproduced in FIG. 7C, showed spontaneous formation, bouncing, and decay of a bunch of Argon ions. The maximum amplitude of the signal (781) was a measure of the variation in ion density as the bunch approached the probe and then moved away from it. Following the peak (781), a gradual decay of the amplitude of oscillation occurred with time. At the latest time of the measurement (786), the measured voltage had fallen to a small fraction (790) of its maximum amplitude.

On his page-129, Dietrich wrote the following: " . . . the ion signal can still be seen clearly 1.25 ms after the terminations of injection indicating much better confinement than any other reported test . . . ." A loss of signal after 1.25 ms, such as that observed by Dietrich, would jeopardize the use of such a voltage signal during steady-state. In the full-scale reactor simulated here, it took longer than 1.25 ms to reach steady-state. FIG. 6C showed that ions' density (674) reached steady-state only after 4.5 ms (680). To see if the bunching signal persisted long enough to be useful in steady-state, the Applicant's simulation was used to investigate how long the bunching signal persisted.

FIG. 8A shows left and right-hand panels of diagnostics from running the simulation to the end of start-up. The left-hand panel shows a graph (800) of the density of ions at the sample point as a function of time. The time span shown by the first (802) and last (804) labels of the time axis span the time 2.0 ms to 2.4 ms, extending the time ranges of previously presented simulation (FIG. 7B) and measurement (FIG. 7C). This later time range exhibited a pattern of oscillations similar-to and continuing-from the previous time range of zero to 1.2 ms (FIGS. 7B & 7C).

The time range shown in the left-hand panel of FIG. 8A (802 to 804) was enlarged from the previous time range covering early start-up. The time scale spans a smaller interval of only 0.4 ms instead of 1.2 ms as in FIGS. 7B and 7C. Taking into account the change of time scale, the character of the signal in FIG. 8A (800) was very similar to the simulation for the first 1.2 ms of start-up. However, the amplitude of the oscillations are seen to have decreased at these later times. Statistical noise caused random wiggles to be superimposed on the periodic variation due to the motion of the bunch. The signal-to-noise ratio was obviously sufficient to "measure" the frequency and relate it to the depth of potential. During this time range the bunching would definitely be useful to assist the tuning of the reactor during start-up.

The simulation was extended to still later times. The right-hand panel of FIG. 8A shows a graph (810) of the ion density at the sample point, spanning time from 2.8 ms (812) to 3.2 ms (814). To simulate steady-state, the operational parameters of the reactor were changed between left and right-hand panels. The rate of ion production was reduced to create a constant average density as a function of time. The rate of ion production from the gas-cell was just equal the rate of ion loss due to up-scattering. The plasma density (810) stopped growing with time, and the other plasma parameters also stabilized in time.

When the plasma entered steady-state the density oscillations from bunching suddenly decreased in amplitude. In the right-hand panel the periodic oscillations, if they even still existed, were lost in the noise. Whatever periodic variations in density might have been visible (810) in steady-state were concealed by the random variations of statistical noise. Statistical noise is a fact of life in any PIC simulation. It came from the limited numbers of ions which could be practically tracked with existing computing power. With the decrease in the ion injection current, the periodic signal amplitude was reduced. The smaller signal was swamped by the statistical noise which had been present in the time spectrum all along, but previously at a level less than that of a stronger signal.

In Dietrich's experiment, the amplitude of the oscillations also decreased with time. In FIG. 7C the signal (790) can be seen to be almost lost in noise by the latest time plotted (786). If the measurement had been continued to later time, the density signal would look similar to the Applicant's steady-state simulation in FIG. 8A (810). In Dietrich's case the decrease in density was caused by the well-known process of ionic charge exchange. In charge exchange a hot ion picks up an electron from a stationary gas molecule. This pick-up neutralizes the charge of the hot ion, changing it into a fast moving atom. The usual confinement by electromagnetic fields does not act on neutral atoms. The former ion is no longer confined and soon dies by hitting an internal structure. This process eventually bleeds all the ions out of the plasma, leaving only neutral gas.

No such loss of ions occurred in the Applicant's simulation. In the simulation, ion losses did not reduce the residual ion density. Ions were supplied continuously from the gas-cell, for all times onward from time-zero. During start-up, newborn ions were supplied at a rate that raised the density continuously until the time steady-state density was reached. The rising density was observed as the continuous rise of the average value of the graph (800) in FIG. 8A. The dashed line (806) shows the approximate value of the average density along the central path of the moving bunch, as a function of time. The slope of the line shows the rate of rise of average density during start-up.

Ions were also supplied continuously in steady-state, only at a lower rate than during start-up. Between the simulation shown on the left and right-hand panels in FIG. 8A, the rate of ion production was stepped to a lower value by stopping the simulation, editing the input file, and restarting the simulation with a new, lower value of the parameter controlling ion production rate. As soon as the simulation was started with the reduced rate, the amplitude of the bunching signal became indistinguishable against the background of statistical noise.

With a continuous supply of ions, it was expected that the bunching and oscillations would continue as long as the simulation ran on the computer. This expectation was in keeping with the published literature on the bunching phenomena. In 2012, Froese et al. published a paper entitled "The decay of ion bunches in the self-bunching mode," hereinafter called Froese-2012. The following quote is from the Froese-2012 publication:

"The ability to keep a group of identically charged particles together in a coherent bunch without external intervention, despite the given velocity distribution from the ion source and the Coulomb repulsion force between the ions, has already been observed in both room-temperature electrostatic ion beam traps (EIBT) [2007, 2002, Strasser 2003] and storage rings[1985]. In EIBTs, this can be achieved by ensuring that the trap potential in the ion reflection region is shallow . . . , which ensures that higher-energy ions travel longer paths than slightly lower-energy ions, thus keeping the bunch with a finite energy distribution together over many trap revolutions . . . ."

By this paragraph Froese et al. described the physics of bunching and showed that bunching research has a long history of publications. Continuing to quote from Froese-2012: "The time span over which stable bunches have been observed in the self-bunching trapping mode has been extended by more than two orders of magnitude, to times as long as 12s. The decay of these bunches was observed for the first time, and was also found to be intensity dependent. These decays provide the first experimental support to theoretical models, suggesting that a minimum charge is required for stable bunches." Here ends the quote from Froese-2012.

From reading Froese-2012, it was expected that the bunching behavior would last as long as the ion density remained above a critical level. As Froese phrased it at the end of the above quote, "a minimum charge is required for stable bunches." Keeping a minimum charge was the only condition Froese found they needed to extend the lifetime of the bunch indefinitely. Froese observed stable bunching for as long as 12 seconds, as opposed to only 1.25 ms in Dietrich's experiment. In the Applicant's simulation, the density at the sample point was rising with time, as inferred from the rising slope of the dashed line (806) in FIG. 8A. As simulated time passed, the ion source continued to supply more and more ions, raising the density toward steady-state. Rising density is a characteristic of the start-up phase of reactor operation, required to reach steady-state.

The oscillating density signal continued to later times, as seen in FIG. 8A. As long as the rate of ion production was kept high, as in the left-hand panel, the oscillations continued albeit at a reduced amplitude from earlier times (FIG. 7B). Once the ion supply rate was reduced to create steady-state, the amplitude of the signal decreased and the signal was lost in the noise, as seen in the right-hand panel of FIG. 8A. The data and analysis of Froese-2012 leads to the conjecture that the signal was still present, but only swamped by the statistical noise of the simulation. If the signal is still present in simulation, and if the simulation predicts the real world, the signal can be extracted by various means as soon as a real reactor is built.

Even if the signal has vanished in steady-state for some previously unknown reason, the left-hand panel of FIG. 8A shows the signal persists up to the moment of entering steady-state. The signal would be very useful in start-up, the most critical phase of reactor operation. The bunching phenomena provides a means of measuring the depth of potential well during start-up. This measurement will provide valuable feedback to the operator controlling the reactor during start-up. This will make the third embodiment useful in tuning the reactor, with the objective of obtaining maximum power-balance.

It would be obvious to one skilled in the art of reactor testing to extend the demonstrated principle by trial and error and to prove it useful at later times. Such demonstration could be done either with improved simulation or by refining the design of actual scale model reactors.

FIGS. 9D-9N

Methods for Optimizing the Reactor's Operating Point

The values of a large number of design parameters were needed to specify optimum Polywell operation. In simulation, these parameters were chosen using a combination of theoretical-plasma-physics analysis plus searching the parameter space while watching the simulation's diagnostic displays. Each run of the simulation program was begun by providing to the program an input file defining the structure and operation of the reactor. The input parameters provided a starting configuration for the reactor at the beginning of start-up, i.e. at time-zero. As simulated time advanced, the diagnostic displays showed the crucial secondary parameters of plasma density and temperature. To raise the density and avoid cooling, some of the parameters needed to be changed as a function of time during start-up. This was accomplished by manually stopping the simulation, changing input variables, and restarting the simulation from the stopping time with the same plasma density and temperature.

In the start-up of an actual reactor, changes of parameters may need to occur on a millisecond time scale. In simulation, a millisecond takes hours of computer time to simulate. For this reason, changing parameters manually by watching the diagnostics' displays and editing the input file did not limit the rate of variations of parameters at a millisecond time scale. There was plenty of real-time for the Applicant to react to the changing densities and energies displayed by the computer. The approach to steady-state took place over many milliseconds because the ions took several milliseconds to diffuse across the potential well in the direction perpendicular to the direction of their initial fall. Only after several milliseconds did the ions 2D distribution begin to look uniform throughout the area inside the magnets.

In start-up of an actual reactor, instruments will be provided to measure the performance of the reactor. Feedback from such instruments will be used by a human operator or a controls-computer to adjust the knobs of equipment powering the reactor. The standard measure of fusion power output is the rate of neutron production from the plasma. Detecting and measuring neutrons is a technique well-known to anyone skilled in the art of nuclear particle detection. The power-balance will be maximized by computing the ratio of neutron rate to electrical power consumed by the reactor. The neutron rate measures Pout, the numerator of power-balance. The steady-state magnet power measures Pin, the denominator of power-balance. The operator can read the magnet power from a meter attached to the magnet power supply. DC power supplies, available from companies such as GMW, come with electrical power meters as standard equipment.

The three goals of the METHOD described in this Application were to expand the size of the Wiffleball to completely fill the space inside the faces of the magnets, to form a deep potential well which accelerates ions, AND to raise the internal electron (=ion) density to the $\beta=1$ value at the surface of the plasma. If these three goals are accomplished, the scaling of the fusion power output will be proportional to the magnet size raised to the 7th power. Doubling the size would raise the power output by a factor of $2^7$ which equals a 128-times increase. This is the favorable scaling relationship Bussard sought, leading to a small and thus practical net power reactor.

The following (numbered) sections describe the methods used for selecting each of the input parameters determining the reactor operating point. The methods have been applied to choosing the input variables provided to the simulation. The structure of the input file mimics the structure of the real-world model reactors to be constructed. In the following numbered sections, the association between simulated and real parameters will be plainly stated.

(1) Electron Drive Current

To simulate diocotron pumping, one emitter and one gas-cell were placed on opposite sides of the tank, in the central plane of a cubic reactor. A current of electrons flowed continuously into the core of the reactor where each electron was confined until it up-scattered or down-scattered. Up-scattered electrons were extracted on the tank walls. Down-scattered electrons were extracted on apertures or on the magnet boxes, according to the teachings of this Specification. In order to maintain the overall quasi-neutrality of the plasma, the total current inflow from the emitter was made equal to the outflow of lost electrons hitting the tank and internal structures. The total output currents of electrons falling on all structures adjusts automatically to equal the specified input current from the emitter. This equality is imposed by the basic physics principle of charge conservation.

The characteristics of the electron emitter were defined by a built-in, generic feature of the simulation software called "BeamEmitter," specified in line (960) of FIG. 9L. The definition of the emitter required a whole page of code lines. Similar to other block structures, the multi-line code defining "BeamEmitter" was delimited by opening and closing braces, "{" and "}," following line (960). The most important characteristics of the emitter were the current of electrons, defined in line (961), and the position/dimensions of the emitter, defined by four lines starting with line (962). These two characteristics were specified by arithmetic expressions shown on the right-hand side of the assignments at (961) and (962), respectively. The variables in the expressions were defined previously in the input file, on the left-hand side of assignments in the Variables block of code, shown in FIG. 9E. There the electron current was defined to be 4.5 amperes (A) in line (930). This current was increased as a function of time by editing the input file from time to time during the simulation of the start-up.

The size of the emitter was defined only once for each simulation run by choosing the assignment (932) of the variable "elecCathodeDia2." (The "Dial" portion of the symbol was used as a mnemonic for half-diameter). For large-scale simulations, such as the one shown in the example in FIG. 9E, this assignment specified a zero-width beam. The same input file served, with minor variations, to simulate small-scale reactors. For small-scale simulations "elecCathodeDia2" was edited to take on the value of "cellSize" (933). "cellSize" was the minimum non-zero value allowed for the half-width, by the conventions of the simulation. For the large-scale simulation, shown in this example of the second embodiment, even this smallest non-zero value for "elecCathodeDia2" (932) would have been too big to simulate accurately the size of beams available from hardware (Rogers-940). Approximating the beam width as zero was a compromise to mitigate the limitations of the software. For small scale simulations, the minimum-allowed width of one PIC cell was a good approximation for "elecCathodeDia2." For large-scale simulations, zero was a better approximation.

In the real world, electron emitters are well known in the prior art. They typically measure a few centimeters in diameter. They may be either an array of bare filaments, such as auto headlight filaments, an electron gun with an internal filament, or a dispenser cathode. Various electron emitters are available commercially, for example from Heat Wave Labs, Inc. A drawing of a typical Heat Wave Labs electron gun is shown as "FIG. 4D" of Rogers-908. In all these named types of electron emitters the emission rate of electrons is controlled by varying the temperature of one or more hot filaments by passing varying amounts of heater current through the filaments. The higher the heater current, the higher the rate of electron emission. Typical heater power supplies are shown in the Heat Wave Labs catalog available on the web at http://www.cathode.com/. The amount of heater current would be controlled via a computer interface. In the Claims section of this Application, a generic form of this variable power supply is referred to as an "emitter-power-supply."

The two variables just described differed in that "electron IgnitionCurrent" was varied from time to time during start-up by stopping/restarting the simulation. The other, "emitCathodeDia2," remained fixed, simulating a selected size of hardware mounted inside the vacuum tank. Variables which changed in simulating a single start-up of a reactor were variables simulating knob-values. With computer control, knob-values can change on a millisecond time scale. Variables describing a physical object, like the size of the beam emitter, were simulating apparatus. These would require breaking vacuum and opening the reactor to change. Breaking vacuum is a procedure which must be followed by hours of conditioning to bake out internal structures before pumping can be restarted. Variables describing such physical structures were kept constant. In this sense, each run of the simulation described mostly components of a rigid physical structure, but each run also included a small number of electrically connected and controlled hardware devices. In the real world, these latter devices could be varied by knobs on a millisecond time scale.

Secondary electrons also originated inside the reactor as a byproduct to ionization of the fuel gas in the gas-cell(s). Each ionized gas atom produced one secondary electron. To stabilize the ion density at the time steady-state density was reached, the rate of ion production was adjusted to equal the rate of ion losses to ion-up-scattering. Secondary electrons were born cold and then were heated by colliding with hot electrons from the emitters. Once they had acquired enough energy to leave their birthplace, cold secondary electrons were removed by their hitting an internal structure designed to remove them. The relevant internal structures were an aperture, in the case of first and second embodiments, or the almost-touching corners of the magnet boxes, in the case of the third embodiment.

To maintain a deep potential well during start-up times, it was necessary to raise the current of injected electrons to keep pace with the rising ion density. It was not possible to set a high-enough injection current, once and for all, at time-zero. If the initial injection current was set too high at time-zero, the potential well self-destructed within the first few milliseconds after time-zero. The need to set the initial electron current accurately within limits posed a pitfall to successful start-up. To demonstrate this pitfall, FIG. 9A shows plasma diagnostics for such a bad start-up with too-high an injection current. These diagnostics are exhibited here, not as part of the disclosure of the invention, but only to teach how to avoid the pitfall of mis-tuned electron drive current. How to tune the variables to successfully set the electron-emitter's current will be discussed in subsequent paragraphs of this section.

In FIG. 9A (900) is a graph showing the number of beam-electrons in the simulation as a function of time. This number rose at early times, while the reactor filled with electrons, then the number reached a steady value independent of time. Time is shown on the horizontal axis (901) ranging from one time-step at the left-hand end of the axis, to 1.1 ms at the latest time (902) marked on the "Time" axis.

One obvious sign of trouble in FIG. 9A was that the curve representing the counts of secondary electrons (903) was higher than the curve (904) representing ions. The opposite inequality would be healthy, as shown in FIG. 6C, where the curve representing ion count (674) was 30 times higher than the curve representing secondary electrons (676). The reason for the excessive numbers of secondary-electrons in FIG. 9A can be seen in its lower right-hand panel. Here the graph (905) shows the potential function $\phi$ along a horizontal line (908) through the center of the reactor. The newborn ions fall into the core along this line, accelerated by the slope-to-the-right of the potential curve (905). The dashed lines (906) were placed in the Figure to mark the positions of apertures in the 2D plane and to transfer those positions into the graph of the potential (905). The bottom ends of the dashed lines show the potential at the corresponding apertures. The slope of the potential between the dashed lines determined the direction and magnitude of the initial acceleration of newborn ions, starting from rest at their birthplaces. It is a good sign that the slope of the potential (906) pushes ions to the right, toward the core of the reactor. It was also a good sign that the spatial distribution of ions (907) was observed to be uniformly filling the space between the magnets during the time span indicated along the Time axis (901).

A fatal sign of malfunction in FIG. 9A was the abnormal value of the potential, $\phi$, shown at the position of the arrow-head (909). This value was approximately zero, whereas it must be positive, above 10-20 keV, for successful operation. Electrons from the emitter traveled initially to the left, in the direction of the arrow (908). Because they have negative electrical charge, the potential (905) appears inverted to them. Once they crossed the peak of the potential at (910), they decelerated on the sloped-to-the-left potential toward the center of the reactor. When they reached the point where the potential was zero (909), they stopped and turned back toward the emitter to the right. Inhibited by the zero potential, the incoming beam of electrons could not cross the center of the reactor as it must if it is to successfully pump out the secondary electrons. Secondary electrons were produced continuously by gas ionization in the gas-cell (911), located in the bore of the left-hand magnet.

With no electron beam crossing to the gas-cell (911), no diocotron pumping occurred in FIG. 9A. Without diocotron pumping, a concentration of secondary electrons built up in and near the gas-cell. The positions of the secondary electrons are indicated by black dots in the upper-right-hand panel. Almost all the dots were concentrated in the region of the source (911). Secondary electrons outnumbered the ions, as indicated by the electrons' curve (903) being above the ions' curve (904). Even so, they were confined in this very small region of the reactor. The ions, on the other hand, were distributed uniformly (907) inside a bounded region, filling almost entirely the space inside the magnets.

In FIG. 9A, beam electrons reflect to the right at the x-coordinate marked (909). These electrons remain trapped to the right of center, near the right-hand magnet. This buildup of negative charge depressed the potential voltage at the peak (910). The potential voltage at (910) was less than the voltage in the other cusps. The reduced potential allowed ions to preferentially escape through the right-hand cusp. The extra concentration of escaping ions was visible as extra dots in the right-hand cusp (912), compared to the other cusps in the 2D distribution (907). In the on-line display of this 2D distribution, the dots representing the escaping ions (912) were seen to accelerate to the right until they were lost at the tank wall. This enhanced leakage of ions combined with the lack of pumping of secondaries; the result was to invert the desired ratio of ions to secondaries. Both effects together caused the secondary electrons' counts (903) to exceed the beam electrons' counts (904).

This example of failed tuning in FIG. 9A has been included in the Specification to warn of potential pitfalls in adjusting the reactor, pitfalls avoided by the claimed methods of the invention. The electron injection current must initially be set to a small enough value to avoid the central zero voltage (909). The 2D simulation does not predict the actual current needed in a 3D reactor. To be sure the initial value of potential does not become too small at center, some means to noninvasively measure the potential during start-up will be required. The measurement can then be used as feedback for controlling the beam electrons' current. Noninvasive potential measuring is expected to be a useful feature of the third embodiment. Even if the bunching only persisted for a few milliseconds, as it seemed to in simulation, measuring its frequency can be used to infer the potential well depth during the early phases of start-up. If the potential well depth is measured to be too deep, the injection current can be reduced using the feedback to avoid plasma loss. The important feature of this method of measuring the potential is that it can be done with a probe at the turn-around point of the bunch, near the outer edge of the potential well. This method will leave the center of the reactor clear of obstructions for the plasma.

Other noninvasive means of measuring the depth of potential have been tried. For example, in 2014, Cornish et al. at U. Sydney published a paper entitled, "The dependence of potential well formation on the magnetic field strength and electron injection current in a polywell [sic] device." The opening sentence of Cornish's abstract reads, "A capacitive probe has been used to measure the plasma potential in a polywell device in order to observe the dependence of potential well formation on magnetic field strength, electron injection current, and polywell[sic] voltage bias." The design of Cornish's "capacitive probe" is available in the prior art and might serve as an alternative means of measuring the depth of the potential in Polywell. The need to measure the depth of potential during start-up is first disclosed in this Specification. Its use is part of a new method of start-up claimed in this invention. The means to measure it may or may not use the third embodiment. Either way, the disclosed method still stands as unique and useful.

Figure 9B:
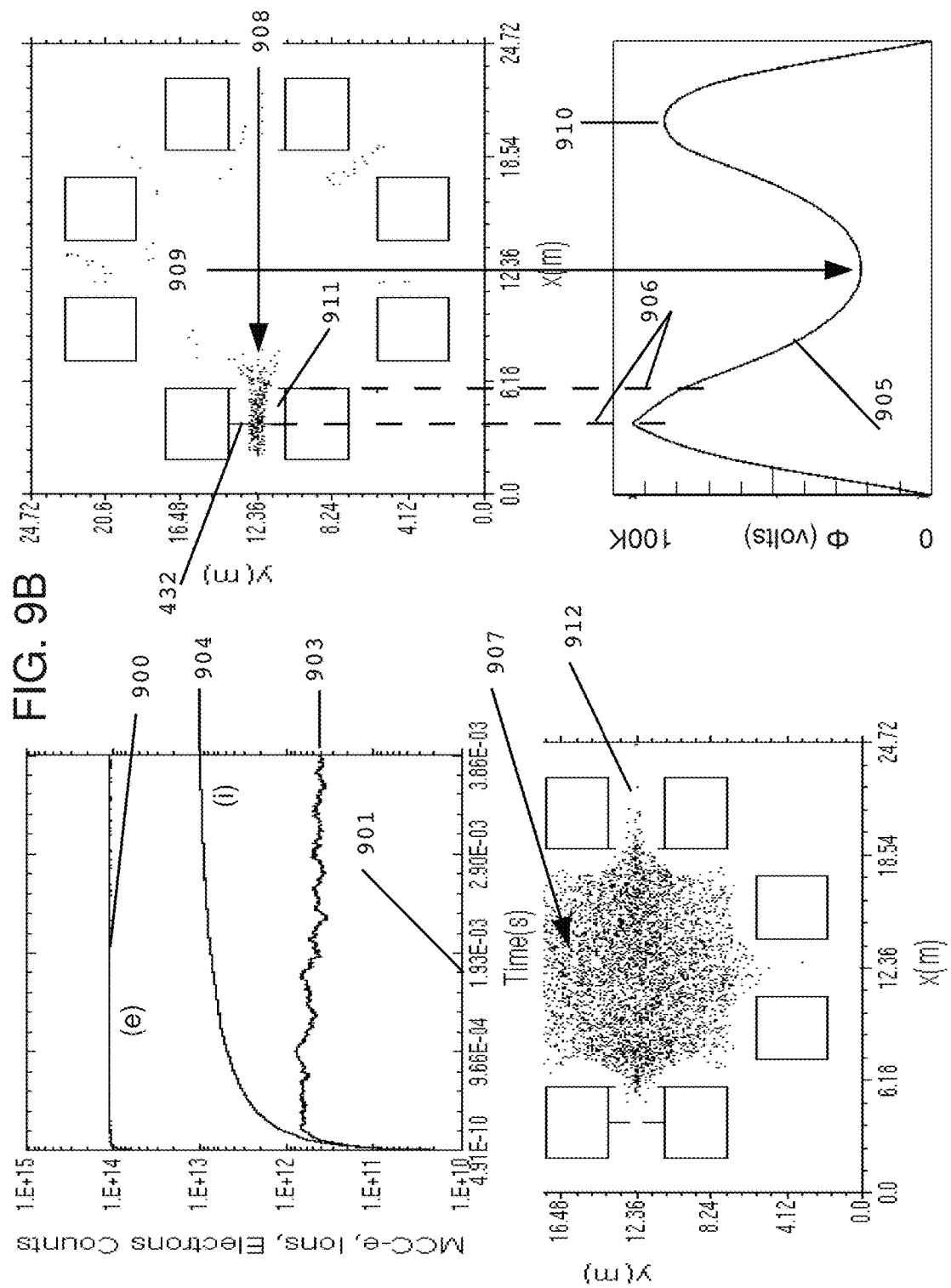

FIG. 9B shows snapshots of diagnostics from repeating the simulation with decreased electron drive current. The same four diagnostics shown previously for a failed start-up were repeated using an edited input file. Figure. FIG. 9B shows a successful approach to steady-state. The only difference needed to recover from the previous failed start-up was to decrease the electrons' initial injection current from 4.5A to 4.0A. This adjustment was made by editing only one line of the input file and repeating the simulation. FIG. 9E shows a page of the input file before it was modified. The assignment of the symbol "elecIgnitionCurrent" was changed from its value (930) to a new value "elecIgnition-Current=4.0," not shown. The other lines of code in the input file, numbering 606 lines of code in all, remained unchanged between simulations shown in FIGS. 9A and 9B.

The difference between successful start-up and failed start-up was only 0.5A out of 4.0A, a fairly small (12%) change. The smallness of this difference points to the fact that start-up requires a delicate balance of the many parameters defining the reactor's operating point. The simulation provided the means to search in a multi-dimensional space for optimum values of many parameters, only the first of which is the electron drive current described in this section.

In FIG. 9B the main feature of a successful start-up was the shape of the potential function (905). The minimum voltage at the center of the well (909) now shows as ~25 kV instead of zero like before. The nonzero voltage at the center allowed the beam of electrons from the emitter to cross the center right-to-left, in the direction of the arrow (908). In the vicinity of the gas-cell (911), the beam underwent unstable diocotron oscillations. The appearance of these oscillations in two dimensions was the same as shown previously in FIG. 2C (224). The oscillations deposited the beam energy in the gas-cell. This energy heated the secondary electrons which moved them away from their birthplace and caused them to hit the gas-cell aperture (216). The gas-cell aperture (216) in FIG. 2C functioned the same as the one (432) in FIG. 9B.

In FIG. 9B the diocotron pumping of the secondary electrons caused their number (903) to fall far below the number of ions (904). The leakage of ions out of the right-hand magnet's cusp appeared greatly reduced, judging from the reduced number of dots (912), compared to the previous example. The reference number (912) is used in both FIGS. 9A and 9B to indicate escaping ions.

The foregoing analysis showed that the electron drive current must not be set too high at time-zero. Otherwise the potential well destroys itself due to cusp-trapping of electrons. It will now be demonstrated that the electron's injection current must be increased from time to time later in start-up. During the time span shown in FIG. 9B (901), the depth of the potential (909) was noticeably changing, becoming more and more shallow as simulated time progressed. This shallowing of the well had two undesirable effects on the plasma. Firstly, the ions fell through a smaller potential difference from their birthplace to the center (909). This caused a general lessening of ion energy which would ruin the power-balance if allowed to continue indefinitely.

Secondly, a shallower well reduced the efficiency of diocotron pumping of cold electrons. The incoming electrons from the emitter decelerated less in passing through the center (909), thus retaining more of their original kinetic energy. The shallower well decelerated beam electrons less than before on their trip from the peak (910) through the valley (909). Diocotron oscillations occur much less for high energy electrons than for low energy electrons. The higher energy electrons passed more readily through the gas-cell, depositing less heat than when they earlier entered with lower energies. As the well shallowed with time, cusp trapping increased along with the undesirable consequences of excessive build-up of cold electrons in the cusps.

The snapshot of the potential in FIG. 9B (905) was made at the latest time marked on the Time axis (901), labeled in the Figure as 3.96 ms. By this time the well depth (909) was already shallower than optimum. The shallowing of the well was reversed by increasing the injection current as soon as the display of the potential (905) showed excessive shallowing (909). The injection current was set by editing the symbol "elecIgnitionCurrent" shown in FIG. 9E (930), As a first step to cure the shallowing, the value of the symbol "elecIgnitionCurrent" was increased from 4.0 to 5.25 and the simulation restarted with this higher value of injection current.

FIG. 9C shows the same four diagnostics at a later simulated time, 4.17 ms, after having restarted the simulation with the higher injection current. Raising the injection current had the desired effect of deepening the potential at its minimum point (909). The potential voltage at the minimum (909) was read from the intersection of the dotted line (913) with the voltage axis (914).

In FIG. 9C the dotted line (913) intersects the voltage axis (914) at a position just below the first of ten equal tic marks. The first tic mark is at one-tenth full-scale, or 10 kV, making the minimum potential voltage less than one-tenth the maximum, in other words less than 10 kV. The initial energy gained by the newborn ions had increased by the difference in the minimum voltage of the well, ~25 kV in the previous FIG. 9B, to less than 10 kV in FIG. 9C. The newborn ions falling into the deeper well gained more than 15 keV additional energy as a result of increasing the injection current. Hotter ions are more likely to fuse, as discussed previously in reference to FIG. 3A.

The general conclusion, from analyzing FIGS. 9A, 9B, and 9C, was that to maintain the maximum ion temperature during start-up the electron injection current must be continuously raised from a preset value set at time-zero. The raising of the current must be coordinated with the time variation of the potential well so as to maintain a deep potential well. The rate of rise of the current must compensate for the natural tendency of the potential well to shallow in response to rising ion density during start-up. A means is needed for providing feedback of on-line plasma characteristics, from which the potential well depth can be inferred. One possibility is the bounce frequency from the third embodiment. Another is the capacitive voltage probe of Cornish. The essential need for monitoring the potential well depth during start-up is disclosed in this Specification for the first time. If the well depth is too deep, the well destroys itself. If it is too shallow, the ions do not heat and power-balance suffers.

(2) Wiffleball Size

In prior art, Rogers-2015 disclosed that the strength of the applied magnetic field must rise as a function of time to form a Wiffleball. The previous section "(1)" disclosed that the electron injection current must also rise as a function of time during start-up. In simulation, these two time variations were tested in separate simulation runs. The simulation was stopped manually after the diagnostics showed steady-state. Then the input file was edited to increase the assigned value of the relevant variable. Next, the simulation was restarted with the altered input file and with the same plasma density it had when stopped. In real world practice these time variations would occur simultaneously. A human operator and/or an on-line computer would be programmed to raise knob settings controlling two separate power supplies feeding the magnets and electron emitters.

Returning attention to the first page of code, shown in FIG. 9D, "diamagneticScale" (919) specified the operator's choice for the diameter of the Wiffleball. This diameter created a field-free region at the center of the reactor. The diameter of the Wiffleball in (919) was specified as a fraction (zero to one) of the maximum physically-possible diameter. The maximum possible diameter for a Wiffleball to fit in the free space was the length of a side of the square open space inside the magnets. A Wiffleball of this size would just fit in the square without allowing electrons to scrape the magnet boxes. This maximum size, if desired, would be selected by assigning "diamagneticScale=1." For later convenience, "dia2" (920) was assigned the radius of the Wiffleball in meters. (The "2" in "dia2" stands for ½ diameter, i.e. radius.) The variable "dia2" was created as a shorthand device to make convenient the tabulation of the B-field in the Control section of the input file, as disclosed in the following:

FIG. 9J shows the first page of the Control section of the input file. The Control block is a sub-block of the Region block, which follows the Variables block of the input file. Description block, Variables block, and Region block are the three major, sequential divisions of the input file. Here in the Control block, the applied magnetic field was separately calculated and tabulated for each cell in the simulated plane of the reactor. As is well known to physicists, magnetic field is a 3-vector. Assigning each of the two non-zero components of the vector required two separate arithmetic expressions to calculate them. The expression for "B01analytic" in line (925) assigned the horizontal, or x-component, of the field. In line (926) the analogous expression for "B02analytic" similarly assigned the vertical or y-component of the field. Additional description of the arithmetic structure of these two assignments can be found in Rogers-940.

Since the teachings of Rogers-940, a new feature was added to the assignments of the applied magnetic fields. The "step" function (927) was used to multiply the former applied field by an expression which evaluated to zero inside a square of half-diameter "dia2" (928). The "step" function is one of many predefined arithmetic functions supplied in the simulation software's compiler that reads the input file. The "step" function is specified to evaluate to zero for any negative argument and to evaluate to unity for any positive argument. "dia2" was specified as a variable equal to the Wiffleball radius, as described previously. The value of "dia2" was proportional to the variable "diamagneticScale," set by trial and error to equal 0.81 in FIG. 9D (919). By controlling the size of the Wiffleball, these variables were used to adjust the current of electrons extracted on aperture or magnet boxes.

In the prior art of Rogers-2015, "diamagneticScale" was used differently. Simulations of small-scale Polywells employed assigned-values of "diamagneticScale" (919) and "currentScale" (917) to be zero and 0.001, respectively. These values simulated the initial values of applied magnetic field required to gradually and stably form a Wiffleball in start-up. The simulation started with reduced magnet power in small magnets. The simulations with these previously modified values of "currentScale" and "diamagneticScale" were discussed in connection with prior art FIG. 1L. The newer values, assigned FIG. 9D, were used in the present simulation in this Specification.

In this Specification the method of simulating assumed that the Wiffleball had already been formed by gradually raising the field and electron density prior to time-zero. This preexisting Wiffleball was an artificial construct created to facilitate separately disclosing the effect of the emitter current, while holding the magnetic field constant at the appropriate level. This artificial construct of a preexisting Wiffleball was adopted because the "stop, edit, restart" method of simulating time-varying parameters could only accommodate changing one parameter at a time.

(3) Ion Source Injection Rate

Ions were produced by electron bombardment of gas confined in a gas-cell. The characteristics of the gas and geometry of the gas-cell were defined in the input file by a block of code shown in FIG. 9K. The "MCC" heading at line (950) summoned an optional feature of the simulation software. The "MCC" feature implements the "Monte Carlo Collisions" technique, as described in Birdsall-1991 and Rogers-940. A major improvement from Rogers-940 to the present "MCC" usage is seen in line (951), which reads "eSpecies=MCCelectrons." "MCCelectrons" is a symbol created elsewhere to specify a third specie of plasma particles. In addition to "electrons" and "ions" of the previous simulation, the new code tracked separately the secondary electrons produced by gas ionization. After they were born in the gas-cell, secondary electrons interacted just like beam electrons. However, they differed from beam electrons in that they were born with near-zero energy, including both their kinetic energy and potential energy.

After being heated by passing beam electrons, "MCCelectrons" acquired a position distribution similar to the unwanted, down-scattered beam electrons. But they had a useful characteristic not shared with beam electrons. "MCCelectrons" were born separately, and so could be tracked separately. Scattered and unscattered beam electrons were born identically, and so could not be tracked separately. In diagnostic displays, cusp-trapped beam electrons were lost in a sea of hot electrons. Even successful efforts to remove the cusp-trapped beam electrons would not change the shape of the beam electrons' distribution in the cusps.

Such a small signal was not useful to refine the method of removing cold electrons while keeping the hot electrons.

A new "Species" specification began in FIG. 9J at line (952). The first line following line (952) created the name "MCCelectrons," a mnemonic for convenient use in the MCC block following the "Species" specification in the input file. The next three lines defined the physical properties of the newly invented specie of particle. Except for the name, these properties were the same as for "electrons," defined in the "Species" block (953) just prior to the one for MCCelectrons. MCCelectrons behaved identically to electrons, except they were born in a different location. They were born in the gas-cell. The reason for giving the secondary electrons a unique name was to specify that the simulation was to track them separately from electrons.

The embodiments of the invention were designed to eliminate low energy electrons from the plasma. The design process was guided by the principle that MCCelectrons should live for only a short time before they died by hitting a structure. By the kinematics of the ionization process, MCCelectrons were born with very low energies, on the order of electron-volts. Beam electrons had been accelerated by the potential between emitter and magnets, initially acquiring on the order of 50 or 100 keV of energy. Tracking the secondary electrons separately allowed the design parameters of the reactor to be optimized by trial and error, aimed at getting rid of the low energy MCCelectrons as soon as possible after they were born. Whatever apparatus and methods rid the plasma of MCCelectrons also rid the plasma of down-scattered beam electrons. Both species needed to be removed to avoid cusp-trapping.

In steady-state, the rate of ion production must be controlled to equal the rate of ion loss. Otherwise charge would build up and destroy the essential quasi-neutrality. The rate of ion loss depended on the depth of the potential well confining the ions. The depth of the potential well depended mainly on the injection current of electrons, as described in the first "(1)" of these numbered subsections. In simulation, the ion injection rate was determined by setting the variables shown in FIG. 9F.

"gasCellCountR" (934) and "gasCellCountL" (935) specified the conditional employment of gas-cells located in the bores of Right-hand and Left-hand magnets, respectively. To facilitate diocotron pumping, the right-hand gas-cell was omitted from the simulation described by this input file by assigning "gasCellCountR" to be equal to zero (934). Removing the right-hand gas cell enabled diocotron pumping. This was an important improvement over Rogers-940 which employed two gas-cells. The additional gas-cell was useful for producing extra ions, but the right-hand gas cell also produced secondary electrons. These cold electrons would not have been pumped by the mechanism newly disclosed in this Specification. Diocotron oscillations only occur after the full-energy electron beam has been slowed by passing through the minimum of the potential well at the center of the reactor. Before reaching center for the first time, incoming beam electrons passed through the bore of the right-hand magnet, where the right-hand gas cell had been located. However, the energies of the incoming electrons were too high to be effective in heating secondary electrons. Secondary electrons born in the right-hand gas-cell would have been trapped in the cusp near their birthplace.

To say the right-hand gas-cell was "removed" is somewhat misleading. The hardware features of the cell, namely the confining apertures, were still in place, but the gas inside the apertures was degraded in density to have the same density as the background gas filling the remainder of the tank. The cell was where it was specified to be, but confined fuel gas was not in it. How this was accomplished is described further in the next two paragraphs.

Continuing on the page of code shown in FIG. 9F, "gasPressure" (939) assigned the pressure of gas inside the gas-cell, expressed in conventional units of Torr. In the real world, this pressure would be maintained by a controlling on-line computer setting a hardware gas regulator to the desired pressure, the regulator feeding gas of that pressure into the cell through a narrow-gauge tube from outside the tank. According to the established technique of differential pumping, as disclosed in detail in Rogers-940, some of the gas in the gas-cell would necessarily leak out through the apertures into the body of the vacuum tank outside the cell and inside the tank walls.

The leaking gas would produce a uniform background pressure throughout the tank. Still on the page of code shown in FIG. 9F, the background pressure was simulated by the assignment statement "gasBkgdDensity=gasDensity*0.001" (937). The constant "0.001" in this assignment specified that the background gas pressure was maintained smaller than the pressure in the cell ("gasDensity," assigned in the previous line of code) by a factor of $\frac{1}{1000}$. This factor is within the range known in the prior art to be provided by standard vacuum pumps, as described in detail in Rogers-940.

The MCC function of the simulation generated ions in proportion to the pressure in the gas-cell and also, at a lower rate, in proportion to the background pressure in the greater volume of the tank. The line of code populating the PIC cells with gas atoms is shown as "analyticF=gasBkgdDensity+ . . . " in FIG. 9K (959). On the right-hand side of the equals sign is an expression evaluated and assigned to initially populate each PIC cell with gas atoms. The expression on the right-hand side begins with the constant "gasBkgdDensity," previously assigned value in the Variables section of the input file, shown in FIG. 9F. All PIC cells received the constant background density. In addition, PIC cells inside the enabled gas-cell received extra density, "gasDensity," assigned a value following assignment of "gasPressure" (939), and employing the ideal gas law.

An additional word of explanation is due about the functioning of the assignment of "analyticF" in the code shown in FIG. 9K (959). The expression on the right-hand side of the equals sign depends on the values of the special symbols, "x1" and "x2," defined in the OOPIC Pro language. By the conventions of the simulation software, the special symbols, "x1" and "x2," each take on all the integer values from 1 to the maximum PIC cell index, in all possible combinations. The one expression (959) in FIG. 9K is equivalent to 64×64 individual assignments populating each and every one of the PIC cells. PIC cells along vertical and horizontal directions are indexed 1 to the maxima defined by "diameterinCellsY" (981) and "diameterinCellsX" (993), respectively. Some of the cells receive background gas density and some of the cells receive background density plus the density assigned to "gasDensity."

The number of gas atoms in each PIC cell was tabulated at time-zero, as a predefined feature of MCC. When an electron passed through a cell, the probability of ionization in that cell was proportional to the number of atoms populating the cell. The rate was also proportional to the value of a predefined variable representing the atomic cross-section for electrons ionizing hydrogen gas. During run-time, the tabulated population values were multiplied by the value assigned to "ecxFactor" (936) to compute the probability of each electron ionizing one of the atoms in each PIC cell as it passed through. ("ecx" is a mnemonic for "electron cross-section.")

"ecxFactor was used as a convenient scaling variable to adjust the rate of ion production during start-up. As steady-state was approached, the simulation was stopped from time to time, and the value of "ecxFactor" was adjusted by editing the input file. Then the simulation was restarted with ion rate scaled-up by the new value of "ecxFactor." This usage of "ecxFactor" substituted for changing the gas pressure during start-up. Gas pressure could only be changed at time-zero, as a convention of the software, required to speed MCC execution. In the real world, gas pressure would conveniently be changed over time, by adjusting the pressure-regulator feeding gas to the gas-cell. Changing "ecxFactor" accomplished the same thing in simulation, working around the restriction of the simulation software imposed for computational efficiency.

The need to adjust the ion production rate to match the ion loss rate was satisfied by observing the depth of the potential displayed as a diagnostic while the simulation ran. If the rate of ion production became too high, the potential well degraded and the ions' loss-current increased. This increase in ion losses was a sign the Wiffleball was over-full and could not accommodate any more ions. Once the Wiffleball filled, excess injected ions just leaked out at an increased rate compared with simulating a lower ion injection rate. An excessive rate of ion loss was harmful to the power-balance. It would cost extra drive power to replace the lost ions, and this would reduce the power-balance. Diagnostics will now be shown as part of this Specification to warn of this possible pitfall of over-filling the Wiffleball. This pitfall will be avoided by following the methods of tuning claimed for this invention.

For this example, ion injection rate was increased by editing "ecxFactor=4.5" (936) to read "ecxFactor=8.0," not shown. FIG. 9G shows diagnostics made with this too-high a rate of ion production. The defective diagnostics of FIG. 9G should be compared with successful diagnostics in FIG. 9C. Between the two FIGS. 9C and 9G, the electron injection rate was also increased to maintain the depth of potential, as described in the first of the numbered sections, "(1)," above. At the same time of editing the input file to increase electron rate, "ecxFactor" was raised to increase ion production rate. In the interest of saving paper, the edited file listing was not included in this Specification. The only differences between the two simulations were in the variables specifying electron and ion injection currents. To confirm this, the Linux "diff" command was used to compare the two input files. Only two code lines, the ones containing the two assignments just mentioned, were flagged as differing. The others of the 606 total lines of code were identical.

The dotted line (913) was also shown previously in FIG. 9C, where it marked the level of voltage at the minimum of the potential function. In FIG. 9G the dotted line is shown for comparison with the previous minimum. The height of the line (913) in FIG. 9G is seen to be very close to the height of the central minimum of the potential function (909). This shows that the depth of potential was successfully maintained by adjusting the electron drive current. However, a major sign of trouble arose, in that the potential (905) had become asymmetric right-to-left. The height of the right-hand maximum (910) was much lower in voltage than the left-hand maximum (906). This difference caused an excessive ion loss through the bore of the right-hand magnet, indicated by the increased density of black dots (912) in the upper-right-hand panel.

Judging from the increased density of dots at cusp positions (940) and (942), the loss of ions through the top and bottom cusps may also have increased. To investigate the possible increased losses top and bottom, a new diagnostic was displayed. The top-left-hand panel of FIG. 9G shows a curve (943) of the potential as a function of position along a vertical line through the center of the reactor. To align with the display of ions' 2D positions (907), the vertical axis (944), labeled "y(m)," was displayed parallel to the same-labeled one marking the ions' vertical positions in the 2D display (907). Except for being rotated 90 degrees, the curves (943) and (905) were plotted on the same scales. The dashed line (948) connects the point of maximum potential along the vertical line (945) with the corresponding point in the ions 2D positions' distribution.

The dashed line (948) was deemed significant because ions in the 2D distribution on that line experienced an electric force of zero. (From the definition of potential, the electric force on a positively charged particle is proportional to the slope of the potential function, by definition zero at this local maximum.) The dashed line divides the ions in the 2D display into those going upward from those going downward. Ions below the dashed line, at (942), experienced a downward force. They accelerated toward the tank wall, where they soon died. The losses in the top (940) and bottom (942) cusps appeared approximately equal, judging from the density of dots on outer slopes the potential function. At the position (942) the count of ion particles headed downward toward the bottom wall is 5. At the position (940) the number headed upward toward the top wall is 4. Considering statistical errors in the numbers 4 and 5, these two numbers indicate the same rate of lost ions moving upward as moving downward. On the contrary, the losses through the right-hand cusp (912) were much greater than through any other cusp.

The rate of ion loss through the top and bottom cusps was proportional to the pressure of ions in the bulk plasma trying to escape. This pressure is symmetrical top to bottom; thus, the rate up and rate down were expected to be equal. The rate of loss of ions through the right-hand cusp (912) was enhanced over those of the top and bottom by the left-right asymmetry of the potential function (905) between the high peak (906) and the much lower peak (910). Due to the momentum they gained falling into the well, newborn ions entered the right-hand cusp after crossing the well for the first time. The kinetic energy they gained in their initial fall from the higher peak (906) was only partially converted back to potential energy when they climbed the lesser peak (910) on the other side of the well. With the kinetic energy still remaining at the position of the peak (910) almost all newborn ions passed over the peak (910) and hit the right-hand tank wall on their first pass across the well. The power drain through the right-hand cusp outweighed the power drain through all the other cusps. The right-hand peak (910) was only slightly lower than the top and bottom peaks, but it was much less than the left-hand peak (906) where the ions were born. The asymmetry caused excessive ion losses at (912).

The losses of ions hitting the tank walls drained energy without contributing to fusion. The higher the rate of ion loss, the poorer the power-balance. The diagnostics seen in FIG. 9G exhibited several signs of poor performance. The performance was improved by backing off on the rate of ion production as soon as the signs of overfilling the Wiffleball appeared during start-up.

One sign of overfilling the Wiffleball was that the peak values of potentials were reduced. The lower peaks presented lower barriers to ions escaping. As the peaks lowered, the hotter ions escaped, leaving the cooler ions behind. Cooler ions fuse less, lowering the power-balance. To avoid overfilling, these characteristics of the potential well must be recognized and avoided. When the signs of overfilling appear, as in FIG. 9G, the ions' production rate must be reduced to establish a smaller Wiffleball size, one that just fills the available volume. Hardware to provide feedback on the potential depth would be useful to facilitate this adjustment. Electrodes could be mounted on the tank wall, aligned with the bores of the magnets. Such electrodes could measure the ions' loss-current at each of the walls. Minimizing the loss current would improve the power-balance. The suggested hardware is not part of the apparatus claimed. From the method claimed it would be obvious to one skilled in the art of reactor tuning to develop such hardware to facilitate start-up.

(4) Magnets' Spacings

The smaller the gap width between the magnets' corners, the larger the magnetic field at the surface of the plasma. As the magnets were moved closer and closer together, the magnitude of the field increased due to the shorter distance from the surface of the plasma to the current-carrying elements of the six coils. The larger the surface field, the larger the maximum density according to the $\beta=1$ condition at the surface. The $\beta=1$ condition made the plasma density proportional to the square of the magnitude of magnetic field at the surface of the plasma.

In a real reactor, magnet spacing will be fixed by choosing the physical dimensions of legs and vacuum flanges connecting the magnet boxes to tank wall, as disclosed in Rogers-908. This hardware would be rigid and integral with the vacuum sealing, which means that the spacing of the magnets cannot be changed once vacuum pumping begins prior to start-up.

To duplicate this feature of the actual reactor, the simulated magnet spacings were kept constant from time-zero onward. Prior to time-zero, a "good enough" magnet spacing was selected by assigning variables of the input file. Little effort was expended to optimize the spacing in simulation. It should be understood that optimizing can and should be done in model testing. These teachings apply to a wide range of spacings.

The gap width was set by assigning the variable "magCornerGap" at line (921) of FIG. 9D. In the first and second embodiments, the value of "magCornerGap" was found to be not critical for power-balance. Any value larger than some minimum would serve as well. The minimum was determined by a trial run of the simulation, producing electron distributions such as the ones in FIG. 4B. The gaps were made wide enough so that none of the recirculating electrons hit the corners of the magnet boxes. Not a single dot is in the clear space between the surface of the close-packed dots forming the Wiffleball and the corners of any of the magnet boxes, for example the one at (421). All eight of the magnet-boxes' corners were clear of nearby dots.

In the third embodiment, shown in FIG. 6C, the corner-spacing was more critical. The spacing was set to cause 50% of the recirculating electrons to hit the magnet boxes at the corners. By convention, the simulation software required that the surfaces of the magnet boxes lie on cell boundaries. The electron particles, represented by the dots, were not so constrained. They uniformly filled the PIC cells in the central region (665), but only partially filled the cells at the edges of the corner gaps, typical ones of which are shown just beyond the ends of the arrows (654 & 655). As a result of partial filling, the electrons did not uniformly hit each of the eight corners. Corners like (654) intercepted many electrons. Corners like (655) intercepted none. The sum of electron losses on all eight corners equaled 50% of the injected current.

The gaps measure only a few cells; thus, fine adjustment was not possible by directly adjusting only "magCornerGap," (931) in FIG. 9D. To obtain the desired 50% figure indirect, adjustment was made by changing the size of the Wiffleball via assigning the variable "diamagneticScale," (919). Relatively small changes in the Wiffleball diameter caused correspondingly small changes in the widths of the cusps, permitting the 50% figure to be accurately approached.

In the real world, the width of the gaps would be directly and finely adjusted by machining components. One effective apparatus for adjusting the corner gaps would employ machined spacer flanges, as patented in Rogers-908. Even with such apparatus, perfect balancing of the current on all magnet boxes may not be possible without tedious, and perhaps unnecessary, magnet alignment. Imperfections in fabricating the magnets' conductors may cause substantial variations in the positions and widths of the flow-paths of electrons through the corners. Such variations would cause variations in the level of electron currents from box to box among the magnets. It is not clear whether these variations can be tolerated or whether they must be trimmed out to maximize power-balance. Unequal loss-currents on the different magnet-boxes' corners did not cause any problem in simulation. This creates optimism that it will not cause any problem with real magnets either.

(5) Vacuum Tank Size

The size of the tank in simulation was limited by the need to maintain a minimum electric field strength at its inside surface. If the electric field were too weak at the inside surface of the tank, electrons approaching the surface would not reverse direction; instead they would follow weaker magnetic field lines which wrap around the back sides of the magnets, forming closed paths back into the core. These closed loops would fill the space outside the magnets, leaving no space clear of electrons to mount the supports connecting the magnets to the tank. Leaving just enough space for electron recirculation, the variable assignment of "magTankSpaceX," shown at line (922) of FIG. 9D, was found adequate by trial and error.

In the real world, the tank size would be made as small as possible to save on expensive vacuum pumps, while still leaving enough space to accommodate insulators between magnets and tank. The minimum length of insulators is determined by the maximum rated voltage they can support. For some fuel choices, the voltage might range up to a few hundred kilovolts. For DD fuel, the simulations of this Specification used 50 and 100 kilovolts (KV) as typical examples. "FIG. 4A" of Rogers-908 showed a commercially-available insulator, rated at 65 KV, measured mm end-to-end. This would be the absolute minimum length assigning "magTankSpaceX" (922) for a realistic simulation. This limitation to provide a minimum insulator length would only be a concern for the smallest of scales, i.e.

"radiusScale" less than two. In the examples simulated in this Specification "radiusScale" had a value of thirty (916). This value, much larger than two, occurs implicitly as a factor in "magTankSpaceX" (922). This in turn made the spacing between tank and magnets ample to support the simulated voltages of 50 and 100 kilovolts.

(6) Magnet Bias Voltage

In the second page of simulation code, shown in FIG. 9E, magnet bias voltage was called by the name "elecEnergy" (931) and assigned the value 100000 (volts). The choice of this name reflects the fact that beam electrons acquire their initial kinetic energy by accelerating through this potential difference between tank and magnet boxes. The potential difference was established in the input file by two assignments. The voltage on the tank was specified as zero volts and the voltage on the magnet boxes was specified as equal to "elecEnergy." In the line following the assignment of "elecEnergy" at line (931), "magBias" was assigned as a substitute name for "elecEnergy." The substitution was for the purpose of carrying the value 100000 into the subsequent "Region" section of the input file. The "Region" section began after the end of the "Variables" section, at the bottom of FIG. 9F, and continued to the end of the input file listings, at the bottom of FIG. 9P. (This change of names was a vestige of a previous use of the input file to simulate a small-scale Polywell with external electron guns. Commercially available electron guns do not produce enough electron drive current to heat a full-scale Polywell reactor and so were not simulated for these embodiments.)

The electrical characteristics of the tank were defined in a "Conductor" block of code, shown in FIG. 9M (965). The characteristics of a "Conductor" were defined in the OOPIC Pro language to simulate a real conductor. A known property of conductors is that the electric field at their surface points in a direction normal to the surface. The code lines between the open brace (968) and the closing brace at the bottom of the page defined both the voltage and the dimensions of the tank. The voltage on the tank was specified as zero volts in line (966). The geometrical position and direction of the "normal" to each of four surfaces of the tank in the simulation plane were specified in four "Segment" blocks, the first of which is shown in line (967). Two "Segment" blocks, similar to the two shown beginning at (967), were omitted from the Figure to save paper.

The magnet boxes were defined in the input-code shown in FIG. 9N. At the top of the page is line (970), summoning the "Equipotential" feature of the simulation software. The electrical characteristics of "Equipotential" surfaces are those of a solid surface held at fixed voltage. The voltage was specified in line (971) to be equal to the previously assigned "magBias," which was itself equal to 100000 following line (931) of FIG. 9E. The potential difference between the tank and magnets was thereby specified to be 100000 volts. The energy gained by a charged particle falling thorough a potential difference is equal to the voltage difference times the charge on the particle. Electrons (or ions) could gain as much as 100000 kilo-electron-volts kinetic energy by falling through the potential voltage difference between tank and magnets (or between magnets and tank in the case of ions).

The value selected for the magnets' bias voltage set the maximum possible depth of the potential well which accelerated and confined ions. Deuterium ions were specified positively charged by the known elemental charge on the protons inside the deuterons. The deuterons' charge was assigned in units of Coulombs by the "q=" specifier in FIG. 9K (955) to be the polar opposite of the electron's charge, assigned in FIG. 9J (954). This positive charge caused the ions to gain kinetic energy, measured in electron-volts, numerically equal to the depth of the potential well they fell into, measured in volts.

A typical potential well is shown by the curve (905) in FIG. 9B. The well depth is degraded from the applied bias voltage. The degradation was caused by the imbalance of electrons and ions in the core plasma. The growing concentration of ions' positive space charge inhibited new ions from entering, reducing the depth of the well. The trapped ions partially canceled the electric field applied by the bias supply. A well depth of 75% of the bias voltage was adopted as a convenient target for setting the electron emitter current. The higher the electron drive current, the deeper the resulting well, up to the limit discussed in "(1)" above. The higher the ion density, the shallower the well.

The numerical value of the bias voltage was chosen to maximize the factor of fusion yield that comes from the energy variation of the fusion cross-section, which depends on the choice of fuel. The values of bias voltages chosen for the simulation, 50 and 100 keV, were appropriate for DD fuel. In the final reactor design, economic considerations will also be important. The higher the voltage, the more expensive the power supply and insulators. It is to be understood that a wide range of bias voltages are covered by these teachings.

(7) Gas-cell Positions and Apertures

The main point of the teachings of the patent Rogers-940 was to claim a differentially pumped gas-cell as a practical means of fueling a steady-state reactor. Steady-state has never been attempted in Polywell hardware. In simulation, Rogers-940 showed that the optimum position for the gas-cell (or cells) is at the position(s) of the local maximum in the voltage. Simulating the second embodiment, as shown FIG. 9B, a typical potential maximum is marked by the dashed lines (906). Ions born at this position acquired the maximum energy available from the well when they fell from their birthplace to the center of the tank (909).

In the third embodiment of this Specification, the apertures were made large enough to pass all the recirculating electrons, with none hitting the apertures. In the first and second embodiments, the left-hand aperture, through which the incoming electron beam exits the gas-cell, was made very narrow, just two PIC cells wide. The width of this crucial aperture is shown specified in the input file listing of FIG. 9F (980). The line reads "cellOuterApertureL=2*cellSize." Due to the restriction of the simulation software, the ends of apertures were required to be on cell boundaries. "2*cellSize" symbolically represented the narrowest non-zero width available for the aperture. Zero was not considered an option. Zero width would kill the electron beam on its first pass from the emitter and thereby waste the residual kinetic energy that the beam electrons had drawn from the bias power supply.

To control the loss current on the aperture, the value of "cellSize" was adjusted by trial and error to obtain the desired 50% of the emitter current hitting the aperture. The assigned value of "cellSize" in FIG. 9E (933) depended directly on the preceding assignment "diameterinCellsY=64" (981). Because "diameterinCellsY" happened to be a large integer, a unit change in diameterinCellsY made a comparatively small fractional change in "cellSize." By this method, "diameterinCellsY" was used as a "free"

parameter to finely adjust by trial and error the fraction of electrons hitting the aperture. In FIG. 9B, the aperture size (432) was the smallest feature in the simulation. It was the only feature as small as just two cells. Thus, changing "diameterinCellsY" by a few cells did not affect any other losses except the loss on the smallest aperture. In that sense, the value of "diameterinCellsY" could be considered "free." It only affected the one thing needing change, little else.

The simulation software provided a diagnostic displaying the electron current falling on the magnet boxes. In the input file, magnet boxes were defined in the "Equipotential" (970) block of code shown in FIG. 9N. The electrical properties of "Equipotential" structures were described in the previous ("(6)") section of this Specification. The mechanical properties, i.e. the physical locations of the magnet boxes and apertures, were defined by a list of 44 "Segment" blocks. "Segment" is a predefined structure in the OOPIC Pro language. The first of the "Segment" specifiers (972) defines a line segment forming one side of a rectangular magnet box. The block consists of four assignments giving the x- and y-coordinates of the two endpoints of a line in the simulation plane. On the right-hand side of the equals are expressions composed of symbols defined previously in the Variables block of the input file. The magnets' boxes and apertures were simulated as 44 separate line segments. Each line segment represented a thin sheet of metal in the real world. The metal parts would be in electrical contact so that one voltage assignment (971) was sufficient to define a common voltage for the entire magnet box array plus all the apertures connected to the magnet boxes. Each line segment was defined by a block of code similar to the block following "Segment" (972). To save paper, the 43 similar "Segment" blocks following the first one (972) were omitted from the input file listing in FIG. 9N. For the purpose of documentation, a comment line (973) was substituted at the same position where the "Segment" blocks were omitted.

The electron current on the 44 magnet boxes and apertures was displayed as a standard diagnostic of the simulation program. A test was made to verify that the one intended aperture, (432) in FIG. 4B, was the only segment of the magnet boxes' "Equipotential" structure collecting any electrons. In the 2D electron positions' display, shown in the left-hand panel of FIG. 4B, it can be seen that only the one aperture (432) squeezes the diameter of the electron's beam passing through it. The evidence to support this statement was that the cusp width is much narrower on the outside of the aperture than on the inside of the aperture. A large fraction of the recirculating electron beam hits the aperture from the inside and disappears from the beam beyond the aperture to the left. The other three apertures, the ones in the bores of the top, right-hand, and bottom magnets, were set much wider than the aperture (432). What can be seen in the Figure is that the other three of the recirculating beams are the same width inside and outside the apertures. This is an indication that the other three apertures had no effect on the electrons circulating through them. The electrons missed them entirely.

In addition to the evidence from the snapshot FIG. 4B, the on-line display of the 2D distribution, of which 4B is an instantaneous picture, showed the electron particles moving freely through all the apertures except the narrow one (432). To verify that the other apertures did not intercept electrons, an enlarged version of FIG. 4B was displayed while the simulation was running. In the enlarged picture, a gap was visible between the cusp electrons and the apertures. Individual electron particles were seen to move freely near the apertures without disappearing. The electrons all cleared the apertures in their many trips recirculating in and out through the cusps.

From these several diagnostics, the current on the magnet boxes, displayed as a diagnostic, was known to be an accurate measure of the current of electrons extracted by the one aperture (432).

Some hardware means to measure the current on the aperture would be useful in the real world. It would be a simple matter to insulate the aperture from the magnet box and connect it via a wire to an external current meter. To measure the fraction of extracted electrons, the value of the current measured by this meter could be made into a ratio with the value of current measured by a similar meter on the electron emitter. If the teachings of this Specification are followed to the letter, the current measured by the meter on the aperture would be adjusted to be half the current read by the meter on the electron emitter. The simulation does not predict the optimum ratio. The optimum ratio must be determined by trial and error operation of the real reactor, by reading of the currents and maximizing some measure of power-balance, while varying the ratio. If the hardware measurement failed to validate the software prediction, it would be obvious to one skilled in the art to modify the hardware apertures until a more favorable power-balance was obtained. Modifying the aperture would be a simple machining job, neither complex nor expensive.

(8) Magnet Drive Current

In accordance with one aspect of the method, the magnitude of the magnetic field of coil magnets was initialized at time-zero to be a small fraction (typically 0.001) of the magnets' maximum rated field. As the plasma density grew with time during start-up, the magnitude of the applied magnetic field was ramped up in proportion to the magnitude of the plasma's diamagnetic field. By its nature, the diamagnetic field increases in magnitude and in the opposite direction to the applied field inside the plasma. In the simulation the magnetic field in the central region of the reactor was set to zero inside a specified Wiffleball diameter. At the same time, the magnetic field was set to the maximum value specified for the magnet size being simulated.

In real model testing, the ramp-up rate would be adjusted by feedback so that the maximum steady-state density is reached at the same time the applied magnetic field reaches the full value of the specified, rated field of the magnets. The feed-back criterion for adjusting the magnets as a function of time during start-up would be that the size of the plasma ball inside the magnets occupies, at every moment of start-up, the entire space enclosed by the interior faces of the magnets' coils.

In order to maintain the high temperature of the plasma during start-up, the electron current and ion injection rate must also be ramped up over the same time interval as the magnetic field. The rate of change of the magnetic field, the electron current, and the gas pressure would be controlled by an on-line computer programmed to respond to feedback from instruments measuring plasma density, plasma temperature, and power-balance.

Advantages of the Apparatuses and Methods Disclosed

The invention discloses a superior design of apparatus and methods for operating a machine to make energy from nuclear fusion. Advantages of one or more aspects of the invention are to form during start-up and maintain during steady-state a deep potential well. When used in larger and larger scale models, the aspects enable refining the design of larger model reactors, as required to reach net-power.

Accordingly, several specific advantages of aspects of the invention are as follows:

(a) Pumping of cusp-trapped electrons in both small-scale and large-scale Polywell models makes the scaling from small-scale to large-scale reliable. In the future, full-sized (i.e. net power) reactors can be built with confidence based on extrapolating small-scale model testing results.

(b) The pumping of cusp-trapped electrons in large-scale reactors enables forming and maintaining a deep potential well. The potential well accelerates ions into the core and the resulting hot-ion plasma produces fusion energy with maximum efficiency.

(c) A deep potential well slows incoming beam electrons and causes diocotron oscillations which, with appropriate new apparatus, pump out cusp-trapped electrons.

(d) A method for establishing the Wiffleball during start-up will expand the volume of the plasma ball to fill the open space enclosed by the magnets' arrangement. The expanded volume will have increased fusion output compared to the prior-art operation of Polywell without the method.

CONCLUSIONS, RAMIFICATIONS, AND SCOPE

The reader accordingly will see that the fusion energy device of the inventive embodiments will lead to building larger and larger scale-models until net power performance is eventually reached. Accurate and reliable computer simulations were disclosed to show that the size of a net-power, advanced-fuel reactor can be as small as 25 meters in diameter. The projected electrical power output of a 25-meter reactor burning deuterium fuel would be 1.2 gigawatts, making the design appropriate for a wide range of power-generating applications. These applications range from electricity-generating plants powering towns and cities to portable reactors powering vehicles such as ships and spacecraft.

Advantages of the Embodiments

Many fuel choices are available. Deuterium, tritium, helium, boron, etc. can be burned.
Increasing the reactor size dramatically increases its power, up to hundreds of gigawatts.
Mechanical and electrical construction is simple, providing for easy maintenance.
Super-conducting magnets are optional, unlike ITER and other tokamaks which require them.

Scope of the Embodiments

The basic design of the fusion device incorporates magnets mounted on all the faces of a predefined polyhedron. The magnets are all the same size and produce identical magnetic fields, all pointing inward toward the center of the polyhedron. This arrangement of magnetic fields creates a number of cusp-lines, one cusp-line down the bore of each magnet. Electrons circulate in and out of the reactor core along cusp-lines. Aligned with the central bores of some or all of the magnets are mounted gas-cells, electron-emitters, and optionally electron-extractors in the shape of annular disks.

These useful apparatuses, gas-cell, e-emitter, and e-extractor, may each be duplicated on any or all of the polyhedral-faces' cusp-lines. A gas-cell plus e-emitter may be mounted on a single cusp-line. Only the extractor is necessarily opaque to electrons. Emitters of filament design are largely transparent to electrons and so may be mounted co-linearly on a cusp-line with a gas-cell and extractor. The number of each of the 3 types of apparatus may vary from application to application. The principles of the design of the embodiments admit to various number and placement of the 3 types of mounted apparatus. Many such variations may prove useful and all such variations are claimed in this patent Application.

A computer simulation was tailored to analyze a cubic reactor burning deuterium fuel. The cube is only one of the many polyhedra that could be chosen as the basic frame for mounting the magnets. Other polyhedra might be useful and might improve performance. For example, a reactor based on an icosahedron would have twenty magnets instead of six. The shape of the icosahedron is closer to the shape of a sphere than is the shape of the cube. A perfect sphere would have perfect convergence. It might turn out that the central-density convergence sought by Bussard will someday be found in the icosahedron. If convergence were obtained, it would raise the power output by raising the central ion density. The net effect of convergence would be to raise the power-balance and thereby shrink the size of the break-even reactor, a very useful result. A more detailed computer analysis could answer the question of whether higher-order polyhedra might be better than the cube. The possibility of smaller reactor size makes the use of higher-order polyhedra a useful addition to these embodiments. The advantages of the disclosed ion-source and electron-extractor apply equally well to designs with higher-order polyhedra.

The operating point of the reactor was characterized by simulating fixed knob values in software. In an actual reactor the electron current, magnet power, and fuel gas pressure would be simultaneously varied by a human operator turning knobs, or equivalently by a controls-computer programmed by an operator. The operator would naturally "tune" the knob values to increase the power-balance. This tuning might well be faster in hardware than in simulation software. For the same reason, that the graphic-equalizer on a stereo amplifier is best tuned using more than one knob at a time, the reactor will best be tuned varying more than one knob at a time. It was not possible to explore every possible knob value in simulation. The simulation-computer took about 100 hours of real-time to try just one set of knob values. It is to be understood that tuning might improve power-balance over the performance presented in these disclosures. A complete range of possible knob values, as provided by all possible adjustments of the hardware components, are obvious variants of the specified embodiments and so are also claimed below.

The geometry of the model-reactor was set by making certain other choices in assigning the simulation variables. For example, the spacing of the magnets one from the other, the so called "gap width," was fixed by setting the variable "magCornerGap," as seen in FIG. 9D (921). Changing the value of this setting produced wide-ranging effects. The smaller the value, the stronger was the magnetic field in the corners between the magnets. The stronger field reduced the rate of electron leakage through the corners to the tank. But smaller "gap width" also caused more electrons to be lost by hitting the magnets. The ideal value for "gap width" might best be found by trial and error in hardware rather than running the simulation over and over. Other important variables' settings controlled the shape of the magnet coils. The coils in the simulation were taken from catalog specifications, approximately square in coil cross-section and round in plan-view.

Figure 10:
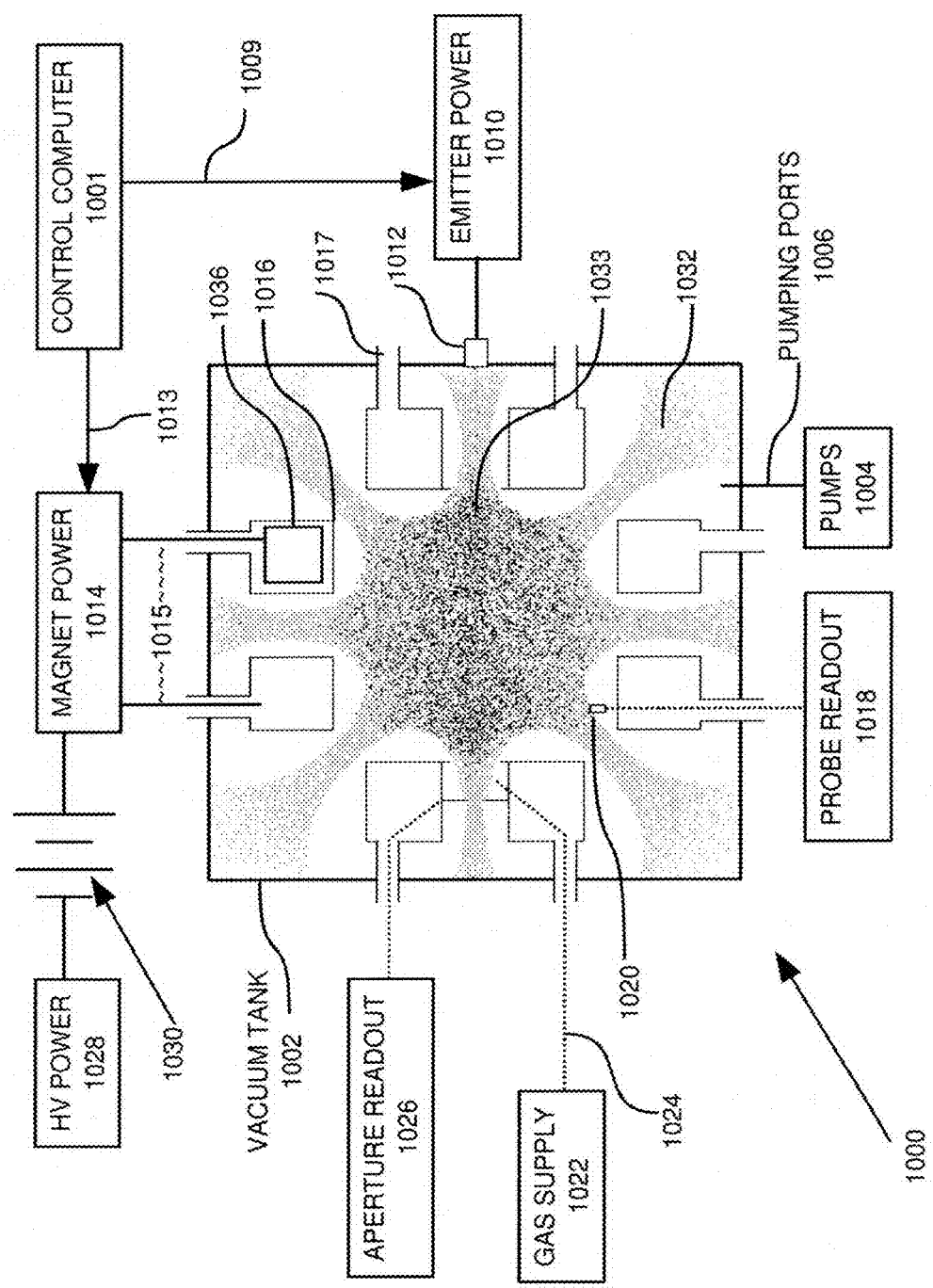
FIG. 10 shows a schematic cross-sectional drawing of one embodiment of a net-power reactor design disclosed in this patent.

FIG. 10 (1000) shows a schematic diagram of one possible embodiment of the invention. Simulated plasma comprised of electrons (1032) and ions (1033) is confined inside a cubic vacuum tank (1002). The diameter of the tank as shown is 24.7m. Both the tank diameter and simulated ions are from the net power design shown previously in FIG. 9C. Surrounding the vacuum tank (1002) external systems are shown connected by wires and pipes. Clockwise around the tank are shown a high-voltage power supply (1028), a magnet power supply (1014), a computer (1001), an emitter power supply (1010), multiple vacuum pumps (1004), a probe readout system(1018), a gas supply system (1022) and an aperture readout system (1026).

The amount of high-voltage bias (1030) applied to the magnets is predetermined to be appropriate to the fuel being burned, for example, 10's of kilovolts for deuterium fuel. The drive voltage of the magnets, applied between power leads (1015), is typically 10's of volts and varied to adjust the magnetic field. The magnetic field is controlled in real time by a signal (1013) from the computer (1001). Airtight magnet boxes (1016) surround and support magnetic coils (1036). The magnet boxes are mechanically supported by hollow legs (1017). Electrons enter the tank from an electron-emitter (1012) mounted on a tank wall. The vacuum system (1004) is shown simplified for clarity. In a real reactor, the connector (1006) would need to be expanded to be several pipes connected to several pumps, as described in detail in Rogers-940.

A capacitive-probe (1020) is shown just touching the surface of the confined electron plasma (1032). The probe measures the plasma potential at the predetermined position of the probe. The signal from this probe travels out of the tank on a wire passing through one of the hollow legs and into the probe readout system (1018). The measured potential is produced by the probe readout system (1018), where it is displayed for a human operator or sent to the computer (1001) via signal wires (not shown). It should be understood that finding the best position for mounting this capacitive probe has not been attempted in simulation. This detail remains to be determined by testing model reactors constructed according to the design disclosed.

A gas supply system (1022) provides a continuous flow of fuel gas from storage bottles or from some other stored supply. A controlled rate of gas flows through a delivery tube (1024) into a gas cell, as described in Rogers-940. The gas cell is partially closed by one or more pairs of aperture-plates, one of which is shown connected by a wire to an aperture readout system (1026). The function of this readout system is to provide the computer (1001) or a human operator with feedback. The readout system measures what fraction of the current from the emitter (1012) is hitting the aperture. This feedback is useful to tune the operational parameters of the reactor. The computer (1001) outputs control signals to vary the magnet power (1013) and emitter power (1009).

Many shapes of magnets can be produced by standard manufacturing techniques. The commercial coils are made by winding copper wire on a spool with an open central bore. The technique of winding can produce magnets with a variety of cross-sectional shapes and a variety of plan-view shapes with equal ease. For example, a square spool would produce magnets having square plan-view instead of the round plan-view as shown in FIG. 1F. Square coils would produce an equally narrow gap along the sides of the square faces of a cubic reactor. A long thin gap would have reduced electron leakage to the tank but would also suffer more electrons lost to hitting the magnets. Different choices of plan-view are exemplary of the flexibility of the design. Exercising this flexibility can improve the performance of the model-reactor. Improvement in performance from such changes in magnet-spacing and magnet-shape are anticipated as obvious extensions of these disclosures.

In addition to magnets wound from copper wire, newer Bitter magnets, developed for research applications, have shown improved ratio of magnetic field to power consumption. Such improvement was shown in simulation to improve the power-balance of the design by a large amount over wire-wound magnets of the same size. Bitter magnets so far have only been developed in cylindrical shapes, i.e. with circular plan-view combined with rectangular cross-sectional shape. The restriction to this shape is not fundamental. The copper arcs of Bitter magnets can easily be machined into other plan-views. It would not be so easy to make cross-sectional shapes differing from rectangular cross-section. The restriction to rectangular cross-section would not impact the power-balance according to simulation. Therefore Bitter magnets, possibly of various plan-view shapes, are understood to be covered by the claims to follow.

In addition to magnets wound from copper wire or arcs, magnets may be wound from super-conducting wire or tape. Super-conducting magnet coils may have advantages over copper coils. Super-conducting coils have much reduced electrical resistance and therefore reduced resistive heating compared to copper. In principle, this feature would allow the coils to be smaller and still produce the strong fields required for break-even. The principle of the embodiments described would be the same with super-conducting coils as with copper coils. Super-conducting coils must be maintained at cryogenic temperatures which would require additional thermal insulation to protect the coils from the heat radiating from the plasma. The extra engineering required to keep the magnets cold poses a potential draw-back to using super-conducting coils. Even so, the principles of the designs disclosed in these embodiments apply equally well with super-conducting coils. Whether they give a net advantage will depend on the cost and size of the additional hardware needed to keep the super-conducting magnets cold.

As described in the Specification, the vacuum tank had dual functions. It kept out the air and also functioned as a grounded electrode to accelerate electrons from the emitter. In an actual reactor, the tank's grounded-electrode function might be transferred to a grounded Faraday cage disposed inside the vacuum tank and surrounding the magnets. Faraday cages are well-known devices for providing electrical shielding. In an actual reactor, a Faraday cage might have the same shape as the vacuum tank, or a different shape such as a sphere or non-cubic polyhedron. One advantage provided by a Faraday cage would be to leave room outside the cage and inside the tank for mounting a spherical, direct-conversion energy-device such as disclosed in a 2011 patent to Greatbatch, U.S. Pat. No. 8,059,779B2.

The use of Faraday cages of various shapes would be extensions of the embodiments described and obvious to one skilled in the art of electrode design. The terminology "vacuum tank" and "Faraday cage" should be considered interchangeable and identical terms for means providing the functions of the outer, grounded-electrode described in the Specification.

The next logical step following this disclosure is to build and test one or more small-scale model reactors according to the disclosed embodiments. The measured power-balance of such model reactors may well exceed the power-balance predicted by the simulation disclosed herein. Diamagnetism is an important physical phenomena not yet simulated with the full complexity of electromagnetic mode PIC techniques. The true magnetic field at the surface of the plasma will be the sum of a field from the coil magnets plus an opposing field from the diamagnetism of the plasma. Diamagnetism is a well-known physics term for magnetic fields generated by internal currents in materials.

Due to diamagnetic effects, the size of the actual plasma cloud may turn out to be larger than the simulated size. Diamagnetic fields were simulated, but only with the simplifying approximation that the shape of the Wiffleball was cube. Diamagnetic fields generally increase the size of the plasma cloud when adding to the applied magnetic field.

With diamagnetic fields properly included, the simulated power output from the plasma would increase as the 3rd power of the size increase caused by diamagnetism. This would improve the predicted power-balance and shrink the predicted break-even magnet size. The net effect of including diamagnetism realistically in the model analysis would be to improve simulated performance of the subject embodiments. Including diamagnetism only approximately, as disclosed herein, set a lower limit on the power-balance of the small-scale model. The predicted performance of the embodiments is already an improvement over the prior art. Real world diamagnetism (or a more realistic simulation) will make it more so.

Although the description above contains many specificities, these should not be construed as limiting the scope of the embodiments but as merely providing illustrations of some of the presently preferred embodiments. For example, the knob values controlling the composition of fuel gas mixtures may be varied by a human operator or computer; also magnet spacings and magnet currents may be changed on some of the magnets to improve power-balance. The method of optimizing the reactor operation may rely on feedback information from other radiation detectors, in addition to or replacing neutron detectors.

Thus, the scope of the embodiments should be determined by the appended claims and their legal equivalents, rather than by the examples given.

I claim:

1. A fusion energy reactor comprising:
(a) a vacuum tank having an interior tank surface, an interior vacuum pressure, an exterior tank surface, an outside tank diameter predetermined from a range of 0.5 meters to 100 meters and a polyhedron having polyhedral faces positioned inside the interior tank surface;
(b) a plurality of magnetic coils, each coil positioned parallel to one of the polyhedral faces;
(c) a plurality of airtight metal containers, each container surrounding one of the magnetic coils and positioned on one of the polyhedral faces to create an open gap between the outer edge of each container and the outer edge of the polyhedral face;
(d) a plurality of hollow airtight insulating legs, each leg sealed at one end to one of the metal containers and sealed at the other end to the interior tank surface, and each leg having an electrical resistance to support an end-to-end voltage in the range 1 kilovolt to 1 megavolt;
(e) a plurality of electrical currents, each current circulating in one of the magnetic coils, and each current circulating in the same circulation direction, either clockwise or anticlockwise, as viewed outward from the polyhedron's center;
(f) at least one adjustable magnet-power-supply connected through the insulating legs to the magnetic coils by a plurality of electrical leads carrying both bias voltage and drive current to each magnetic coil, and each magnet-power-supply also connected to a magnet-control-system by at least one magnet-control signal;
(g) at least one electron emitter positioned at a predetermined emitter-inset-distance from the interior tank surface and operative to emit electrons toward the center of the polyhedron;
(h) at least one adjustable emitter-power-supply positioned outside the exterior tank surface, the at least one adjustable emitter-power-supply being electrically connected to the at least one electron emitter by a plurality of wires carrying power, and also connected to an emitter control system by at least one emitter-control signal;
(i) a plurality of recirculating electron beams, each beam positioned to pass through an open bore of one of the magnetic coils;
(j) at least one gas-cell sealed and bounded by at least one pair of aperture plates oriented generally perpendicular to a selected one of the electron beams, each aperture plate being penetrated by an individualized hole, and the multiple holes arranged along the selected beam's axis such as to pass a predetermined portion of the selected beam through the holes;
(k) at least one gas delivery tube configured to deliver fuel gas at a selected fuel gas pressure to the at least one gas-cell;
(l) one or more vacuum pumps located outside the exterior tank surface and connected to the vacuum tank through one or more pumping ports, the one or more vacuum pumps having pumping capacity sufficient to maintain the interior vacuum pressure at a level lower than the fuel gas pressure,
wherein the fusion energy reactor includes a controllable magnet-power-supply, a controllable emitter-power-supply, a selected fuel gas-pressure, and at least one computer to control synchronized coordinated variation of magnet power, electron power, and fuel flow as a function of time during reactor start-up.

2. The fusion energy reactor of claim 1 further including:
a current-measuring device electrically connected to at least one of the aperture plates.

3. The fusion energy reactor of claim 1 wherein:
the magnetic coils are electromagnets comprising multiple turns of copper wire wound into an annular shape.

4. The fusion energy reactor of claim 1 wherein:
the magnetic coils are Bitter-type electromagnets.

5. The fusion energy reactor of claim 1 wherein:
the magnetic coils are superconducting electromagnets.

6. The fusion energy reactor of claim 1 further including:
at least one capacitive probe capable of measuring the strength of electrostatic potential and positioned at a predetermined distance inside the interior tank surface.

7. The fusion energy reactor of claim 1 wherein:
the fuel gas contains at least one isotope selected from hydrogen, deuterium, tritium, helium-3, and boron-11.

* * * * *